United States Patent [19]

Anderson

[11] Patent Number: 5,714,997
[45] Date of Patent: Feb. 3, 1998

[54] VIRTUAL REALITY TELEVISION SYSTEM

[76] Inventor: David P. Anderson, 1627 Blake St., Berkeley, Calif. 94703

[21] Appl. No.: 369,885

[22] Filed: Jan. 6, 1995

[51] Int. Cl.⁶ ................................................. H04N 13/00
[52] U.S. Cl. ............................ 348/39; 348/42; 348/36; 348/48
[58] Field of Search ......................... 348/39, 36, 40, 348/42, 48, 51, 578, 580, 583, 586; 395/125; H04N 13/00

[56] References Cited

U.S. PATENT DOCUMENTS

| | | | |
|---|---|---|---|
| Re. 33,662 | 8/1991 | Blair et al. | 364/410 |
| 3,492,419 | 1/1970 | Bartonik | 178/6.8 |
| 4,723,159 | 2/1988 | Imsand | 348/50 |
| 4,951,040 | 8/1990 | McNeil et al. | 340/729 |
| 5,005,147 | 4/1991 | Krishen et al. | 364/578 |
| 5,058,419 | 10/1991 | Nordstrom et al. | 73/40.5 A |
| 5,130,794 | 7/1992 | Ritchey | 348/39 |
| 5,174,759 | 12/1992 | Preston et al. | 434/317 |
| 5,200,818 | 4/1993 | Neta et al. | 348/36 |
| 5,239,463 | 8/1993 | Blair et al. | 364/410 |
| 5,239,464 | 8/1993 | Blair et al. | 364/410 |
| 5,255,211 | 10/1993 | Redmond | 364/578 |
| 5,307,456 | 4/1994 | MacKay | 395/154 |
| 5,320,351 | 6/1994 | Suzuki | 273/86 |
| 5,329,323 | 7/1994 | Biles | 353/10 |
| 5,337,363 | 8/1994 | Platt | 381/17 |
| 5,406,326 | 4/1995 | Mowry | 348/104 |
| 5,423,554 | 6/1995 | Davis | 273/437 |
| 5,446,834 | 8/1995 | Deering | 395/127 |
| 5,448,287 | 9/1995 | Hull | 348/39 |
| 5,448,291 | 9/1995 | Wickline | 348/159 |
| 5,467,401 | 11/1995 | Nagamitsu et al. | 381/63 |
| 5,495,576 | 2/1996 | Ritchey | 395/125 |
| 5,502,481 | 3/1996 | Dentinger et al. | 348/51 |

OTHER PUBLICATIONS

Papadopoulos et al., "Implementation of an Intelligent Instrument for Passive Recognition and Two–Dimensional Location Estimation of Acostic Targets, " *1992 IEEE Instrument and Measurement Technology Conference*, pp. 66–70.

Cochran et al., "3–D Surface Description from Binocular Stereo," *IEEE Translations on Pattern Analysis and Machine Intelligence*, vol. 14, No. 10, pp. 981–994 (Oct. 1992).

Le Gall, "MPEG: A Video Compression Standard for Multimedia Applications," *Communications of the ACM*, vol. 34, No. 4, pp. 47–58 (Apr. 1991).

MacPherson, "A Computer Model of Binaural Localization for Stereo Imaging Measurement, " *J. Audio Eng. Soc.*, vol. 39, No. 9, pp. 604–621 (Sep. 1991).

Regault, "3–D Sound for Virtual Reality and Multimedia," *AP Professional*, 1994, pp. 117–190.

Stallings, "Networking Standards," *Addison–Wesley*, (1993), pp. 270–312.

Crochiere et al., "Multirate Digital Signal Processing," *Prentice Hall, NJ*, (1983), pp. 13–57.

Hoppe et al., "Mesh Optimization, " *Computer Graphics Proceedings, Annual Conference Series*, (1993), pp. 19–25.

Faugeras, "Chapter 3–Modeling and Calibrating Cameras," *Three–Dimensional Computer Vision*, (1993), pp. 33–68.

Faugeras, "Stereo Vision," *Three–Dimensional Computer Vision*, (1993), pp. 188–206.

*Primary Examiner*—Amelia Au
*Assistant Examiner*—Vu Le
*Attorney, Agent, or Firm*—Majestic, Parsons, Siebert & Hsue

[57] ABSTRACT

A virtual reality television system includes a video capture and encoding system for capturing and encoding the surface geometries and colors of objects and their background as the objects interact during a live action event taking place in a live action space; an audio capture and encoding system for capturing and encoding spatial sound sources emanating from the live action space as a result of the objects interacting therein, as well as ambient sounds emanating from a periphery area around the live action space and commentators' voices; and a rendering system responsive to viewer manipulated input devices for rendering a visual and auditory experience of the live action event from the perspective of a viewer selected virtual viewpoint related to the live action space.

6 Claims, 49 Drawing Sheets

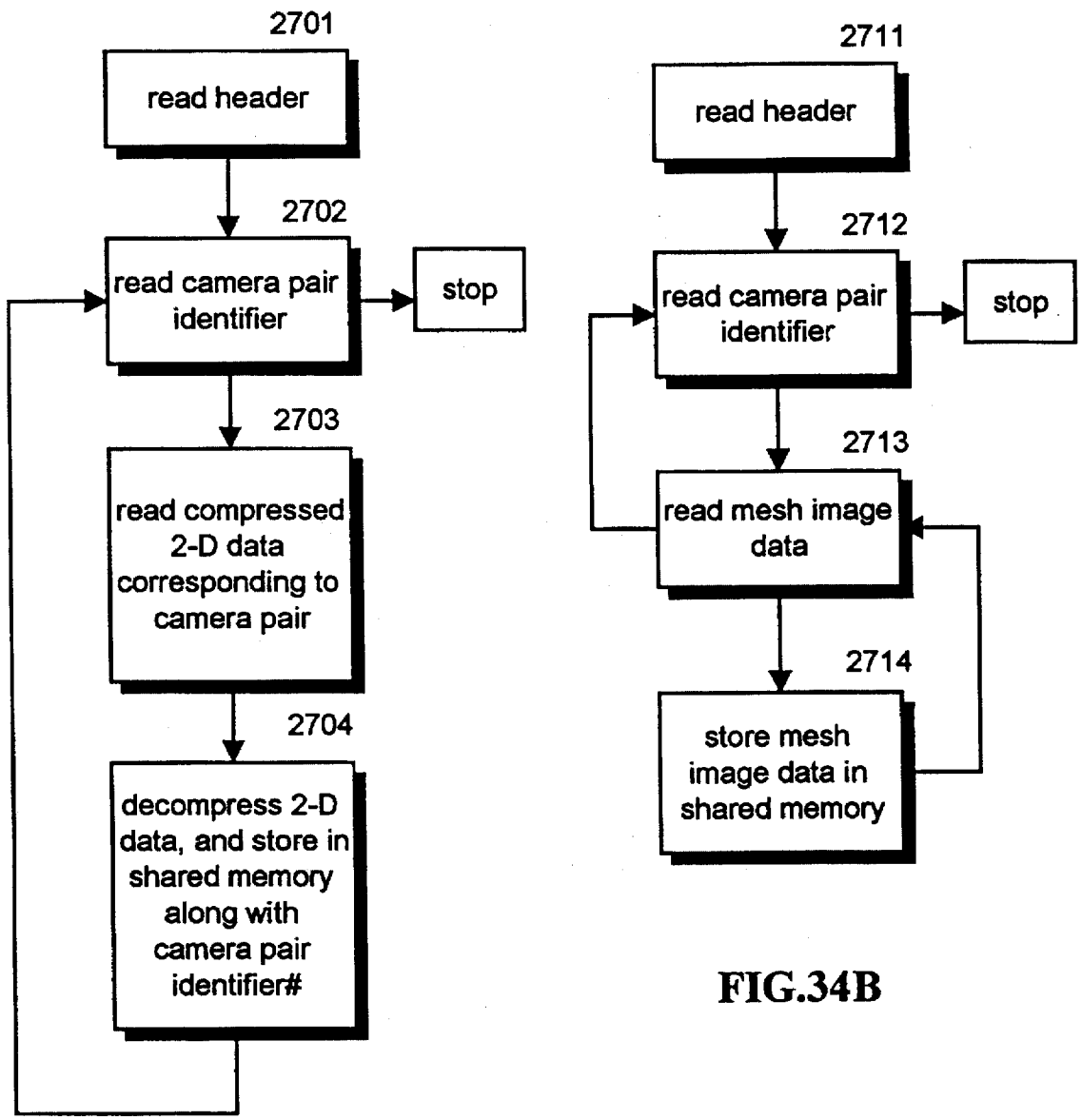

| | |
|---|---|
| SOURCE BUFFER#1, 1ST DATA CHUNK SOURCE LOCATION | SOURCE BUFFER#1, 1ST DATA CHUNK START TIME |
| SOURCE BUFFER#1, 2ND DATA CHUNK SOURCE LOCATION | SOURCE BUFFER#1, 2ND DATA CHUNK START TIME |
| ⋮ | ⋮ |
| SOURCE BUFFER#1, Kth DATA CHUNK SOURCE LOCATION | SOURCE BUFFER#1, Kth DATA CHUNK START TIME |
| SOURCE BUFFER#2, 1ST DATA CHUNK SOURCE LOCATION | SOURCE BUFFER#2, 1ST DATA CHUNK START TIME |
| SOURCE BUFFER#2, 2ND DATA CHUNK SOURCE LOCATION | SOURCE BUFFER#2, 2ND DATA CHUNK START TIME |
| ⋮ | ⋮ |
| SOURCE BUFFER#2, Kth DATA CHUNK SOURCE LOCATION | SOURCE BUFFER#2, Kth DATA CHUNK START TIME |
| ⋮ | ⋮ |
| SOURCE BUFFER#N, 1ST DATA CHUNK SOURCE LOCATION | SOURCE BUFFER#N, 1ST DATA CHUNK START TIME |
| SOURCE BUFFER#N, 2ND DATA CHUNK SOURCE LOCATION | SOURCE BUFFER#N, 2ND DATA CHUNK START TIME |
| ⋮ | ⋮ |
| SOURCE BUFFER#N, Kth DATA CHUNK SOURCE LOCATION | SOURCE BUFFER#N, Kth DATA CHUNK START TIME |

Left braces: 3201-1 to 3201-k; 3202-1 to 3202-k; 3203-1 to 3203-k
Right braces: 3204-1 to 3204-k; 3205-1 to 3205-k; 3206-1 to 3206-k

FIG. 41

VIRTUAL REALITY TELEVISION SYSTEM

BACKGROUND OF THE INVENTION

This invention relates in general to interactive television systems and in particular, to a virtual reality television ("VRTV") system providing to a VRTV viewer, a three-dimensional visual and auditory experience of a televised live action event from a viewer controlled viewing position and orientation.

Although television systems have dramatically improved in the past fifty years, they still only provide a limited experience of a live action event (e.g., a sports, drama, or news event) to a television viewer. As opposed to the dynamic three-dimensional experience of actually being at the event, current television systems provide a more limited experience generally consisting of two-dimensional images viewed from the perspective of one, or a limited number, of camera locations, which are accompanied by monophonic or stereophonic sound corresponding to a fixed head orientation from the perspective of one, or a limited number, of microphone locations. Although stereo television systems are being developed, using left/right camera pairs to generate separate images to be displayed to the left and right eyes of a viewer to provide an illusion of depth, viewing position is still restricted to actual camera locations.

OBJECTS AND SUMMARY OF THE INVENTION

Accordingly, a primary object of the present invention is a VRTV system in which a viewer's sensation of actually being at a televised live action event is dramatically enhanced relative to currently available television systems.

Another object of the present invention is a VRTV system in which the viewer can dynamically control her or his apparent position relative to the live action event (e.g., a football game), and can move to any position within a predetermined "live-action space" (e.g., a football field), which includes the area in which the live action event occurs, or within a "live-action periphery" (e.g., the grandstands at a football stadium), which includes an area surrounding the live-action space. For example, while viewing a football game, the viewer can not only experience the football game from any seat in the grandstands, but also from any position on the playing field, such as for example, from the quarterback's position when standing over the center and looking over the defensive set up, or dynamically moving her or his position with a running back as the running back is moving among defensive players while he or she is carrying the football. The viewer experiences 3-D visuals and 3-D sounds that closely simulate the actual visuals and sounds that the viewer would see and hear if the viewer were actually at the live action event at his or her selected apparent position and orientation.

In addition to allowing the viewer to dynamically control her or his apparent position in the live action space, still another object of the present invention is a VRTV system in which the viewer can also dynamically control his or her apparent orientation in the live action space. In particular, as the viewer turns her or his head to the right or left, the visuals and sound change accordingly.

These and additional objects are accomplished by the various aspects of the present invention, wherein briefly stated, one aspect of the present invention is a VRTV system which extends stereo television by allowing viewers to individually control their apparent position and orientation.

The VRTV system synthetically recreates the images and sounds that would be experienced from the each such viewpoint. The combination of 3-D sensory experience and 3-D mobility provides viewers with an illusion of presence within the live-action event. This illusion of presence is not provided by conventional television or stereo television systems.

Another aspect of the present invention is a capture and encoding subsystem used in an interactive television system providing viewer selectable virtual positions and orientations for experiencing an event involving objects within a live-action space, wherein the capture and encoding subsystem comprises: means for generating video signals indicative of multiple views of the objects within the live-action space; means for processing the video signals to generate data indicative of a geometric structure and colors of the objects; means for generating audio signals indicative of sounds emanating from the live-action space; and means for processing the audio signals to generate data indicative of points within the live-action space from which individual ones of the sounds emanate, and data indicative of audio signals of the individual ones of the sounds.

Another aspect of the present invention is a method of generating encoded data indicative of sounds emanating from a live-action space, comprising the steps of: receiving audio signals from at least four microphones configured in a non-planar arrangement and oriented so as to be responsive to sounds emanating from the live-action space; processing the received audio signals to estimate, for individual periods of time, spatial points from which individual ones of the sounds emanate, and audio signals of the individual ones of the sounds; and generating the encoded data to include the spatial points and the audio signals.

Another aspect of the present invention is a sound capture and encoding subsystem used in an interactive audio system providing listener selectable virtual positions and orientations for experiencing sounds emanating from a three-dimensional space, wherein the sound capture and encoding subsystem comprises: at least four microphones positioned and oriented so as to generate audio signals responsive to the sounds emanating from within the three-dimensional space; and processing means for receiving the audio signals from the at least four microphones, estimating locations within the three-dimensional space from which individual ones of the sounds emanate, and generating estimated audio samples for the individual ones of the sounds.

Another aspect of the present invention is a method of generating encoded data indicative of the locations, shapes, surface geometries, and colors of objects in a three-dimensional space, comprising the steps of: receiving video data from at least one camera pair viewing the objects in the three-dimensional space; and processing the received video data to generate the encoded data such that the encoded data includes information indicative of a plurality of surface elements representative of the locations, shapes, and surface geometries of the objects, and color information for the objects.

Another aspect of the present invention is a method of generating encoded data indicative of the locations, shapes, surface geometries, and colors of non-moving background objects in a three-dimensional space, and the shapes, surface geometries, and colors of live-action objects interacting during a live-action event among the non-moving background objects, comprising the steps of: generating, before commencement of the live-action event, encoded data indicative of the locations, shapes, surface geometries, and colors of the non-moving background objects from video data received from at least one camera pair viewing the non-moving background objects in the three-dimensional space; and generating, during the live-action event, encoded data indicative of the locations, shapes, surface geometries, and colors of the live-action objects from video data received from at least one camera pair viewing the live-action objects interacting among the non-moving background objects in the three-dimensional space.

Another aspect of the present invention is a rendering system used in an interactive television system providing viewer selectable virtual positions for experiencing an event occurring in a three-dimensional space, wherein the rendering subsystem comprises: means responsive to physical actions initiated by a viewer for generating at least one control signal indicative of a virtual position in the three-dimensional space; means for receiving the at least one control signal, video information associated with the event, and audio information associated with the event, and generating in response thereto, display signals and audio signals relative to the virtual position; means responsive to the display signals for providing a simulated viewing experience relative to the virtual position to the viewer; and means responsive to the audio signals for providing a simulated hearing experience relative to the virtual position to the viewer.

Another aspect of the present invention is a method of generating left and right ear audio signals for simulating an experience of sounds emanating from a three-dimensional space relative to a listener selected virtual position in the three-dimensional space, comprising the steps of: receiving position data indicative of the listener selected virtual position; receiving audio data including for individual sounds emanating from the three-dimensional space, sound data organized in time periods, and emanating locations respectively corresponding to the time periods; processing the received position data and the received audio data to generate, for individual sounds, modified sound data whose pitch, volume, and time offset have been modified to approximate the corresponding individual sound that would be heard at the listener selected virtual position; and processing the modified sound data corresponding to the listener selected virtual position to generate the left and right ear audio signals.

Another aspect of the present invention is a method of generating left and right ear audio signals for simulating, relative to a virtual position and a listener selected virtual head orientation, an experience of sounds emanating from a three-dimensional space, comprising the steps of: receiving position data indicative of the virtual position, and orientation data indicative of the listener selected virtual head orientation; receiving audio data including for individual sounds arriving at the virtual position, sound data organized in time periods, and emanating locations respectively corresponding to the time periods; providing the sound data to left and right digital filters computing left and right head related transfer functions corresponding to the virtual position and head orientation, and to the emanating position of the individual sound; summing, for corresponding times, outputs of the left digital filters individually corresponding to individual sounds emanating from the three-dimensional space, and summing, for corresponding times, outputs of the right digital filters individually corresponding to individual sounds emanating from the three-dimensional space; and generating the left ear audio signal from the summed outputs of the left digital filters such that the left ear audio signal is indicative of sounds heard by a listener's left inner ear from the position and the listener selected virtual head orientation, and generating the right ear audio signal from the summed outputs of the right digital filters such that the right ear audio signal is indicative of sounds heard by a listener's right inner ear from the position and the listener selected virtual head orientation.

Another aspect of the present invention is a method of providing to a viewer, a simulated viewing experience from the perspective of a virtual position selected by the viewer of an event involving objects in a three-dimensional space, comprising the steps of: receiving position data indicative of the viewer selected virtual position; receiving encoded data indicative of the locations, shapes, surface geometries, and colors of the objects in the three-dimensional space at corresponding successive points in time associated with the event; processing the received position data and the received encoded data to generate a display signal indicative of the objects in the three-dimensional space at the corresponding successive points in time as viewed from the perspective of the viewer selected virtual position; and providing the display signal to a display unit viewed by the viewer.

Another aspect of the present invention is a method of providing to a viewer during a viewing session, a simulated viewing experience from the perspective of a virtual position selected by the viewer of an event involving live-action objects interacting among non-moving background objects in a three-dimensional space, comprising the steps of: receiving data associated with the non-moving background objects in the three-dimensional space; thence, receiving, at a video frame rate during the viewing session, data associated with the live-action objects; receiving periodically, data indicative of the virtual position selected by the viewer; rendering, at the video frame rate during the viewing session, at least one frame of display data from the received data associated with the non-moving background objects, the video frame rate received data associated with the live-action objects, and the periodically received data indicative of the virtual position, such that the rendered at least one frame of display data is indicative of a viewing experience from the perspective of the viewer selected virtual position of the event involving live-action objects interacting among the non-moving objects in the three-dimensional space; and providing, at the selected frame rate, the simulated viewing experience from the at least one frame of display data rendered at the video frame rate.

Additional objects, features and advantages of the various aspects of the present invention will become apparent from the following description of its preferred embodiment, which description should be taken in conjunction with the accompanying drawings.

BRIEF DESCRIPTION OF THE DRAWINGS

FIGS. 34A and 34B illustrate, as examples, certain processing steps performed by the MPEG decoder of the video rendering subsystem and one or the other of the right and left renderers of FIG. 31, to read, decompress, and store the background and live action data into the shared memory of the video rendering subsystem;

FIG. 41 illustrates, as examples, a number of registers included in the register area of the audio rendering subsystem of FIG. 37, for storing such things as the source locations associated with each data chunk in each source buffer and a start time associated with each data chunk in each source buffer;

DESCRIPTION OF THE PREFERRED EMBODIMENT

VRTV System Overview

Figure 1:
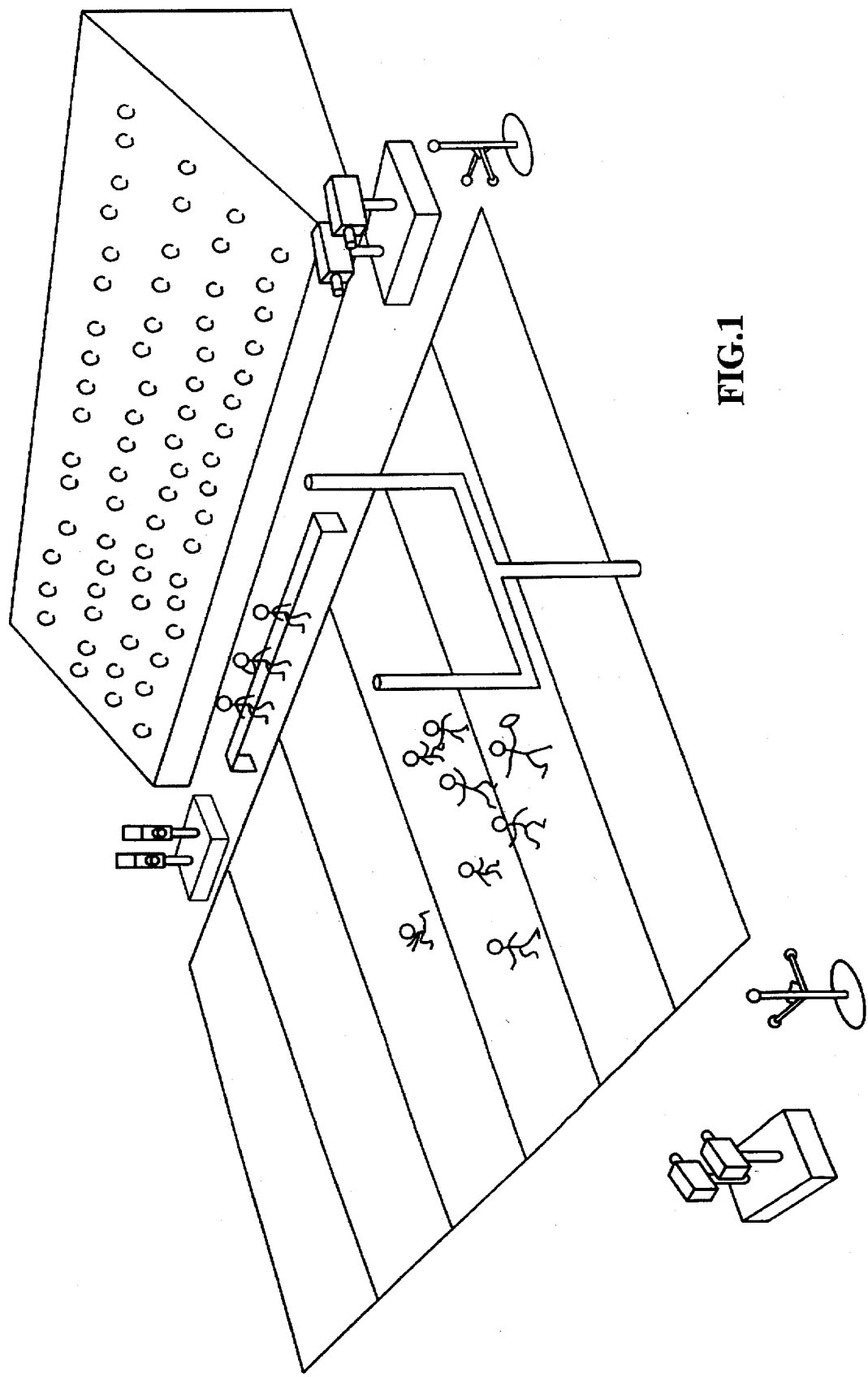
FIG. 1 illustrates, as an example of a live-action event, a perspective view of a football game.

FIG. 1 illustrates one example of a live-action event for which a virtual reality television ("VRTV") system may be employed to provide system viewers with a highly realistic experience of the event through a digital medium (i.e., a broadcasted or recorded version of the event). The live-action event takes place within a three-dimensional area called a live-action space. In this example, the live-action event is a football game and its corresponding live-action space is preferably the football field and its immediate periphery, such as, for examples, the sidelines and end zones.

The live-action event is captured by a number of video cameras and microphones situated proximate to or within the live-action space. A number of processors receive the video and sound signals of the video cameras and microphones, and generate a data stream including data representative of the shapes and colors of live action objects, such as, for examples, the football players and the football; the individual sounds emanating from the live action space, such as, for examples, the shouts, thuds, and footsteps of the football players; images of the background against which the live action objects interact, such as, for example, the football field and stadium; and ambient sounds emanating from without the immediate live action space, such as, for example, the crowd sound in the grandstands and the voices of commentators. The data stream can then be transmitted "live" to remote viewers and/or stored on storage media for later transmission, or reproduced on low cost, high density storage media, such as, for example, CD-ROM, for mass distribution.

The viewer's viewing experience of the live action event is enhanced in at least three ways using VRTV. First, unlike conventional television broadcasting systems, the viewer is not restricted to experiencing the live action event solely from the perspective of the cameras and microphones capturing the event. Using VRTV, the viewer is provided with a visual and audio illusion of experiencing a live action event from a so-called "virtual viewpoint" which may be any point in the live action space. For example, the viewer may experience a football game from a position immediately behind the quarterback, creating a vivid experience of the pass rush. Alternatively, the viewer could watch the pass receivers from a viewpoint in the defensive backfield, or could view the game from a viewpoint 100 feet over the field, looking downwards. Selection of the virtual viewpoint is preferably made by the viewer, but may also be made by a broadcast editor. Second and third, the viewer is provided with a three-dimensional viewing experience relative to his or her virtual viewpoint, and a listening experience recreating the individual sounds emanating from within the live action space, as they would be heard from the virtual viewpoint.

Although VRTV is especially attractive for providing viewers a highly realistic visual and aural experience of sporting events, VRTV can also be used to provide a form of entertainment, similar to movies, in which the live-action space changes from scene to scene. One scene might occur in the live-action space of a room with actors, while another scene might take place in a street with actors and cars. The data stream for each scene is produced using the techniques described herein; these streams are edited and assembled into a final stream, which is then stored and played back. When viewing such a "VRTV movie", the viewer can move around within the live-action space of each scene.

In the following description, the live-action space is assumed to have a 3-D orthonormal coordinate system whose coordinates are referred to herein as "world coordinates". The viewer's apparent position, represented by a point (x, y, z) in world coordinates, and apparent orientation are together, referred to herein as his or her "virtual viewpoint." To predetermine in world coordinates, the precise positions of certain objects in and around a live-action space, such as, for examples, cameras and microphones, conventional surveying techniques can be used.

Figure 2:
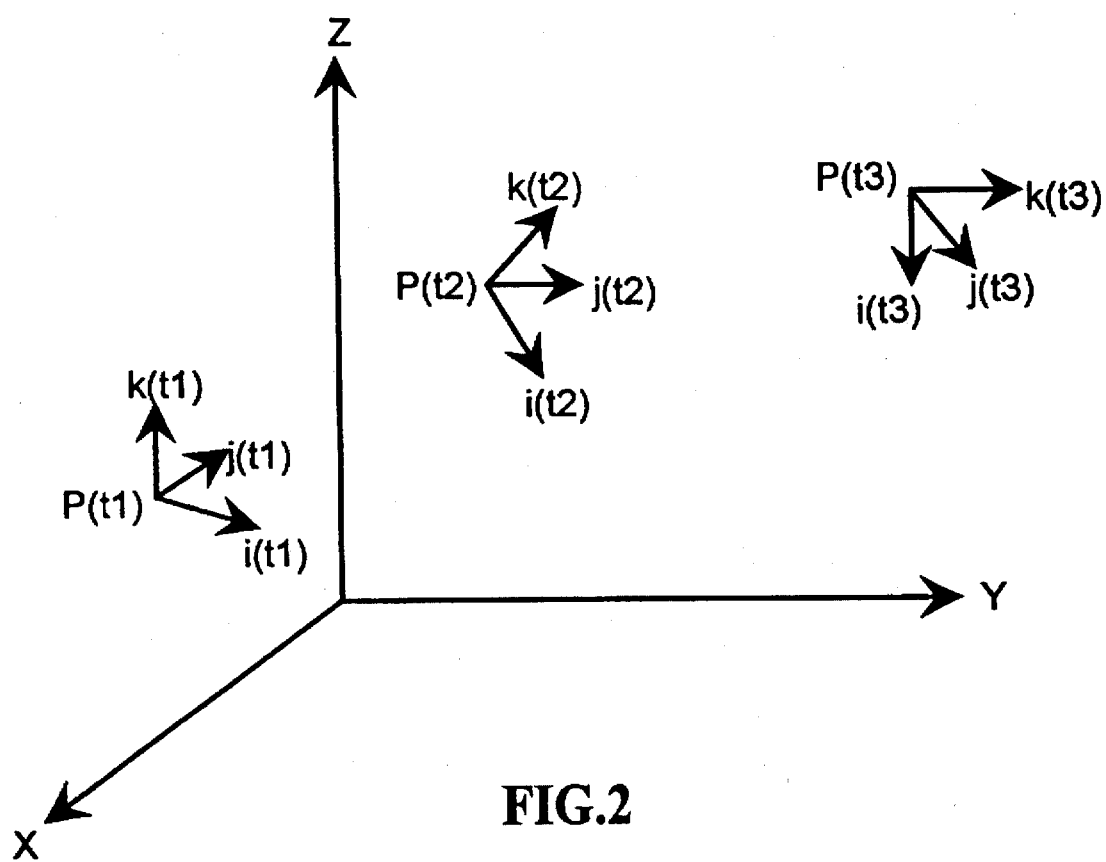
FIG. 2 illustrates, as an example, the positions and orientations of a moving object at three different times with respect to a fixed, world coordinate system.

FIG. 2 illustrates, as an example, a position and an orientation of an object at three different times (t1, t2, and t3) with respect a world coordinate system having X, Y and Z axes. The position of the object is located at a point p(t) (generally represented by a vector (x,y,z) in world coordinates), and its orientation defines a "local coordinate system" having the object's position p(t) as its origin and i(t), j(t), and k(t) axes respectively indicative of the object's front, side, and up orientations, as a function of time. For example, if the object is a camera, the i axis represents the direction in which the camera is pointing, and if the object represents a viewer, the i axis represents the direction in which the viewer is facing.

Figure 3:
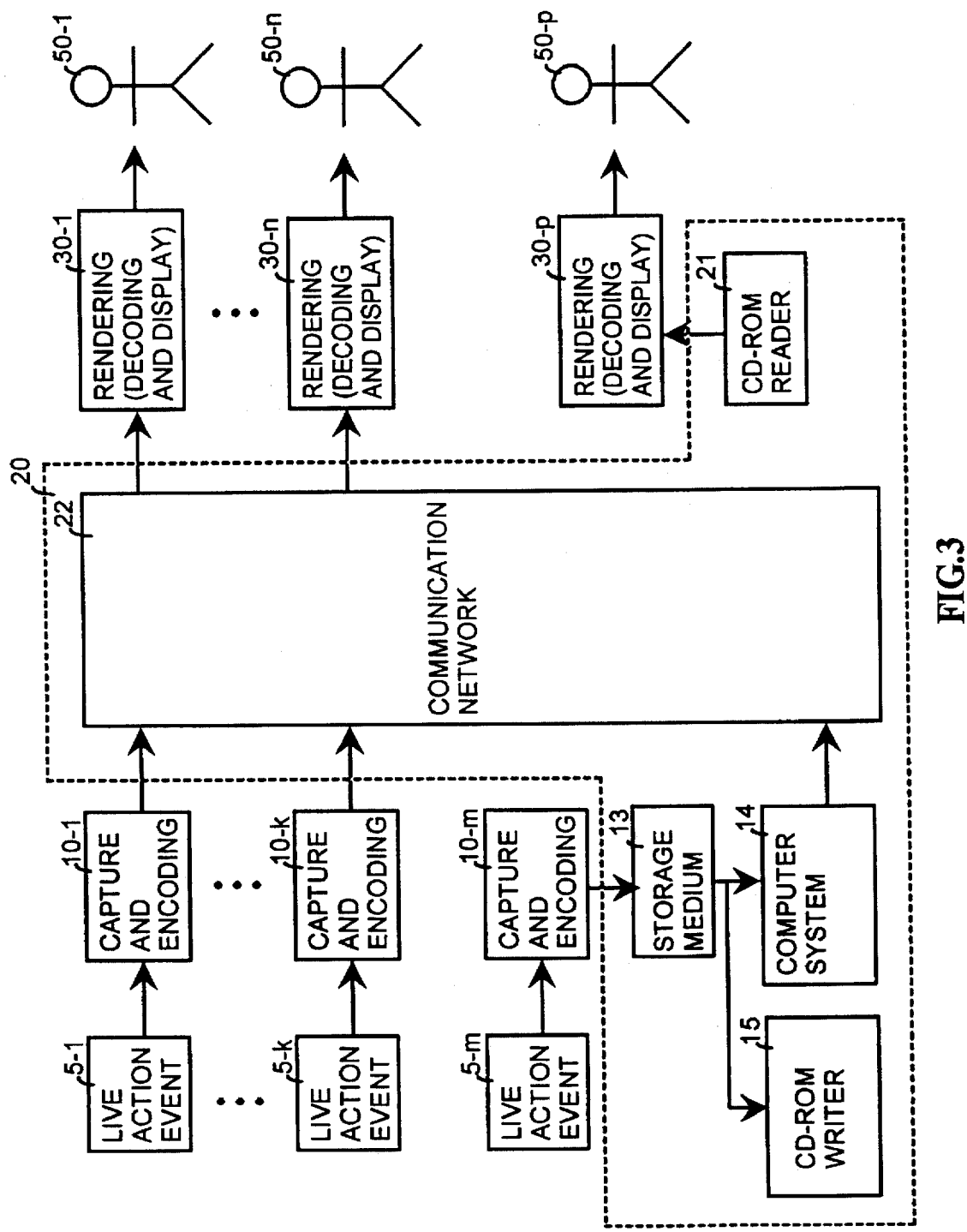
FIG. 3 illustrates, as an example, a block diagram of a VRTV system utilizing aspects of the present invention.

FIG. 3 illustrates, as an example, a block diagram of a VRTV system utilizing various aspects of the present invention. The VRTV system includes at least one capture and encoding subsystem, e.g., 10-1 to 10-m, which captures 3-D image and sound information of a live action event, e.g., 5-1 to 5-m, and generates an encoded digital data stream. This data stream may then be sent to a distribution subsystem 20 which conveys the data stream to viewers, either immediately or at a later time.

The distribution subsystem 20 may use any one or combination of several mechanisms for distributing the data stream to viewers. First, the data stream can be transmitted immediately through a communication network 22 to the premises of one or more viewers selecting that live action event for viewing. In this mode, the distribution subsystem 20 preferably uses a standard communication network, such as, for example, ATM (Asynchronous Transfer Mode), which can provide the needed bandwidth (e.g., 100 Mb/sec), and which can "multicast" the same data stream to many receivers simultaneously. Descriptions of such communication networks are well documented in publicly available literature and accordingly, readily available to those wishing to practice the various aspects of the present invention. For example, additional details on ATM may be found in *Networking Standards* by W. Stallings, Addison/Wesley 1993, p. 270–312, which additional details are herein incorporated by reference.

Secondly, the distribution subsystem 20 may store the data stream on a storage medium 13, for example a magnetic disk, when the live action event is subsequently requested by a viewer, the composite data stream can be read by a computer system 14 from data stored in the storage medium 13, and transmitted through the communications network 22 to the viewer premises.

Thirdly, the distribution subsystem 20 may store the data stream on a storage medium 13, for example a magnetic disk, and then copy some or all of the data stream to a mass-produced storage medium such as a compact disk (CD) or other optical disk, using a CD-ROM writer 15. These mass-produced storage media are then distributed to viewers, whose rendering systems are equipped with CD-ROM reader devices 21 for reading the media.

At a receiving end, the VRTV system includes at least one rendering system, e.g., 30-1 to 30-n, which processes the transmitted digital data stream to render a full, 3-D video and audio experience of a viewer selected live action event to a viewer. In the VRTV system of the present invention, each viewer can select one of the live action events, 5-1 to 5-m, that she or he would like to view, and dynamically control his or her apparent viewing position and orientation while experiencing the selected live action event.

Figure 4:
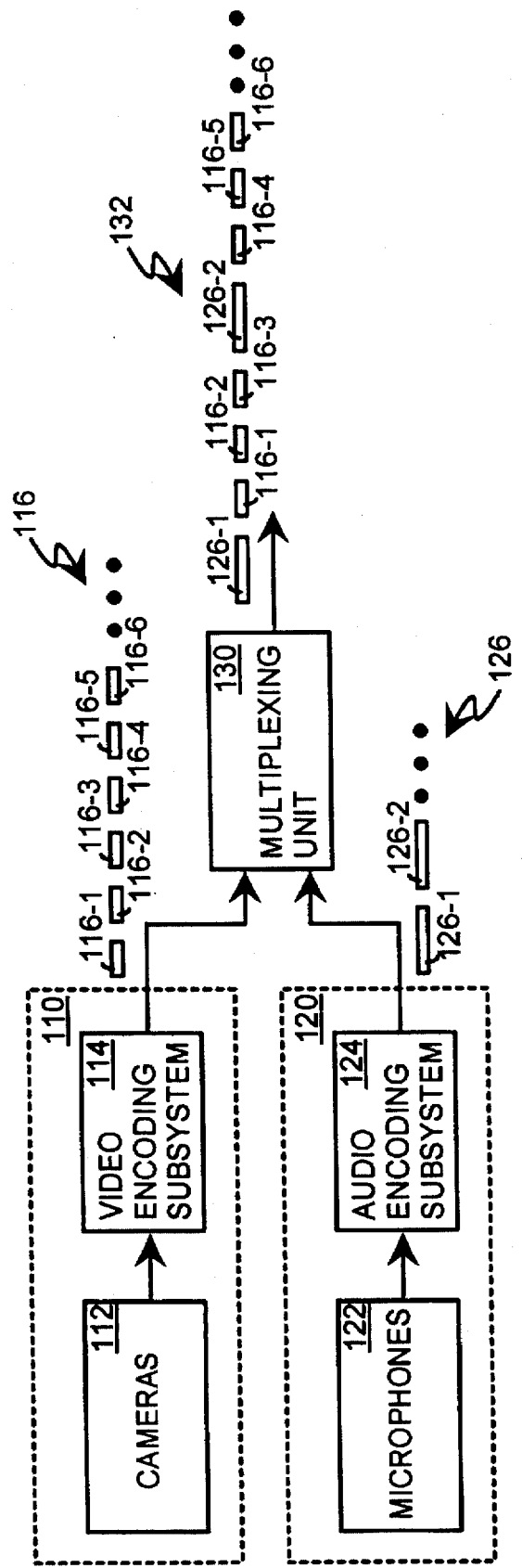
FIG. 4 illustrates, as an example, a block diagram of a representative one of the capture and encoding subsystems of FIG. 3 utilizing aspects of the present invention.

FIG. 4 is a block diagram illustrating, as an example, a representative one of the capture and encoding subsystems, 10-1 to 10-m, of FIG. 3, which representative one is referred to hereinafter simply as capture and encoding subsystem 10 since capture and encoding subsystems, 10-1 to 10-m, are similarly constructed. The capture and encoding subsystem 10 includes a video capture and encoding subsystem 110, and an audio capture and encoding subsystem 120.

The data stream 132 is made up of data units referred to herein as "chunks". The video capture and encoding subsystem 110 includes a plurality of cameras 112 and a video encoding subsystem 114, and generates a stream of video data chunks 116, wherein each video data chunk (e.g., 116-1) represents a period of time and the sequence of video data chunks in the stream represent adjacent non-overlapping periods. Likewise, the audio capture and encoding subsystem 120 includes a plurality of microphones 122 and an audio encoding subsystem 124, and generates a stream of audio data chunks 126, wherein each audio data chunk (e.g., 126-1) represents an individual sound over a short period of time. Since the data stream 126 may represent multiple concurrent sounds, the sequence of audio data chunks in the stream may represent overlapping periods.

The time periods represented by the video and audio data chunks may differ. For example, the time period for the video data chunks preferably corresponds to a fixed rate of, for example, 30 data chunks per second, and the time period for audio data chunks is preferably about 0.1 second.

In addition to respectively carrying 3-D surface/color and sound information about the live-action space, the data stream may also contain so-called "special chunks" containing other types of information. For one example, the data stream may contain a chunk that describes the region of the live-action space in which the virtual viewpoint can be positioned. For another example, the data stream may include chunks specifying the positions of individual cameras and microphones.

Figures 14A, 14B, 14C:
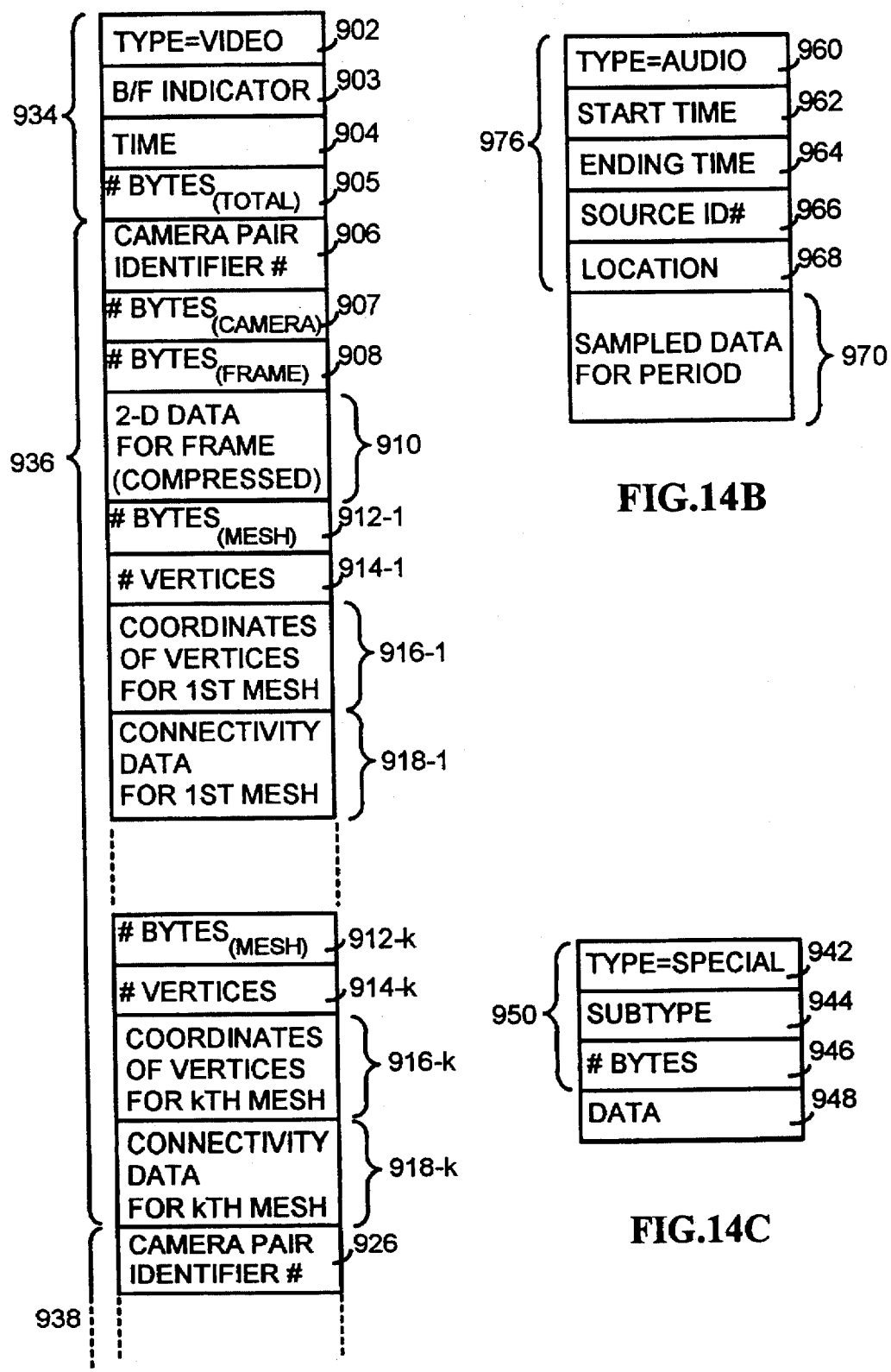
FIG. 14A illustrates, as an example, a portion of the stream of video data segments including video data segments generated by the video capture and encoding subsystem of FIG. 8.
FIG. 14B, illustrates, as an example, a portion of the audio data stream including audio data segments generated by the audio capture and encoding subsystem of FIG. 17A.
FIG. 14C, illustrates, as an example, a portion of the composite video and audio data stream including special data segments generated by the capture and encoding system of FIG. 4.

In addition to its respective data, each data chunk has a header including certain information about its data, such as, for example, its type (e.g., audio or video, data or special), and its start time and its ending time or length. For examples, FIG. 14A illustrates a video data chunk including its header 934 followed by video data, FIG. 14B illustrates an audio data chunk including its header 976 followed by audio data, and FIG. 14C illustrates a special data chunk including its header 950 followed by special data.

A multiplexing unit 130 receives the video and audio data streams, 116 and 126, respectively, and generates a composite data stream 132. The composite data stream 132 preferably is organized as an combination of audio and video chunks, ordered by increasing start time. For example, in FIG. 4, the composite data stream 132 sequentially includes audio data chunk 126-1 followed by video data chunks 116-1, 116-2 and 116-3, followed by audio data chunk 126-2, etc.

Figure 5:
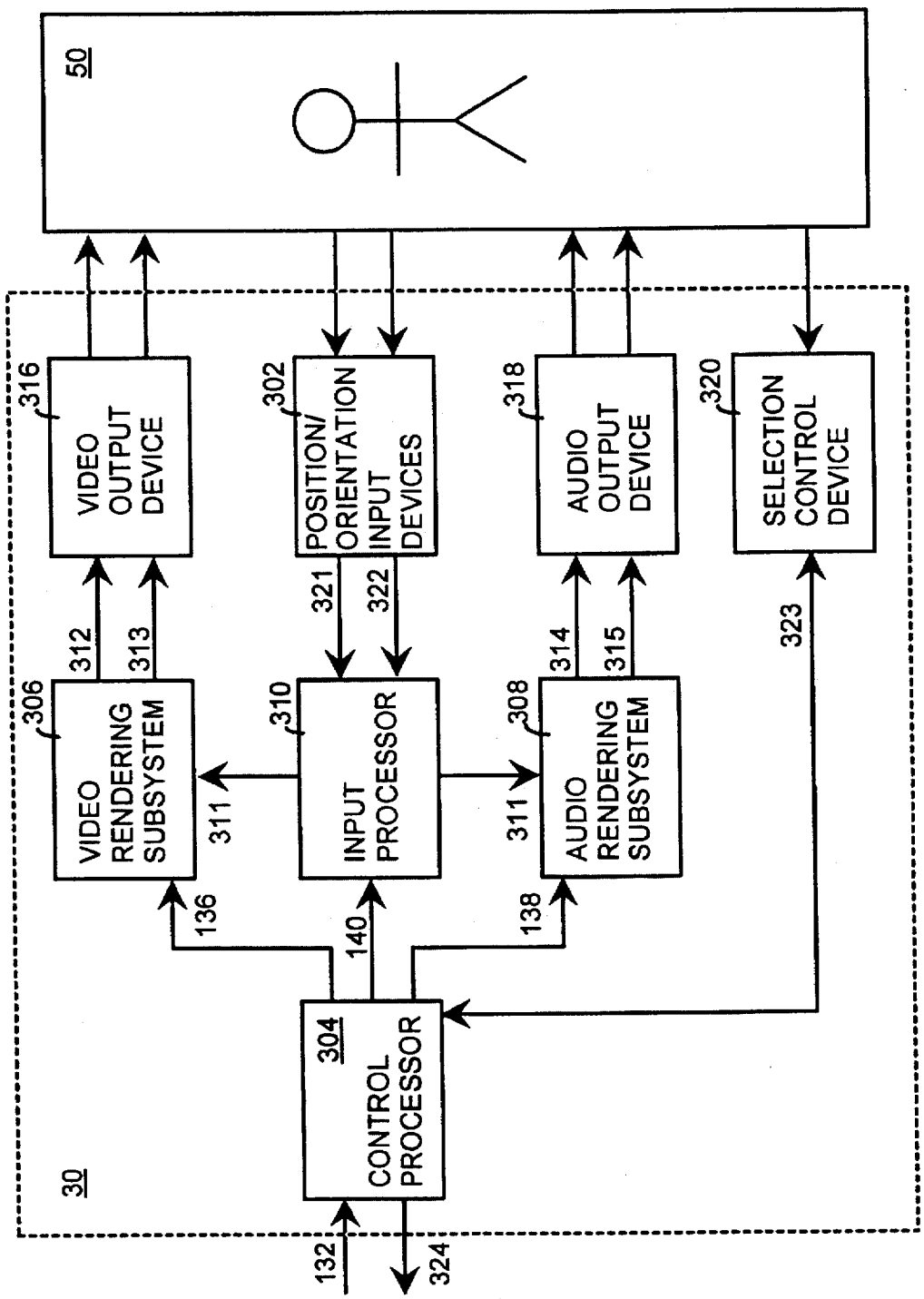
FIG. 5 illustrates, as an example, a block diagram of a representative one of the rendering subsystems of FIG. 3 utilizing aspects of the present invention.

FIG. 5 illustrates, as an example, a block diagram of a representative one of the rendering subsystems, 30-1 to 30-n, of FIG. 3, which is referred to hereinafter simply as rendering subsystem 30 since the rendering subsystems, 30-1 to 30-n, are similarly constructed. The rendering subsystem 30 is preferably controlled by one viewer 50, although it may service more than one viewer at a time.

To initiate selection of a live action event for viewing, a viewer 50 runs a program on a computer or special purpose selection control device 320 of the rendering subsystem 30, that displays a list of broadcasts and stored programs available from the distribution subsystem 20, and provides means for the viewer to indicate his or her choice of which one to watch. After the viewer indicates her or his choice, the rendering subsystem 30 sends a selection control signal 324 to the distribution subsystem 20, specifying the selected program. The distribution subsystem 20 then begins sending the program's data stream to the rendering subsystem 30, for example, by instructing the communication network 22 to add the rendering subsystem 30 to the set of destinations for a broadcast or by causing a CD-ROM reader 21 connected to the rendering subsystem 30 to be activated. When the viewer has finished viewing the program, the rendering subsystem 30 signals the distribution subsystem 20 to stop the flow of data.

The control processor 304 receives the data stream from the distribution subsystem 20. It extracts the audio chunks and video chunks from the data stream, and sends them to the audio rendering 308 and the video rendering subsystem 306 respectively. It extracts the special chunks from the data stream and sends them to the audio rendering 308, the video rendering subsystem 306, or the input processor 310, as appropriate.

While the rendering subsystem 30 is receiving a data stream from the distribution subsystem 20, the rendering subsystem 30 processes the data stream 132 to give the viewer the illusion of being present at the live action event. In addition to providing 3-D images and sound, the rendering subsystem 30 allows the viewer to manipulate one or more position/orientation input devices 302 that allow him or her to vary her or his virtual viewpoint with respect to the live action event.

The video rendering subsystem 306 receives the stream of video data chunks 136 from the control processor 304 and the current virtual viewpoint from the viewer input processor 310, and estimates from such information, the right-eye and left-eye 2-D images that a viewer would see if actually located at the position and orientation of the current virtual viewpoint at the selected live action event. The estimated right-eye images are then provided at 30 frames per second, for example, to the video output device 316 through the right-eye channel 312, and the estimated left-eye images are provided at 30 frames per second, for example, to the video output device 316 through the left-eye channel 313 of the video output device 316.

Likewise, the audio rendering subsystem 308 receives the stream of audio data chunks 138 from the control processor 304 and the current virtual viewpoint from the input processor 310, and estimates from such information, the right-ear and left-ear sounds that a viewer would hear if actually located at the position and orientation of the current virtual viewpoint at the selected live action event. The estimated right-ear sounds are then provided to the audio output device 318 through the right-ear channel 314 of the audio output device 318, and the estimated left-ear sounds are provided to the audio output device 318 through the left-ear channel 315 of the audio output device 318.

Video Capture and Encoding System

Figure 6:
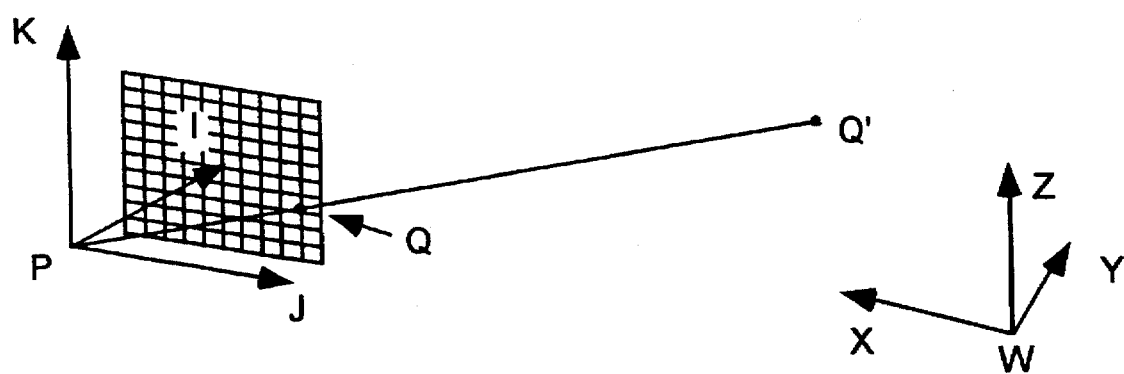
FIG. 6 illustrates, as an example, how a point Q' in a world coordinate system of a live action space, maps onto a retinal plane of one of the plurality of cameras capturing a live action event taking place in the live action space.

FIG. 6 illustrates two coordinate systems used by the video capture and encoding system 110. The first coordinate system, "world coordinates" (indicated in FIG. 6 as an origin W and unit vectors X, Y and Z), provide a fixed underlying coordinate system. The second coordinate system, "local coordinates" (indicated in FIG. 6 as an origin P and unit vectors I, J and K), relates to either the current virtual viewpoint of the viewer or certain objects, such as, for example, cameras. In this coordinate system, the origin P is the optical center of the camera, the vector I is the optical axis of the camera, and the vector J is the vertical direction in the camera's retina. Based on a camera's position and orientation, it is straightforward to convert between world coordinates and the camera's local coordinates.

Third, each camera's retina (typically a charge-coupled device, or CCD) consists of a rectangular array of pixels. An "image coordinate" system assigns to each pixel a pair of integers (U, V) where U is the row number and V is the column number of the pixel in the array, so that the lower-left pixel has image coordinates (0, 0). Based on a description of a camera's properties, such as its focal length and the size and position of its retina, it is straightforward to convert between image coordinates and the camera's local coordinates. FIG. 6 also shows that a feature visible in a pixel Q of a camera's retina corresponds to a point Q' in the live-action space, where Q' lies on a line passing through both Q and the camera's optical center P.

Figure 7B:
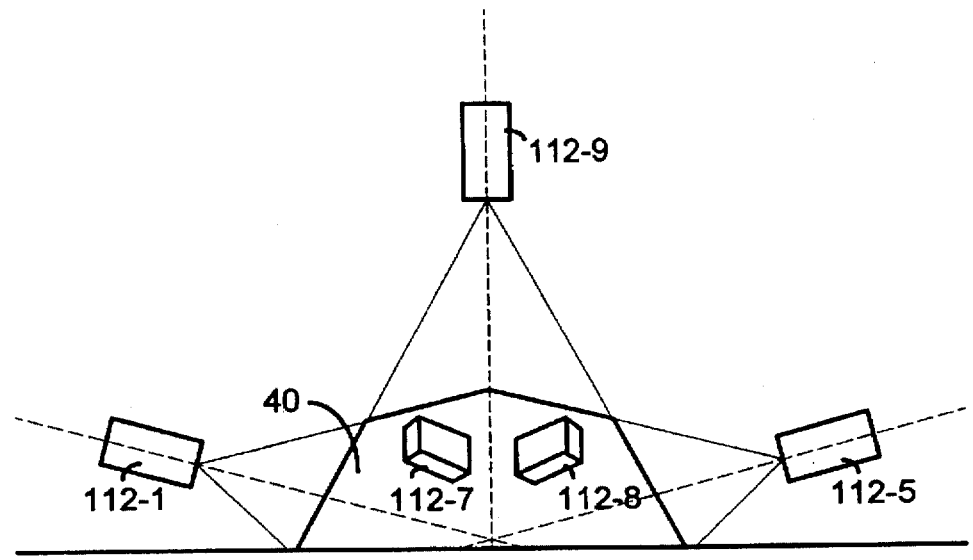
FIGS. 7A and 7B respectively illustrate, as an example, a top plan view and a side view of one possible configuration, utilizing aspects of the present invention, including the number, positions, and orientations of a plurality of cameras capturing a live action event.
Figure 7A:
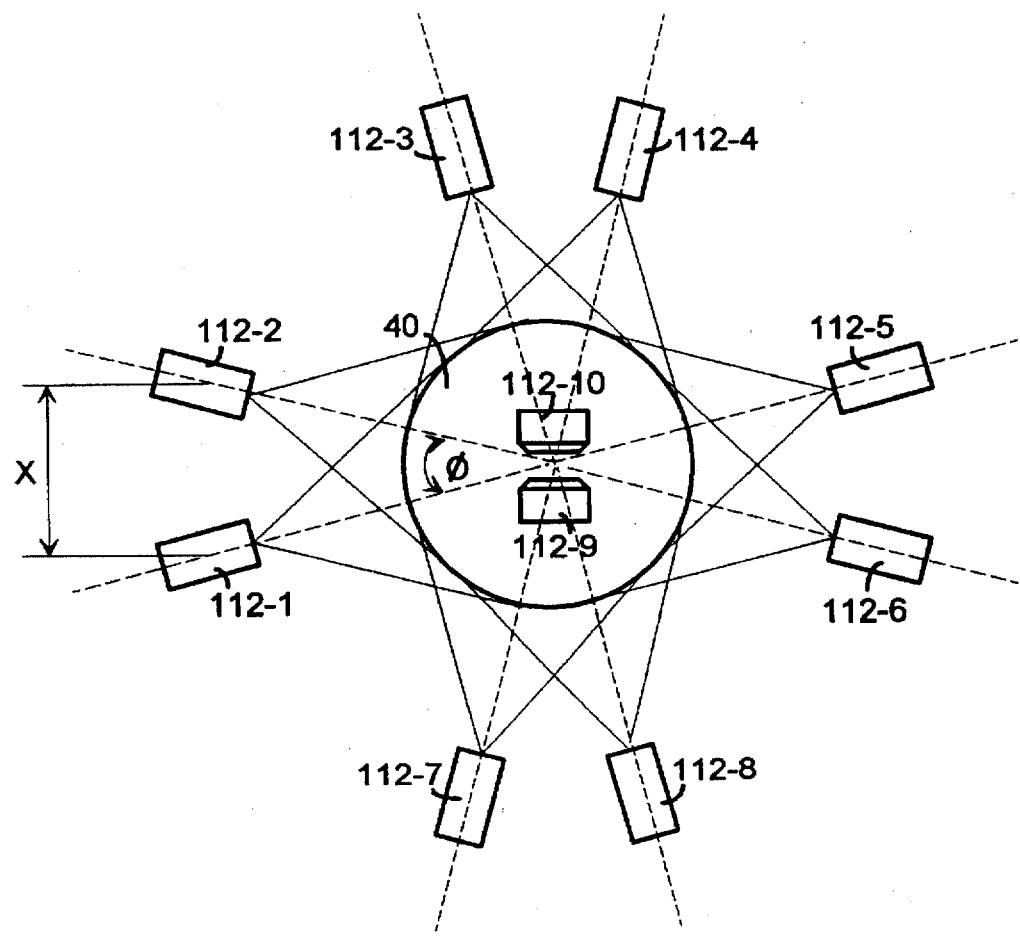

FIGS. 7A and 7B illustrate, as an example, one possible configuration for the number, positions, and orientations of the plurality of cameras 112. In particular, FIG. 7A illustrates a top plan view including a coverage area 40 of the cameras 112, and FIG. 7B illustrates a horizontal cross-sectional view including the coverage area 40 of the cameras 112. The coverage area 40 of the plurality of cameras 112 is preferably selected such that the live action event being captured, occurs within the coverage region 40.

The plurality of cameras 112 are organized into camera pairs (e.g., 112-1 and 112-2) to facilitate 3-D vision. One camera of a pair (e.g., 112-1) captures a "right eye" image of the live action event, and the other camera of the pair (e.g., 112-2) captures a "left eye" image of the live action event. The cameras of a pair (e.g., 112-1 and 112-2) are positioned relative to each other such that their optical centers are separated by a spacing "X" which is preferably large enough to produce adequate disparity resolution, but small enough to avoid excessive occlusions (i.e., objects visible from one camera but not the other). In particular, the optimal separation between the cameras in each camera pair depends on a number of factors, including, for examples, the resolutions of the cameras, and the size and physical lay-out of the live-action space. As a starting point, the separation between the cameras of a pair (e.g., 112-1 and 112-2) may be initially set by focusing the cameras upon a point in the live action space, such as, for example, its geometric center, and separating the two cameras until their optical axes form an angle "$\phi$" of 4 degrees.

The preferred number of camera pairs also depends on a number of factors, including, for examples, the size of the live-action space and the complexity of the live action event taking place. Since a given pair of cameras can see only one side of the live action event, complete coverage of the live action event requires at least two pairs of cameras. For a live action event having a complex 3-D structure, such as, for example, a football game, and/or for a live action event in which the area of interest is mobile, additional pairs must be used. FIGS. 7A and 7B depict one example employing five pairs of cameras, wherein four camera pairs are respectively positioned around four corners of the live-action space, and one pair of cameras is positioned above the live-action space.

Each of the plurality of cameras 112 is "calibrated", for examples, to estimate its position in world coordinates, its initial orientation (i.e., ahead, left, and up vectors), its optical parameters (e.g., focal length), its sensor parameters (e.g., CCD sensitivity), and its distortion. Such calibration may be done, for example, by presenting the cameras with target objects of known size, position, orientation, and color, and analyzing the resulting images. For additional details, see, e.g., Faugeras, Olivier, *Three-Dimensional Computer Vision*, The MIT Press, 1993 (pages 33–68), which details are incorporated herein by this reference.

During video capture of the live-action event, a number of camera parameters may be adjusted either manually or automatically to enhance the captured images. For example, the aperture, focus distance and focal length of a camera may be varied by adjusting certain controls. When such variations are done, however, they are preferably done identically to each camera in a camera pair, and are transmitted to the video encoding system 114, so that the video encoding subsystem 114 can compute and utilize a "usable depth of field" which is defined herein as a range of depths, associated with a given aperture, in which image blur due to defocusing is below a fixed tolerance. In conjunction with varying the focus distances of the cameras in a camera pair, the relative orientation of the cameras in the pair may also be adjusted automatically, for example so that their optical axes intersect at a distance equal to their focus distance.

It may also be advantageous to allow the positions and orientations of the plurality of cameras 112 to change while capturing a live action event. This would allow possibly fewer camera pairs to be used, and provide possibly better capturing of a complex live action event. when such changes are allowed, they are preferably applied identically to both cameras in a pair. To accommodate such flexibility, the camera mounts may be equipped with sensors that detect the changes and transmit the changes periodically to the video encoding subsystem 114 so that it can make the appropriate corrections when generating the video data segments 116.

Figure 8:
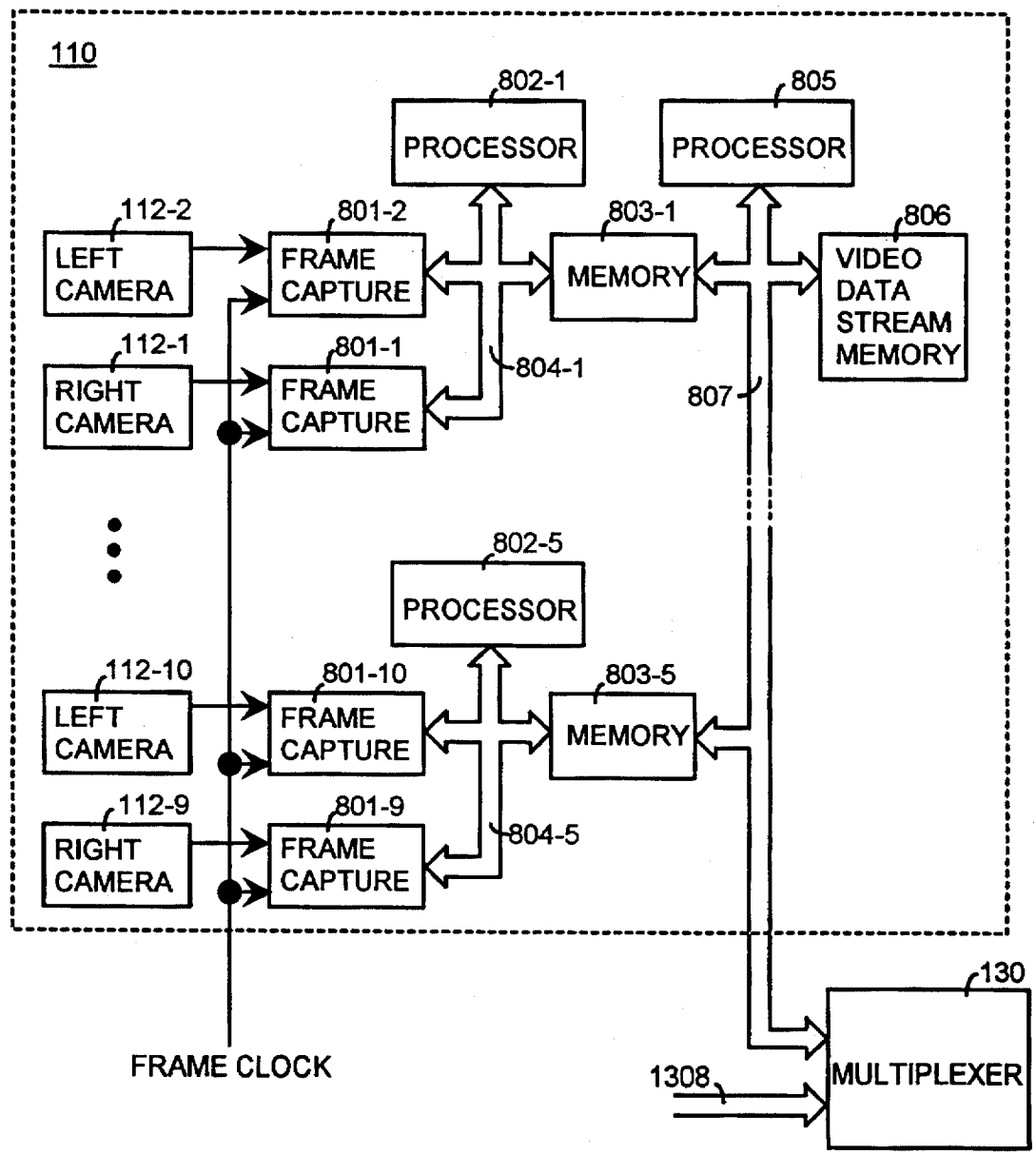
FIG. 8 illustrates, as an example, a block diagram of the video capture and encoding subsystem of the capture and encoding subsystem of FIG. 4, utilizing aspects of the present invention.

FIG. 8 illustrates, as an example, a block diagram of the video capture and encoding subsystem 110. Cameras, 112-1 to 112-10, as shown, for example, in FIGS. 7A and 7B, comprise the video capture portion (i.e., cameras 112) of the video capture and encoding subsystem 110. Frame capture units, 801-1 to 801-10, processors, 802-1 to 802-5, memories, 803-1 to 803-5, subsystem processor 805, and video data stream memory 806 comprise the video encoding portion (i.e., video encoding subsystem 114) of the video capture and encoding subsystem 110. The video encoding subsystem processor 805 transmits the stream of video data chunks 116 to one input of a multiplexer 130 (e.g., via bus 807), while its counterpart (e.g., 1306 in FIG. 17A) in the audio capture and encoding subsystem 120 transmits the stream of audio data chunks 126 to another input of the multiplexer 130 (e.g., via bus 1308).

The frame capture units 801-1 to 801-10 all receive a common clock signal, which is used to derive their frame times. This clock signal is preferably shared with the audio encoding system, so that the time stamps in both audio and data chunks are relative to a common time system.

Preferably, each video camera (e.g., 112-1) has its own dedicated frame capture unit (e.g., 801-1) which in turn, has conventional means (not shown) for capturing a 2-D bit-mapped frame once every video frame cycle (e.g., 30 times a second) from a video signal received from the camera, and a frame buffer (not shown) for storing the captured 2-D bit-mapped frame. Preferably, each pair of cameras (e.g., 112-1 and 112-2) has a dedicated processor (e.g., 802-1) for processing the 2-D bit-mapped frame data stored in the frame buffers of their corresponding frame capture units (e.g., 801-1 and 801-2), and a memory (e.g., 803-1) for storing data processed by the dedicated processor. Alternatively, the dedicated processor for each camera pair may be replaced with several parallel operating processors to enhance performance. In this configuration, some processors may generate the compressed 2-D frame data (e.g., 910 in FIG. 14A) for each video data chunk, and the remaining processors may generate the mesh data (e.g., 914–918 in FIG. 14A) for each video data chunk. Also, instead of individual memories for each camera pair, a single memory may alternatively be shared by all of the camera pairs.

To generate the compressed 2-D frame data (e.g., 910 in FIG. 14A), each camera pair's dedicated processor (e.g., 802-1) preferably performs a version of the MPEG video compression algorithm (e.g., MPEG-2) on the 2-D bit-mapped frame data stored in the frame buffer of its corresponding left frame capture unit (e.g., 801-2). For additional details on such MPEG video compression techniques, see, e.g., Didier Le Gall, "MPEG: A Video Compression Standard for Multimedia Applications," *Communications of the ACM*, April 1991, Vol. 34, No. 4, pp. 47–58, which details are incorporated herein by this reference.

Figure 9:
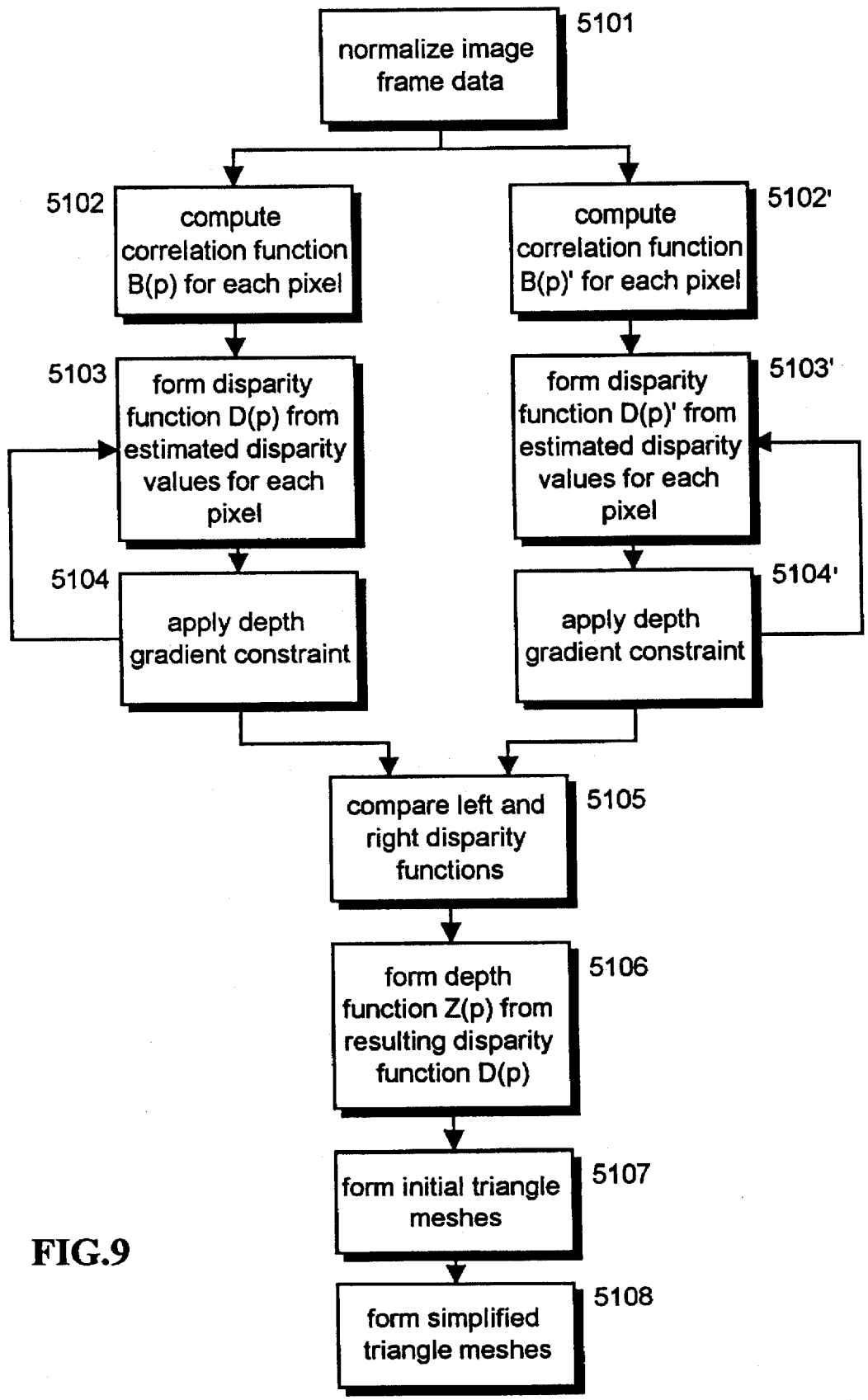
FIG. 9 illustrates, as examples, processing steps utilizing aspects of the present invention and performed by each camera pair's dedicated processor to generate the mesh image data for its camera pair.

FIG. 9 illustrates, as an example, certain processing steps performed by each camera pair's dedicated processor (e.g., 802-1) to generate the mesh data (e.g., 912-1 to 918-k in FIG. 14A) for its camera pair. A triangle mesh includes a set of triangles in 3-D space having the property that each triangle shares a common edge with at least one other triangle in the set. A triangle mesh is preferably represented by a data structure comprising a list of 3-D vertices (e.g., 916 in FIG. 14A), together with connectivity information giving, for each triangle in the mesh, a list of the indices, in the vertex list, of its vertices (e.g., 918 in FIG. 14A). Such a data structure is particularly efficient in providing a compact representation of 3-D surfaces. To distinguish between front and back sides of a triangle, the "orientation" of the triangle is encoded in the triangle mesh data structure by listing the triangle's vertices in clockwise order as viewed from the front side (i.e., camera side). For additional details on triangle meshes, see, e.g., Hoppe, Hugues et. al., "Mesh Optimization," COMPUTER GRAPHICS Proceedings, Annual Conference Series, 1993, pp. 19–25, which details are incorporated herein by this reference.

In a first step 5101, each camera pair's dedicated processor (e.g., 802-1) "normalizes" the image frames stored in the frame buffers of the frame capture units (e.g., 801-1 and 801-2) of its respective camera pair by (a) correcting the image frame data captured by each camera for the "distortion" of that camera (i.e., the projective nonlinearity of its lens and retina), as measured during calibration), (b) correcting the image data captured by each camera by a CCD sensitivity adjustment, as measured during calibration, and (c) applying, for the camera pair, a projective transformation that maps epipolar lines to horizontal scan lines, which ensures that corresponding points in the camera pair's two images lie on approximately the same scan line. For additional details, see, e.g., Faugeras, Olivier, *Three-Dimensional Computer Vision*, The MIT Press, 1993 (pages 188–189), which details are incorporated herein by this reference.

In a second step 5102, each camera pair's dedicated processor (e.g., 802-1) computes, for each pixel P in the left image, a correlation function B(p) by correlating a rectangular window centered at the pixel P in the left image against a corresponding rectangular window in the right image shifted to the left through a range of values corresponding to the usable depth of field. For example, the rectangular window centered at the pixel Px located at image coordinates $(u_x, v_x)$, i.e., row $u_x$ and column $v_x$, may include all pixels in rows u−1, u, and u+1 which are between columns v−Δv and v+Δv. Calculation of the correlation function B(p) is then performed in a conventional way using, for example, three digital numbers corresponding to the color of each pixel. The peaks in the resulting correlation function B(p) indicate possible matches (i.e., corresponding points in the camera pair's two images). For additional details, see, e.g., Faugeras, Olivier, *Three-Dimensional Computer Vision*, The MIT Press, 1993 (pages 189–206), which details are incorporated herein by this reference.

The usable depth of field is a function of the apertures and focus distances of the cameras, and is calculated periodically by the camera pair's dedicated processor (e.g., 802-1) using updated values for these parameters provided by means (not shown) which measure changes in these values. Since maximum disparity occurs at the closest depth plane in the usable depth of field, the range over which the correlation is calculated is determined by this plane.

In third and fourth steps, 5103 and 5104, each camera pair's dedicated processor (e.g., 802-1) calculates disparity values for pixels in the left image by forcing the possible matches (i.e., left and right image pixels corresponding to an identical point on a viewed object) indicated by the correlation function B(p) for each pixel P in the left image, to satisfy certain bounds with respect to a depth gradient associated with the pixel. Each given camera pair needs to only report surfaces whose normals are within some angle A with respect to the optical axes of the cameras, since more oblique surfaces will be detected by other camera pairs. Accordingly, adjacent pixels having respective depth values differing by more than some maximum depth gradient, need not both be reported since pixel disparity values are inversely related to their corresponding depth values, the maximum depth gradient constraint is equivalent to a gradient bound on a disparity function D(p) including disparity values for the pixels in the left image.

Figure 10B:
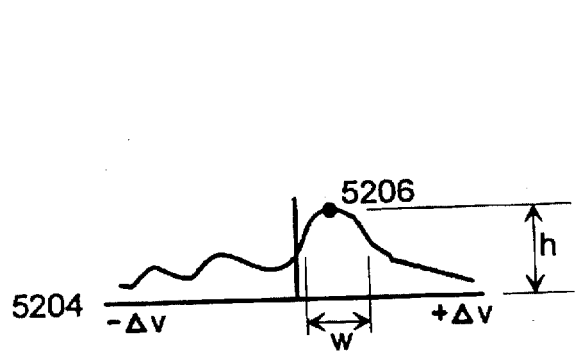
FIGS. 10A-10C illustrate examples useful for describing how a disparity value for each pixel P in a left image is calculated.
Figure 10C:
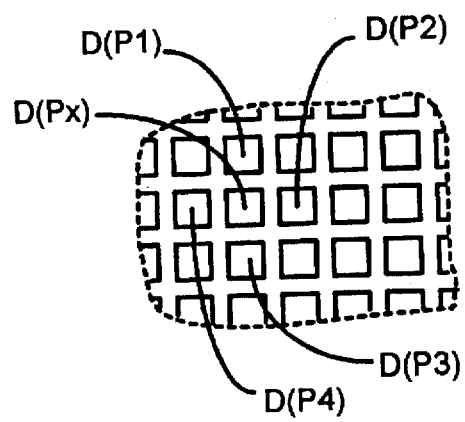
Figure 10A:
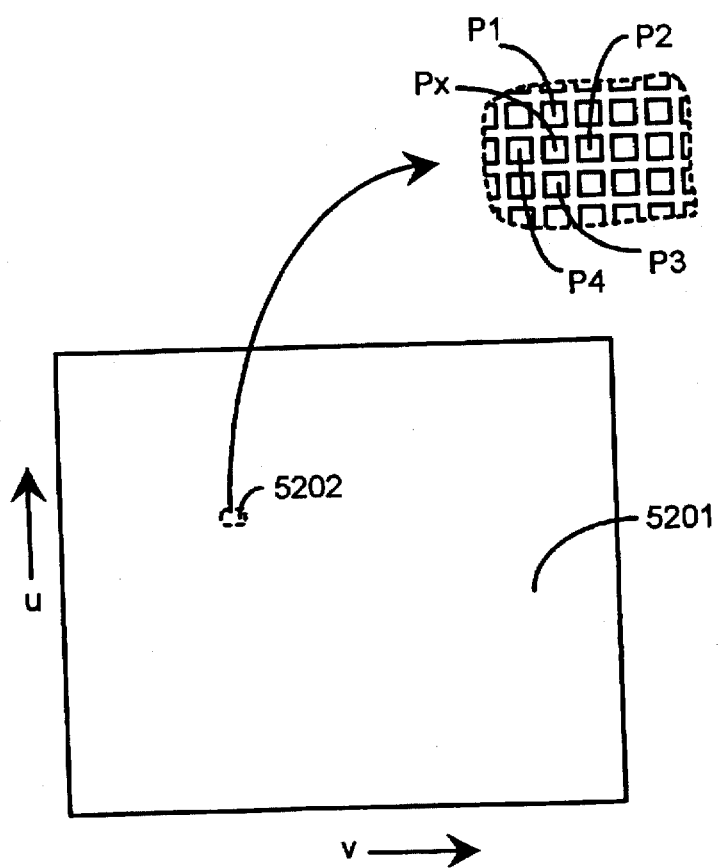

FIGS. 10A–10C illustrate, as an example, the technique used in calculating a disparity value for each pixel P in a left image 5201. In FIG. 10A, a portion 5202 of the left image 5201 is "blown up" and shown as including pixels Px, P1, P2, P3, and P4, wherein the pixel Px is a representative pixel at image coordinates $(u_x,v_x)$ in the image 5201 and pixels P1–P4 are representative of pixels adjacent to the pixel Px. In FIG. 10C, each pixel, such as, for example, Px, is shown to be associated with a corresponding disparity value, such as, $D(p_x)$ for pixel Px.

In step 5103, each camera pair's dedicated processor (e.g., 802-1) sets, for each pixel $P_x$s, an estimated disparity value $D(p_x)$ to a value d corresponding to the position of a maximum peak of the correlation function $B(p_x)$ for that pixel, and a confidence factor $C(p_x)$ to a number proportional to the height and narrowness of the peak. For example, referring to FIG. 10B, the disparity d corresponding to the maximum peak 5206 is measured, for example, as the number of pixels (or a scaled length related to the number of pixels) from the zero-offset (e.g., vertical axis) of the correlation function $B(p_x)$, and the confidence factor $C(p_x)$ is set to a number proportional to the height "h" and narrowness "w" of the peak 5206. All such estimated disparity values for the pixels of the left image 5201 are stored, for example, in a disparity function D(p) area in the camera pair's memory (e.g., 803-1).

In step 5104, each camera pair's dedicated processor (e.g., 802-1) calculates a depth gradient between adjacent pixels in the left image using the disparity values established in step 5103, and compares the calculated depth gradient to a maximum depth gradient bound. For each pixel $P_x$ having an adjacent pixel that violates the depth gradient constraint (i.e., having a depth gradient with an adjacent pixel such as, for examples, pixels P1–P4 in FIG. 10A, that exceeds the maximum depth gradient bound), and a confidence factor $C(p_x)$ which is less than the average of the pixels in a local window, the estimated disparity value $D(p_x)$ is set to a value d' corresponding to the position of the largest peak above a threshold T that satisfies the adjacent pixel continuity constraint, if there is such a peak. Otherwise, the estimated disparity value $D(p_x)$ is set to a value d" corresponding to the position of the greatest correlation value above T that satisfies the continuity constraint. If there is no such peak, the confidence factor $C(p_x)$ is set to zero. This procedure is repeated for each pixel, using the updated estimated disparity values in computing the continuity constraint, until either there are no more changes to any of the estimated disparity values $D(p_x)$ of the pixels in the left image, or until a maximum number of iterations is reached.

Steps 5102–5104 are duplicated in steps 5102'–5104' for the right image by each camera pair's dedicated processor (e.g., 802-1) interchanging the roles of the left and right images (and shifting the corresponding rectangular window in the left image to the right, instead of to the left in step 5102, resulting in a second disparity function D'(p) calculated for pixels P' in the right image.

In a fifth step 5105, each camera pair's dedicated processor (e.g., 802-1) compares the disparity functions D(p) and D'(p) respectively generated for the left and right images in steps 5102–5104 and 5102'–5104', and for each pixel p for which the disparity functions disagree by more than a threshold value Y (i.e., for which $|D(p_x)-D'(p_x-D(p_x)|>Y$), the confidence factor $C(p_x)$ is set to zero, since such pixels are typically in "occluded" regions (i.e., visible in one image but not the other), and therefore have no real match. As a result of step 5105, a revised disparity function D(p) is formed including estimated disparity values $D(p_x)$ for pixels in the left image, and a revised confidence function C(p) is formed including a confidence value $C(p_x)$ for pixels in the left image, wherein if the confidence value $C(p_x)$ is zero, then the disparity value $D(p_x)$ for that pixel $P_x$ is undefined.

In a sixth step 5106, each camera pair's dedicated processor (e.g., 802-1) computes a depth function Z(p) including depth values $Z(p_x)$ for pixels $p_x$ in the left image, and stores the depth function Z(p) in memory (e.g., 803-1). In this step, each camera pair's dedicated processor (e.g., 802-1) assigns to each pixel $P_x$ in the left image, for which $C(p_x)$ is nonzero, a depth (i.e., a distance from the left camera to a point on an object corresponding to the pixel) given by:

$$Z(p_x) = K \cdot \frac{Bf}{D(p_x)} \qquad (1)$$

where K is a factor taking into account the scale of the camera's image coordinates, B is the "baseline" (i.e., the spacing X between the optical centers of the cameras), and f is the focal length of the cameras (i.e., the distance from the optical center of each camera to its retinal plane).

Figure 11A:
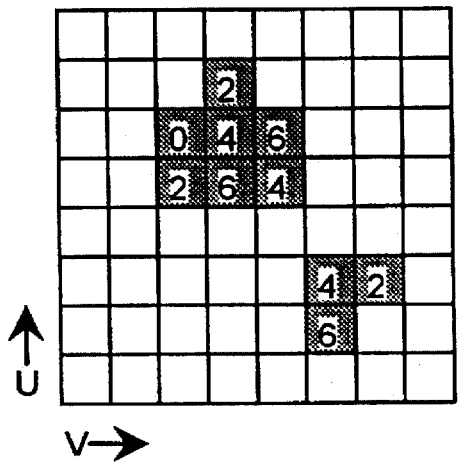
FIGS. 11A-11C illustrate examples useful for describing substeps 5107(a)-(d) of FIG. 9.
Figure 11B:
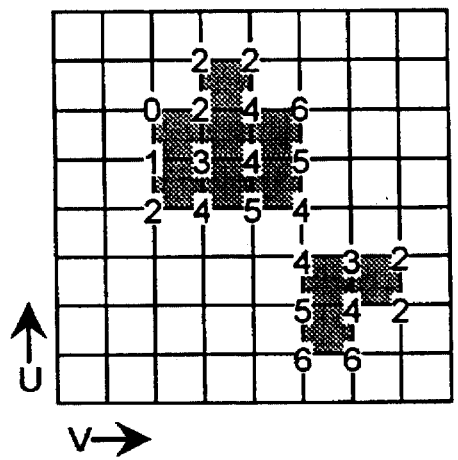
Figure 11C:
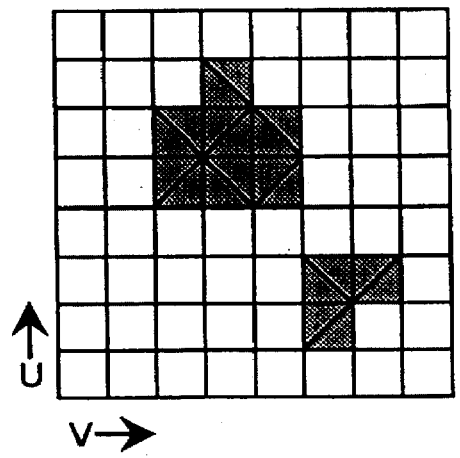

In step 5107, each camera pair's dedicated processor (e.g., 802-1) utilizes the depth function Z(p) generated in step 5106 to generate a set of triangle meshes indicative of 3-D surfaces. FIGS. 11A–11C illustrate an example useful in describing substeps 5107(a)–(d), which are performed for generating the set of triangle meshes. Starting with FIG. 11A, a simplified camera image of 8×8 resolution is illustrated wherein pixels having confidence values $C(p_x)$ greater than zero are shown shaded with their corresponding depth values $Z(p_x)$ depicted therein, and pixels having undefined depth values $Z(p_x)$ are shown white with no corresponding depth values $Z(p_x)$ depicted therein. For descriptive purposes, each pixel is assigned unique image coordinates (u,v) where u indicates the row of the pixel and v indicates its column.

In the first substep 5107(a), each camera pair's dedicated processor (e.g., 802-1) accesses the depth function Z(p) stored in its corresponding memory (e.g., 803-1) to locate "connected pixel groups" consisting of pixels having defined depth values $Z(p_x)$, wherein two pixels are in the same group if they are horizontally or vertically adjacent, or are connected by a chain of pixels having this property. For example, in FIG. 11A, two such connected pixel groups are illustrated.

In the second substep 5107(b), each camera pair's dedicated processor (e.g., 802-1) computes for each pixel in each connected pixel group, interpolated depth values for each vertex (i.e, corner) of the pixel. The interpolated depth value is calculated as the average of the depth values $Z(p_x)$ of all pixels which are adjacent to the vertex and have defined depth values. For example, for pixel (5,3) in FIG. 11A, the interpolated depth value for its upper left vertex is calculated to be the average of the depth values of pixels (5,3) and (6,3); the interpolated depth value for its upper right vertex is calculated to be the average of the depth values of pixels (5,3), (6,3), (5,4), and (6,4); the interpolated depth value for its lower left vertex is the depth value of pixel (5,3); and the interpolated depth value for its lower right vertex is calculated to be the average of the depth values of pixels (5,3) and (5,4). FIG. 11B illustrates the result of calculating such interpolated depth values for each pixel in each connected pixel group of FIG. 11A.

In the third substep 5107(c), each camera pair's dedicated processor (e.g., 802-1) calculates the world coordinate points which correspond to the interpolated depth values computed in substep 5107(b). Since depth values are relative to the local i,j,k coordinate system of a camera, this is done, for example, by taking into account the position and orientation of the camera to translate the interpolated depth value in the local i,j,k coordinate system of the camera back to the world coordinate system (FIG. 6 illustrates such a translation).

In the fourth substep 5107(d), each camera pair's dedicated processor (e.g., 802-1) generates the triangles for the initial set of triangle meshes by dividing, for example, each square pixel having a defined depth value $Z(p_x)$ into two triangles. To facilitate the mesh simplification process as described in step 5108 which follows, a preferable method for such division forms criss-cross patterns (e.g., reversing the direction of the diagonal in adjacent pixels) in the triangle meshes, as opposed to simple hatched patterns (e.g., keeping the same direction of the diagonal in all pixels) in the triangle meshes. Wherein the image coordinates of a pixel are designated as (u,v) and the four vertices of the pixel are designated as LL for lower left, UL for upper left, LR for lower right, and UR for upper right, a preferred method for forming such triangles includes the steps of: (1) if the sum of the coordinates (i.e., u+v) of a pixel having a defined depth is even, then the pixel is divided into two triangles wherein a first triangle has vertices (LL,UL,UR) and a second triangle has vertices (LL,UR,LR); and (2) if the sum of the coordinates (i.e., u+v) of a pixel having a defined depth is odd, then the pixel is divided into two triangles wherein a first triangle has vertices (LL,LR,UL) and a second triangle has vertices (UL,UR,LR). FIG. 11C illustrates the result of performing substep 5107(d) on each pixel in each connected pixel group of FIG. 11A.

For the simplified example as illustrated in FIGS. 11A–11C, the resulting size of the data structure is modest. However, if the image frame includes, for example, 720 by 486 pixels, each having a defined depth, then the frame would generate a 3-D triangular mesh including nearly 700,000 triangles. Since the size of such a data structure may cause prohibitively slow transmission and processing times, a method for mesh simplification is provided.

Figure 12A:
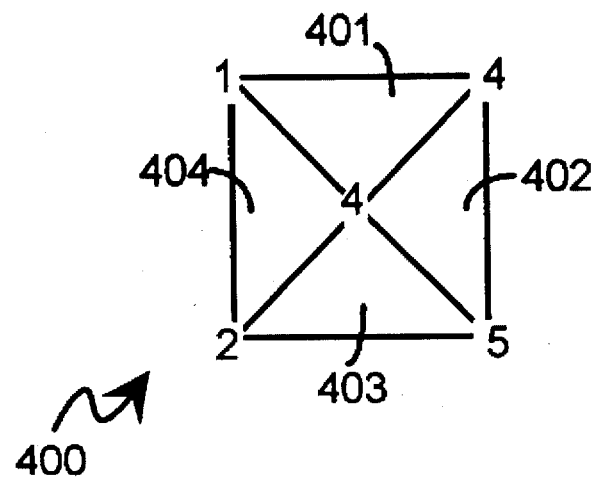
FIGS. 12A-12B and 13A-13F illustrate examples useful for describing substeps 5108(a)-(d) of FIG. 9.
Figure 12B:
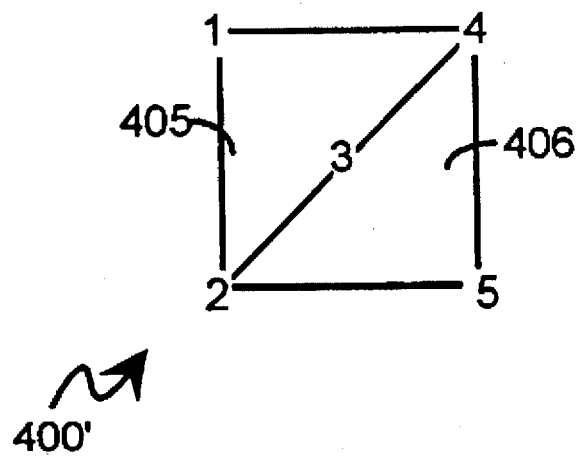

Accordingly, in step 5108, the triangular mesh generated in step 5107 is "simplified" using a novel process described herein by each camera pair's dedicated processor (e.g., 802-1) to reduce the number of triangles, and hence reduce the amount of data. FIGS. 12A–12B and 13A–13F illustrate examples useful in describing substeps 5108(a)–(d), which are performed for such mesh simplification. Briefly stated, substeps 5108(a)–(d) follow certain rules in replacing a "triangle group" of four triangles forming a square in image coordinates, with a smaller number of triangles, such as, for example, two triangles. FIGS. 12A–12B are illustrative, as an example, of such a replacement. In FIG. 12A, a triangle group 400 of four triangles is shown comprising a first triangle 401, a second triangle 402, a third triangle 403, and a fourth triangle 404. Depth values are indicated at the vertices of the triangles. In FIG. 12B, the triangle group 400 is replaced by a triangle group 400' of two triangles, wherein triangle 405 of triangle group 400' is formed by combining the first and fourth triangles 401 and 405 of the triangle group 400, and triangle 406 of triangle group 400' is formed by combining the second and third triangles 402 and 403 of the triangle group 400. Clearly, such triangle replacements do not affect the interpolated depth values for the four outer corner vertices of the triangle groups 400 and 400'. An error is introduced, however, by such triangle replacements in the depth value corresponding to a central vertex of the original triangle group 400. For example, whereas the interpolated depth value for the central vertex of the original triangle group 400 is shown to have a value of 4 in FIG. 12A, its corresponding counterpart is shown to have a value of 3 in FIG. 12B, calculated as the average of the LL and UR corner vertices, resulting in an error of 1 unit (e.g., 4-3) for this point following such replacement since the four original triangles were not coplanar. The greatest error is at the central vertex of the triangle group being reduced, wherein such error is calculated as the absolute value of the difference between the original depth of the central vertex $Z(p_{cv})$ and a new depth $Z'(p_{cv})$ (calculated as the average depth of the two corner vertices of the square, which are joined to form the replacement triangle group).

Accordingly, a first rule is defined wherein a triangle replacement, such as, for example, in FIGS. 12A–12B is performed only if the following central vertex error relationship is upheld:

$$E=abs|Z(p_{cv})-Z'(p_{cv})|<\max(c_1,c_2X) \qquad (2)$$

where E is the error, $Z(p_{cv})$ is the original depth of the central vertex, $Z'(p_{cv})$ is the new depth in the replacement triangle pair, $C_1$ and $C_2$ are constants, and X is the length of an outer edge of the triangle group.

Figure 13C:
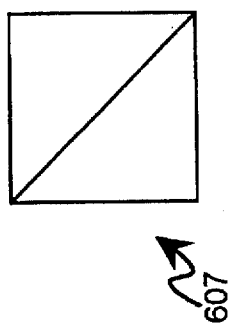
Figure 13B:
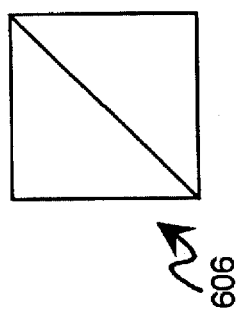
Figure 13A:
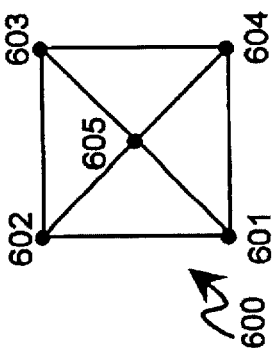
Figure 13F:
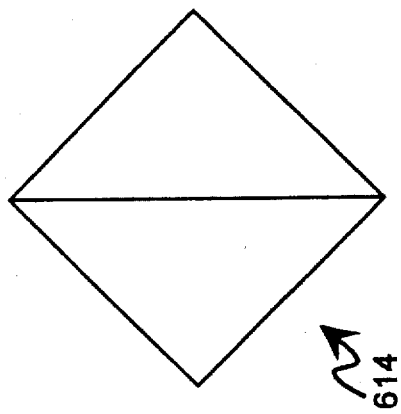
Figure 13E:
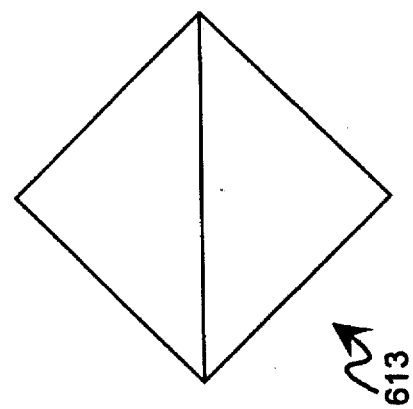
Figure 13D:
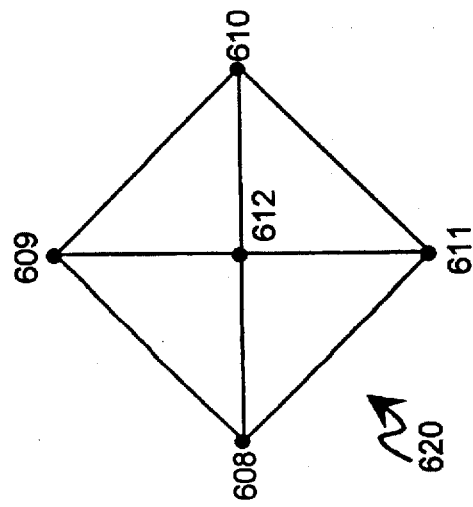

Referring to FIGS. 13A–13F, the square forming the boundary of a triangle group may be upright such as depicted in FIG. 13A, or tilted 45 degrees such as depicted in FIG. 13D. Such groups are respectively referred to herein as "erect" (e.g., upright) and "oblique" (e.g., tilted).

Given an erect triangle group having two major diagonals, there are two possible ways of replacing it with two triangles having only one of the two major diagonals. For example, the erect triangle group of FIG. 13A can be replaced by either the triangle pair 606 in FIG. 13B formed by eliminating the major diagonal extending across vertices 602 and 604 in the original triangle group 600, or the triangle pair 607 in FIG. 13C formed by eliminating the major diagonal extending across vertices 603 and 601 in the original triangle group 600. Likewise, given an oblique triangle group having two major diagonals, there are two possible ways of replacing it with two triangles having only one of the two major diagonals. For example, the oblique triangle group of FIG. 13D can be replaced by either the triangle pair 613 in FIG. 13E formed by eliminating the major diagonal extending across vertices 609 and 611 in the original triangle group 620, or the triangle pair 614 in FIG. 13F formed by eliminating the major diagonal extending across vertices 608 and 610 in the original triangle group 620.

Recognizing such, second and third replacement rules are defined which allow successive levels of replacement to proceed by forming erect and oblique triangle groups in alternating levels of replacement. For example, in a first level of replacement, oblique triangle groups are preferably replaced in such a fashion that erect triangle groups are formed and, in a second level of replacement, the erect triangle groups are preferably replaced in such a fashion that oblique triangle groups are formed and, in a third level of replacement, the oblique triangle groups are preferably replaced in such a fashion that erect triangle groups are formed and, so on until no more replacement triangles may be formed.

In particular, rule 2 specifies whether an oblique triangle group such as, for example, 620 in FIG. 13D, is replaced with a triangle pair, such as, for example, 613 of FIG. 13E, wherein the vertical diagonal (e.g., diagonal between vertices 609 and 611) has been eliminated, or with a triangle pair, such as, for example, 614 of FIG. 13F, wherein the horizontal diagonal (e.g., diagonal between vertices 608 and 610) has been eliminated. In stating rule 2, N denotes the length in screen coordinates of an inner edge of the square (e.g., the number of pixel columns between vertices 608 and 612), and $(u_{cv}, v_{cv})$ denotes the image coordinates of the central vertex (e.g., 612 in FIG. 13D) of the oblique triangle group.

Rule 2 is then stated as follows: (1) if the quotient $u_{cv}/N$ is odd, then the replacement triangle is formed by eliminating the vertical diagonal (such as, for example, triangle pair 613 in FIG. 13E), and (2) if the quotient $u_{cv}/N$ is even, then the replacement triangle is formed by eliminating the horizontal diagonal (such as, for example, triangle pair 614 in FIG. 13F).

Similarly, rule 3 specifies whether an erect triangle group such as, for example, 600 in FIG. 13A, is replaced with a replacement triangle group, such as, for example, 606 of FIG. 13B, wherein the UL-LR diagonal (e.g., diagonal between vertices 602 and 604) has been eliminated, or with a replacement triangle group, such as, for example, 607 of FIG. 13C, wherein the LL-UR diagonal (e.g., diagonal between vertices 601 and 603) has been eliminated. In stating rule 2, N denotes the length in screen coordinates of an outer edge of the square (e.g., the number of pixel rows between vertices 601 and 602), and $(u_{cv}, v_{cv})$ denotes the screen coordinates of the central vertex (e.g., 605 in FIG. 3A) of the erect triangle group.

Rule 3 is then stated as follows: (1) if the quotient $(u_{cv}+v_{cv})/N$ is odd, then the replacement triangle is formed by eliminating the LL-UR diagonal (such as, for example, replacement triangle group 607 in FIG. 13C), and (2) if the quotient $(u_{cv}+v_{cv})/N$ is even, then the replacement triangle is formed by eliminating the UL-LR diagonal (such as, for example, replacement triangle group 606 in FIG. 13B).

Based upon the above replacement rules 1–3, substeps 5108(a)–(d) then proceed as follows to perform mesh simplification. In a first substep 5108(a), each camera pair's dedicated processor (e.g., 802-1) initially sets an indicator M stored, for example, in its corresponding memory (e.g., 803-1) to "1" (one).

In a second substep 5108(b), each camera pair's dedicated processor (e.g., 802-1) locates all oblique triangle groups with inner edge length $2^M$. For each of these oblique triangle groups, the dedicated processor (e.g., 802-1) first determines the major diagonal to be eliminated by following rule 2, then checks to see if such replacement is allowable by following rule 1. If rule 1 allows such replacement, then the dedicated processor (e.g., 802-1) makes the replacement by eliminating the diagonal determined by rule 2.

In a third substep 5108(c), each camera pair's dedicated processor (e.g., 802-1) locates all erect triangle groups with outer edge length $2^M$. For each of these erect triangle groups, the dedicated processor (e.g., 802-1) first determines the major diagonal to be eliminated by following rule 3, then checks to see if such replacement is allowable by following rule 1. If rule 1 allows such replacement, then the dedicated processor (e.g., 802-1) makes the replacement by eliminating the diagonal determined by rule 3.

In a fourth substep 5108(d), if any triangle groups were replaced in substeps 5108(b) or 5108(c), the corresponding dedicated processor (e.g., 802-1) increments the indicator M by one and jumps back to substep 5108(b) to loop through substeps 5108(b)–(d) again. On the other hand, if no triangle groups were replaced in substeps 5108(b) or 5108(c), then the corresponding dedicated processor (e.g., 802-1) stops mesh simplification processing, and generates the resulting data structure.

FIG. 14A illustrates, as an example, a portion of the stream of video data chunks 116 formed by the video encoding subsystem 114. Included in a header 934 is a first word 902 which indicates that the data segments following it include 3-D video information, a second word 903 indicating whether the data represents background (B) or foreground (F) objects, a third word 904 which indicates an associated time for the following 3-D video information, and a fourth word 905 which indicates the number of bytes of data in the remainder of the chunk. The header 934 is then followed by 3-D video information for each of the camera pairs. For example, the plurality of words 936 includes the 3-D video information for a first camera pair, and the plurality of words 938 includes the 3-D video information for a second camera pair. Additional pluralities of words including the 3-D video information for the remaining camera pairs follow. The video segment ends after the plurality of words including 3-D video information for the last camera pair.

Within the first plurality of words for the first camera pair 936, a first word 906 identifies the camera pair, a second word 907 indicates the total number of bytes of data for this camera pair, and a second word 908 indicates the number of bytes, for example, of 2-D video information that follows. The 2-D video information 910 preferably includes one frame of MPEG-2 encoded data (providing, for example, a 2-D pixel image of 720 by 486 when decompressed) from a selected camera (e.g., the left camera) of the camera pair. Following the 2-D video information 910, there is a sequence of "mesh descriptors", one for each mesh computed in the steps shown in FIG. 9. For each mesh descriptor, a first word 912-1 indicates the number of bytes, for example, of mesh data that follows, and a second word 914-1 indicates the number of vertices that follow, wherein the mesh data includes the vertices data 916-1 and the connectivity data 918-1. Preferably, the vertices data 916-1 includes, for each mesh, a set of vertices specified in world coordinates, and the connectivity data 918-1 includes, for each triangle, a set of three vertices listed in clockwise order to indicate the front side of a surface defined by the triangle.

The steps shown in FIG. 9 are performed for every video frame (e.g., every 1/30 second) during the live-action event. During this period, the video cameras are positioned, oriented and focussed to capture the "foreground", action, e.g. the players in a football game. In addition, the steps shown in FIG. 9 are performed once, preferably before the live-action event takes place, to capture and encode the "background" of the live-action area. At this time, no foreground action is present, and the cameras are positioned, oriented and focussed to capture the background of the live-action space, e.g. the field, sidelines and stands of a football stadium. Video chunks obtained in this way are marked as background chunks, for example, by an appropriate code in a B/F (Background/Foreground) Indicator field 903 of the video chunk header 934, and is preferably transmitted at the start of the transmission to each viewer and thereafter, only whenever the background changes, which occurs, for example, at scene changes.

Audio Capture and Encoding SubSystem

The audio capture and encoding subsystem 120 (FIG. 4) captures sound information emanating from a live-action space and its periphery, and processes the sound information to generate an encoded audio data stream 126 from which an approximation of the sound experienced at any three-dimensional point and orientation within the live-action space and its immediate periphery can be produced. An example of sounds emanating from a live-action space would be the sounds produced by players on a playing field. These sounds are referred to herein as "spatial sounds." An example of sounds emanating from the live-action periphery would be the crowd noise in a stadium. These sounds are referred to herein as "ambient sound."

To generate an encoded audio data stream 126 from which an approximation of the three-dimensional sound experienced at any point within the live-action space and its immediate periphery can be produced, the audio capture and encoding subsystem 120 keeps track of previously identified spatial sound sources, and detects and locates new spatial sound sources as part of its processing function. The encoded audio data stream comprises a stream of audio data chunks, wherein each audio data chunk (e.g., 126-1) is associated with a sound source identified by a source identification number ("SOURCE ID#"), and a time period ($t_1$, $t_2$) where $t_1$ is the start and $t_2$ is the end.

FIG. 14B, illustrates, as an example, an audio data chunk included in the audio data stream 126. In general, the audio data chunk includes information about a sound source during a time period ($t_1$, $t_2$). In particular, the audio data chunk has a header 976 including a first field 960 indicating its type of data (i.e., audio); second and third fields 962 and 964 indicating the data chunk's associated start and end times (i.e., $t_1$ and $t_2$); a fourth field 966 indicating a source ID# for the sound source, wherein a sequence of chunks having the same source ID# and contiguous time periods represents sound emanating from the same source over a span of time; and a fifth field 968 indicating, in world-coordinates, the approximate emanating location (also referred to herein as "source location") of the sound source during the period of time ($t_1$, $t_2$). Following the header 976, the audio data chunk includes a plurality of fields 970 providing estimated audio samples of the digitized sound experienced at the source location during the time period ($t_1$, $t_2$) at a fixed sampling rate (e.g., 44.1 KHz). The sequence of chunks in the audio data stream 126 occur in order of increasing start time.

The audio capture and encoding subsystem 120 preferably includes a number of unidirectional microphones 122 (e.g., cardioid type microphones) situated around a live-action space, and an audio encoding subsystem 124 for processing the outputs of the unidirectional microphones. The microphones 122 are preferably divided into two classes: "spatial microphones" to detect sound produced in the live-action space (i.e., spatial sound sources), and "ambient microphones" to detect sound produced outside the live-action space (i.e., ambient sound).

Figure 15:
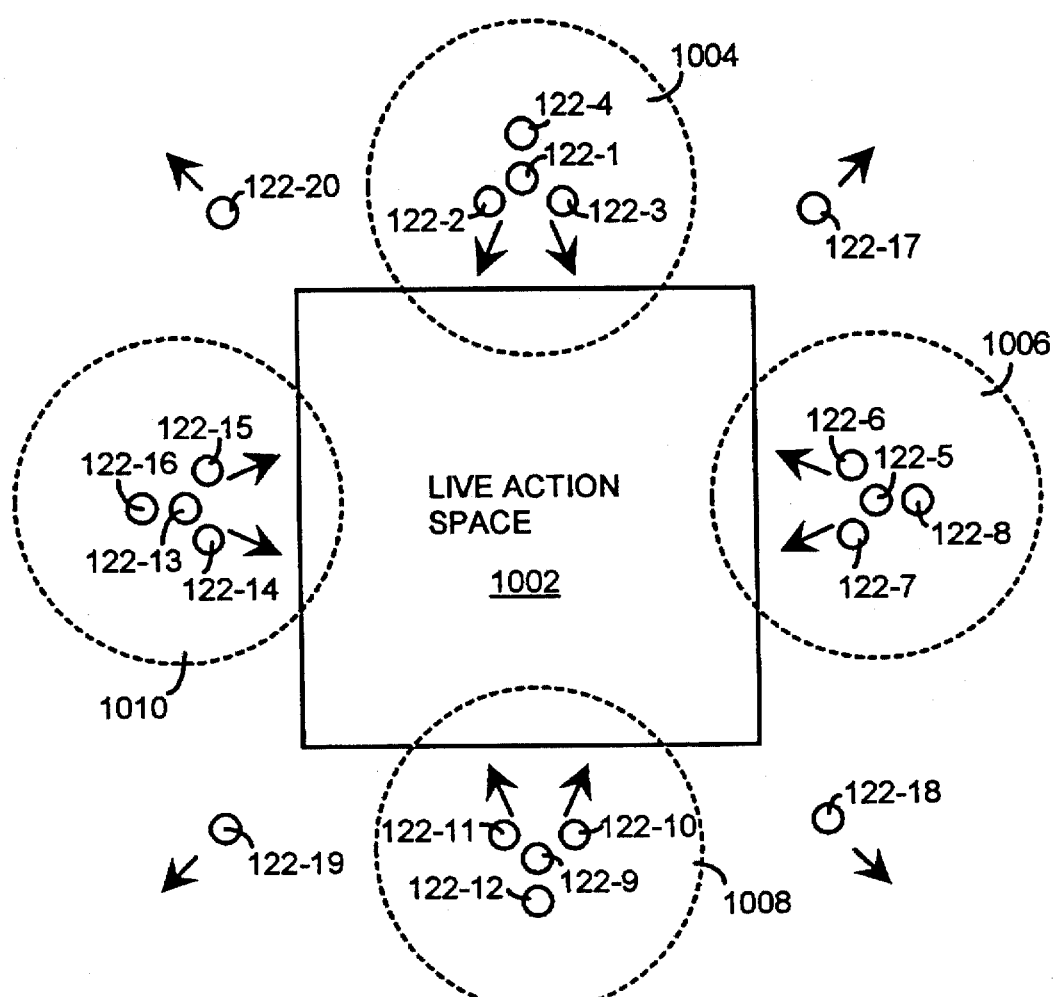
FIG. 15 illustrates, as an example, a top plan view of a live-action space including a number of unidirectional microphones positioned around the live-action space.

FIG. 15 illustrates, as an example, a top plan view of a live-action space 1002 including a number of unidirectional microphones, 122-1 to 122-20 (also cumulatively referred to herein as 122), positioned around the live-action space 1002, wherein the orientations, i.e., directions of high sensitivity, for each group of microphones are generally indicated in the figure by arrows. As depicted in the figure, the spatial microphones, 122-1 to 122-16, are oriented such that they primarily pick up sound sources generated within the live-action space 1002, and the ambient microphones, 122-17 to 122-20, are oriented such that they primarily pick up sound sources not generated in the live-action space 1002.

The spatial microphones, 122-1 to 122-16, are preferably divided into groups of four. The four microphones (e.g., 122-1 to 122-4) of each group (e.g., 1004) are preferably arranged in a right tetrahedron or other non-planar configuration, and are placed far enough apart so that measurable phase differences occur between the four microphones when detecting the same spatial sound source. Accurate measurements of the phase differences between the microphones is required, because the location of the spatial sound source is determined from these phase differences. Accordingly, the distances between the microphones are predetermined to provide adequate resolution for accurately measuring the phase differences between the microphones. For example, if the audio sampling rate is 44.1 KHz., a spacing of 10 feet between each two of the microphones provides up to about 440 samples between each two of the microphones.

The spatial microphones of each group are each directed towards the live-action space 1002, and preferably oriented to exclude (i.e., maximally attenuate) sound sources not in the live-action space. Each group of microphones defines a "coverage region" within which, at least part of the live-action space 1002 is included and all spatial sound sources produced in that part of the live-action space are detected by all spatial microphones in the group, albeit at different times due to the phase differences between the microphones.

Figure 16:
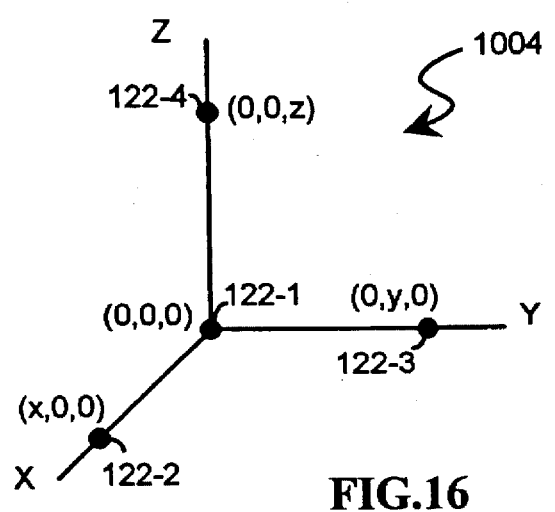
FIG. 16 illustrates, as an example, a configuration, utilizing aspects of the present invention, for one group of spatial microphones.

FIG. 16 illustrates, as an example, a configuration for one group of spatial microphones (e.g., 1004). Preferably, the group of spatial microphones 1004 is arranged in a non-planar configuration such that a spatial sound source within its coverage region is generally picked up at different times by its microphones. As previously mentioned, this characteristic is important, because the audio encoding subsystem 124 estimates the source location (i.e., point of sound origin) of a spatial sound source from the phase delays experienced between microphones within the group, caused as a result of the source location being at a different distance from the microphones in the group. In particular, one assumption used in estimating the source location and audio signal at the source location is that sound emitted from the source location will be detected at each of the microphones (e.g., 122-1 to 122-4) in a spatial group of microphones (e.g., 1004) after some delay which is proportional to the distance from the source location to the microphone, and with an attenuation which is inversely proportional to the square of that distance.

For the purposes of this and subsequent examples, in the right tetrahedron depicted in FIG. 16, spatial microphone 122-1 ("microphone #1") is positioned, for example, at the origin (0,0,0) of the coordinate system, spatial microphone 122-2 ("microphone #2") is positioned along the X-axis at the coordinate point (x,0,0), spatial microphone 122-3 ("microphone #3") is positioned along the Y-axis at the coordinate point (0,y,0), and spatial microphone 122-4 ("microphone #4") is positioned along the Z-axis at the coordinate point (0,0,z), wherein x=y=z to simplify processing, and the coverage region of the group 1004 is generally defined (i.e., by orienting each of the microphones in the group) as the octant X>x, Y>y and Z>z, such that microphone #1 is always the farthest microphone in the group from any point in the coverage region of the group 1004.

Although four groups of microphones are shown covering the live action space in FIG. 15, for smaller live-action spaces a single group of microphones may be sufficient, and for larger and/or more complex live-action spaces, more groups of microphones may be desirable. For example, five groups of spatial microphones might be employed in a basketball arena, one in the middle of each edge of the court, and one suspended over the middle of the court.

It may also be desirable for the microphone groups to be dynamically positioned and/or oriented to follow the center of activity in the live-action space for some types of live action events. In such cases, the dynamically positionable and/or orientable microphones and/or microphone groups are preferably equipped with mechanical sensors that encode their positions and orientations, and transmit these encoded data to the audio encoding system 124.

The ambient microphones, 122-17 to 122-20, on the other hand, occur singly. As depicted in FIG. 15, they are evenly distributed around the perimeter of the live-action space 1002, and oriented away from the live-action space 1002 such that they primarily pick up only ambient sounds originating from outside of the live-action space 1002. Depending upon the nature of the live action event, however, different ambient microphone configurations may be employed to enhance the viewer's experience. For some types of live action events, the crowd noise may be generally the same regardless of the position of the ambient microphones. For these types of live action events, perhaps only one ambient microphone arbitrarily positioned around the live-action space might suffice. On the other hand, for other types of live action events, the crowd noise may be substantially different between certain positions around the live-action space. For example, if the live action event is a football game, the crowd noise reaction on the "home side" of the field may be substantially different than the crowd noise reaction on the "visitor's side" of the field. In this case, one or more ambient microphones might be positioned on the home team's side of the stadium, and one or more ambient microphones positioned on the visiting team's side of the stadium. The ambient sound that the VRTV viewer would be exposed to, would then depend upon whether his or her selected virtual viewpoint was closer to the home team's side of the stadium or the visitor's side of the stadium.

Figure 17A:
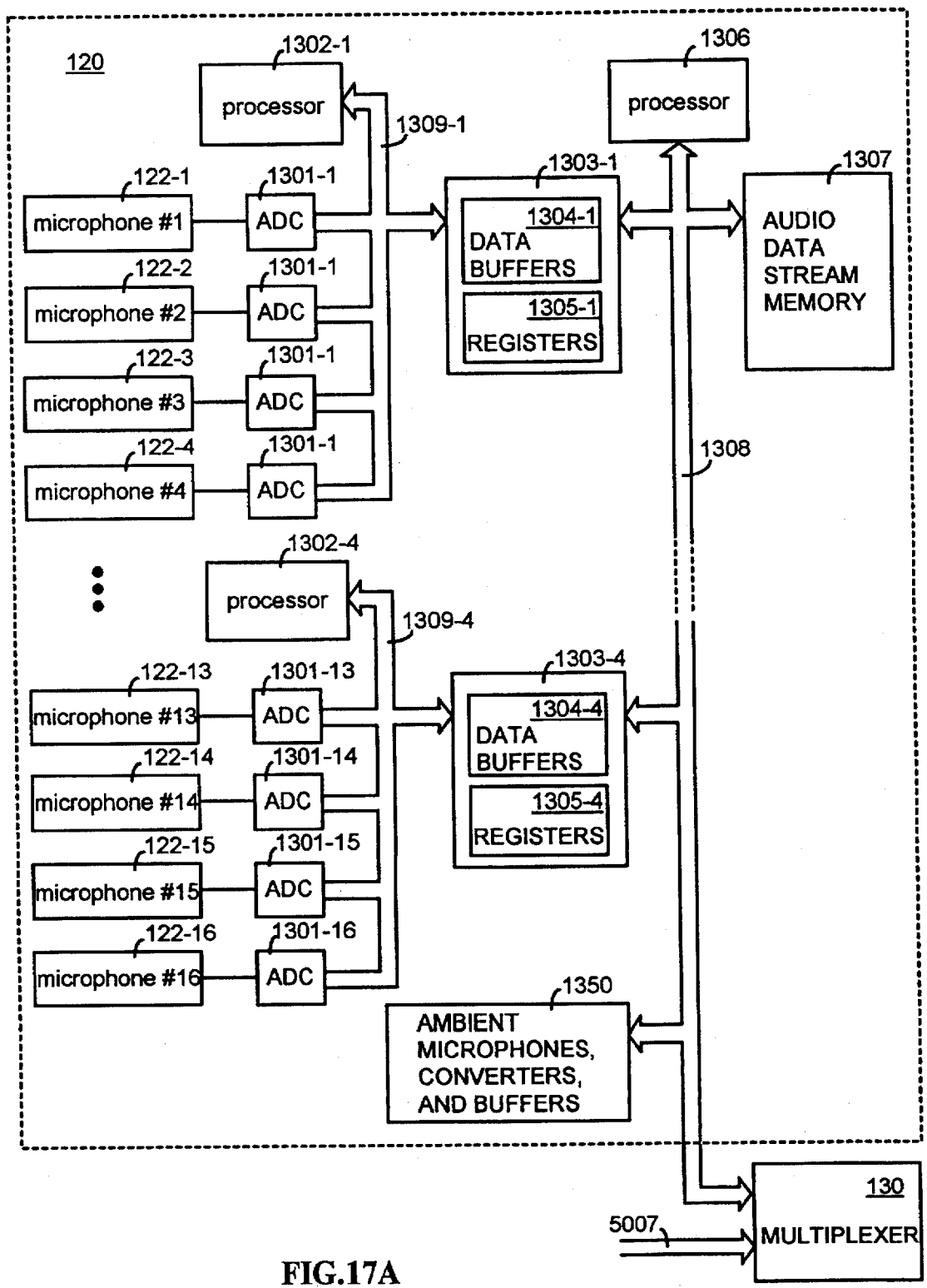
FIG. 17A illustrates, as an example, a block diagram of the audio capture and encoding subsystem of the capture and encoding subsystem of FIG. 4.

FIG. 17A illustrates, as an example, a block diagram of the audio capture and encoding subsystem 120. Spatial microphones, 122-1 to 122-16, as shown, for example, in FIG. 15, and their corresponding analog-to-digital converters ("ADCs"), 1301-1 to 1301-16, comprise the audio capture portion (i.e., microphones 122) of the audio capture and encoding subsystem 120. Group processors, 1302-1 to 1302-4, group memories, 1303-1 to 303-4, subsystem processor 1306, and audio data stream memory 1307 comprise the audio encoding portion (i.e., audio encoding subsystem 124) of the audio capture and encoding subsystem 120. The audio encoding subsystem processor 1306 transmits the stream of audio data chunks 126 to one input of a multiplexer 130 (e.g., via bus 308), while its counterpart (e.g., 805 in FIG. 8) in the video capture and encoding subsystem 110 transmits the stream of video data chunks 116 to another input of the multiplexer 130 (e.g., via bus 807).

Preferably, each spatial microphone (e.g., 122-1 to 122-4) has its own dedicated analog-to-digital converter "ADC" (e.g., 1301-1 to 1301-4), which generates digital samples at a data sampling rate (e.g., 44.1 KHz) from the microphone's analog signal. Alternatively, microphones in a group may share an ADC using conventional multiplexing techniques to reduce component costs.

Processors, 1302-1 to 1302-4, are respectively dedicated to their corresponding microphone groups for processing the audio data captured by their groups. For example, the processor 1302-1 of a first group of microphones including microphones 122-1 to 122-4, controls the storing of digital samples provided by ADCs, 1301-1 to 1301-4, into microphone data buffers (e.g., FIG. 17B) included in a data buffer area 1304-1 of a group memory 1303-1, maintains certain registers (e.g., FIGS. 17D and 17E) included in a register area 1305-1 of the group memory 1303-1, processes the data in the data buffer area 1304-1, and controls the storing of the processed data into certain registers (e.g., FIGS. 17D and 17E) in the register area 1305-1 and into spatial sound source data buffers (e.g., FIG. 17C) in the data buffer area 1304-1 of the group memory 1303-1. Corresponding processors respectively dedicated to other microphone groups perform similar functions, such as, for example, processor 1302-2 (not shown) dedicated to microphone group 2 including microphones 122-5 to 122-8, processor 1302-3 (not shown) dedicated to microphone group 3 including microphones 122-9 to 122-12, and processor 1302-4 dedicated to microphone group 4 including microphones 122-13 to 122-16. To enhance system performance, several processors may alternatively replace the single processor (e.g., processor 1302-1) dedicated to performing the above described functions for each group of microphones. For example, one processor may control the storing of the digitized microphone data into the group memory 1303-1, while the remaining processors perform other functions related to the processing of the microphone data stored in the group memory 1303-1.

Group memories, 1303-1 to 1303-4, are also respectively dedicated to their corresponding microphone groups for storing raw and processed data associated with their microphone groups. For example, group memory 1303-1 includes a data buffer area 1304-1 having microphone data buffers (e.g., FIG. 17A) for storing raw and processed microphone data, and spatial sound source data buffers (e.g., FIG. 17B) for storing spatial sound source data, and it includes a register area 1305-1 having a plurality of registers (e.g., FIGS. 17D and 17E) for storing certain data related to the data stored in the data buffers. Corresponding group memories respectively dedicated to other microphone groups include similar data buffer and register areas.

The subsystem processor 1306 compiles the audio data stream 126 from data stored in the group memories, 1303-1 to 1303-4. Preferably, the group memories, 1303-1 to 1303-4, are shared, so that the subsystem processor 1306 can access them concurrently with their respective group processors, 1302-1 to 1302-4. For example, group memories, 1303-1 to 1303-4, are respectively accessed by their corresponding group processors, 1302-1 to 1302-4, via group buses, 1309-1 to 1309-4, and accessed by the subsystem processor 1306 via a subsystem bus 1308. The subsystem processor 1306 may store the compiled audio data stream 126 in an audio data stream memory 1307 for later transmission.

The audio processing is performed on units of audio data called "segments", which have a fixed length (e.g., 0.1 seconds). Audio data chunks, which represent audio signals being emitted from spatial sources, have lengths approximately equal to this fixed length. However, audio data chunks representing moving sound sources may have lengths shorter or longer than this fixed length, since the audio signal emitted from a moving source during a given period of time arrives at microphones over a period of time that may be slightly longer or shorter.

Figure 17B:
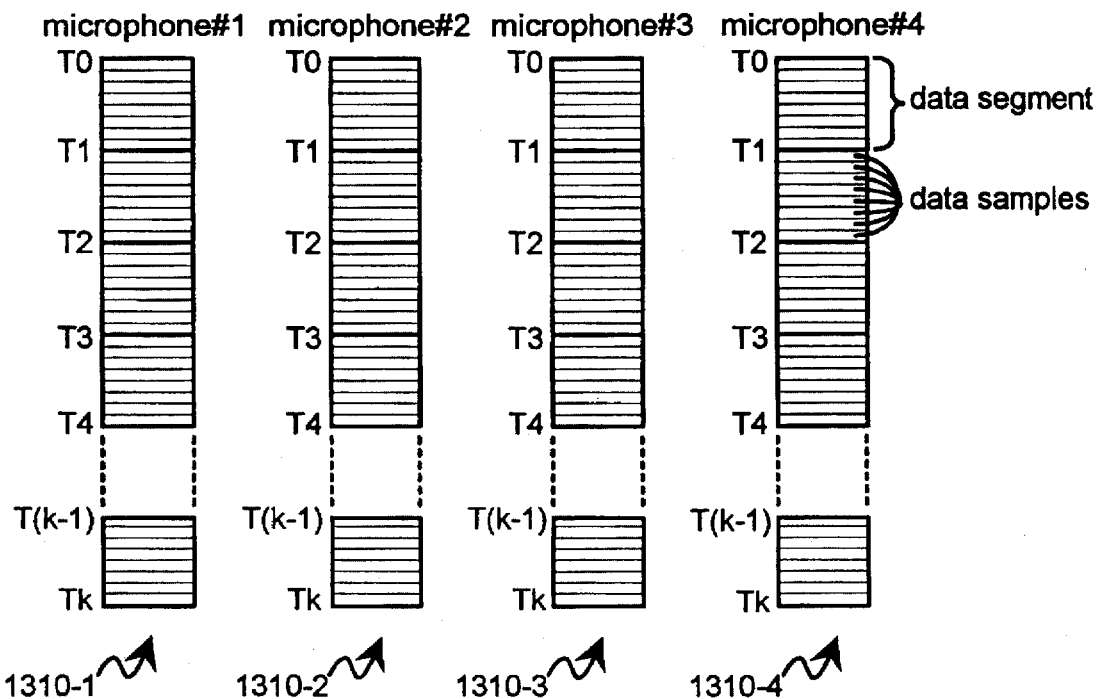
FIG. 17B illustrates, as examples, four microphone data buffers included in the data buffer area of the group memory of the audio encoding subsystem of FIG. 17A.

FIG. 17B illustrates, as examples, four microphone data buffers, 1310-1 to 1310-4. Each spatial microphone in a group of microphones has such a microphone data buffer associated with it. For example, microphone data buffer 1310-1 is dedicated to storing raw and processed data associated with microphone #1, microphone data buffer 1310-2 is dedicated to storing raw and processed data associated with microphone #2, microphone data buffer 1310-3 is dedicated to storing raw and processed data associated with microphone #3, and microphone data buffer 1310-4 is dedicated to storing raw and processed data associated with microphone #4. Each microphone data buffer preferably includes enough memory for storing at least "D" seconds of sound samples at the sampling rate (e.g., 44.1 KHz), wherein "D" is the longest possible propagation delay between a spatial sound source and a spatial microphone plus the duration of a segment (e.g., 0.1 seconds). The buffer size is further rounded up to an even number of segments. As shown in FIG. 17B, "k" denotes the number of segments in each buffer.

As an example, if the longest distance between a spatial sound source and a spatial microphone is 600 feet, if the period associated with each data chunk is 0.1 seconds, and if the sampling rate is 44.1 KHz, then the longest propagation delay between a spatial sound source and a virtual viewpoint in the live action space is approximately 0.5 seconds (i.e., 600 feet divided by the speed of sound), each microphone data buffer includes 0.6 seconds of sampled data, or 26,460 data samples (i.e., 44.1 KHz multiplied by 0.6 seconds).

Figure 17C:
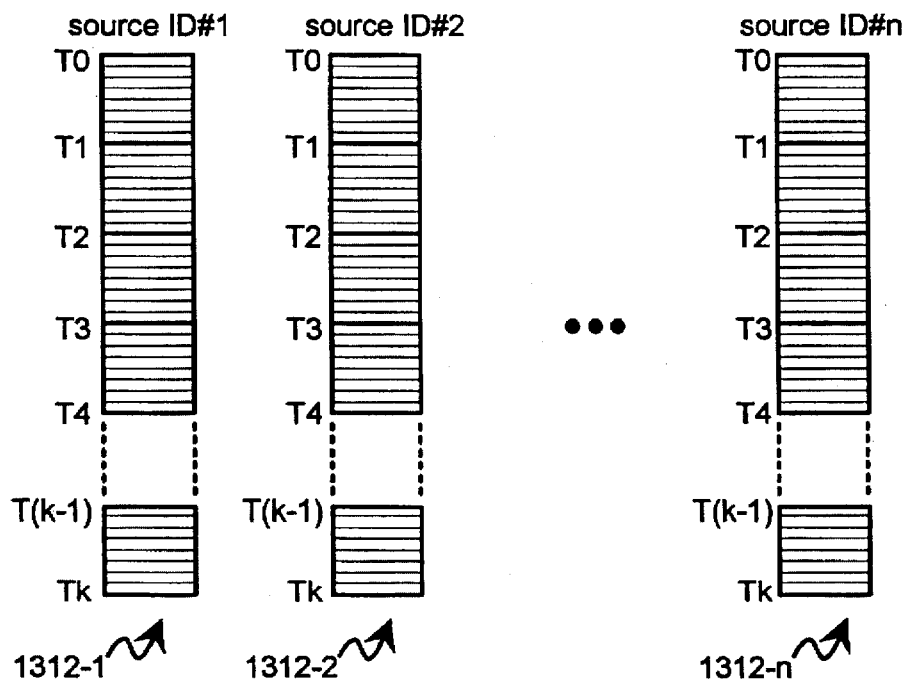
FIG. 17C illustrates, as examples, a plurality of spatial sound source data buffers included in the data buffer area of the group memory of the audio capture and encoding subsystem of FIG. 17A.

FIG. 17C illustrates, as examples, a number of source data buffers, 1312-1 to 1312-n, wherein the number "n" of such source data buffers is preferably the maximum number of significant spatial sound sources that may be concurrently picked up (i.e., active at the same time) by a particular microphone group during the viewing session of the live action event. Each active spatial sound source identified by the audio encoding subsystem 120 is assigned a source ID# which in turn, is uniquely associated with one of the source data buffers, 1312-1 to 1312-n. For example, source data buffer 1312-1 may be dedicated to storing data associated with source ID#1, source data buffer 1312-2 may be dedicated to storing data associated with source ID#2, and so on. Each of the source data buffers, 1312-1 to 1312-n, preferably includes the same amount of memory as each of the microphone data buffers, 1310-1 to 1310-4.

Both types of buffers (microphone data and source data) are used in a cyclic fashion, so that data samples associated with time t=0 are stored in location zero of their respective buffers, as are samples associated with times t=E, 2E, 3E and so on, where E represents the size of each buffer in terms of time. Similarly, data samples associated with time t=1/R (where R is the number of samples per second, for example 44,100) are stored in location one of their respective buffers, and so on.

Figure 17D:
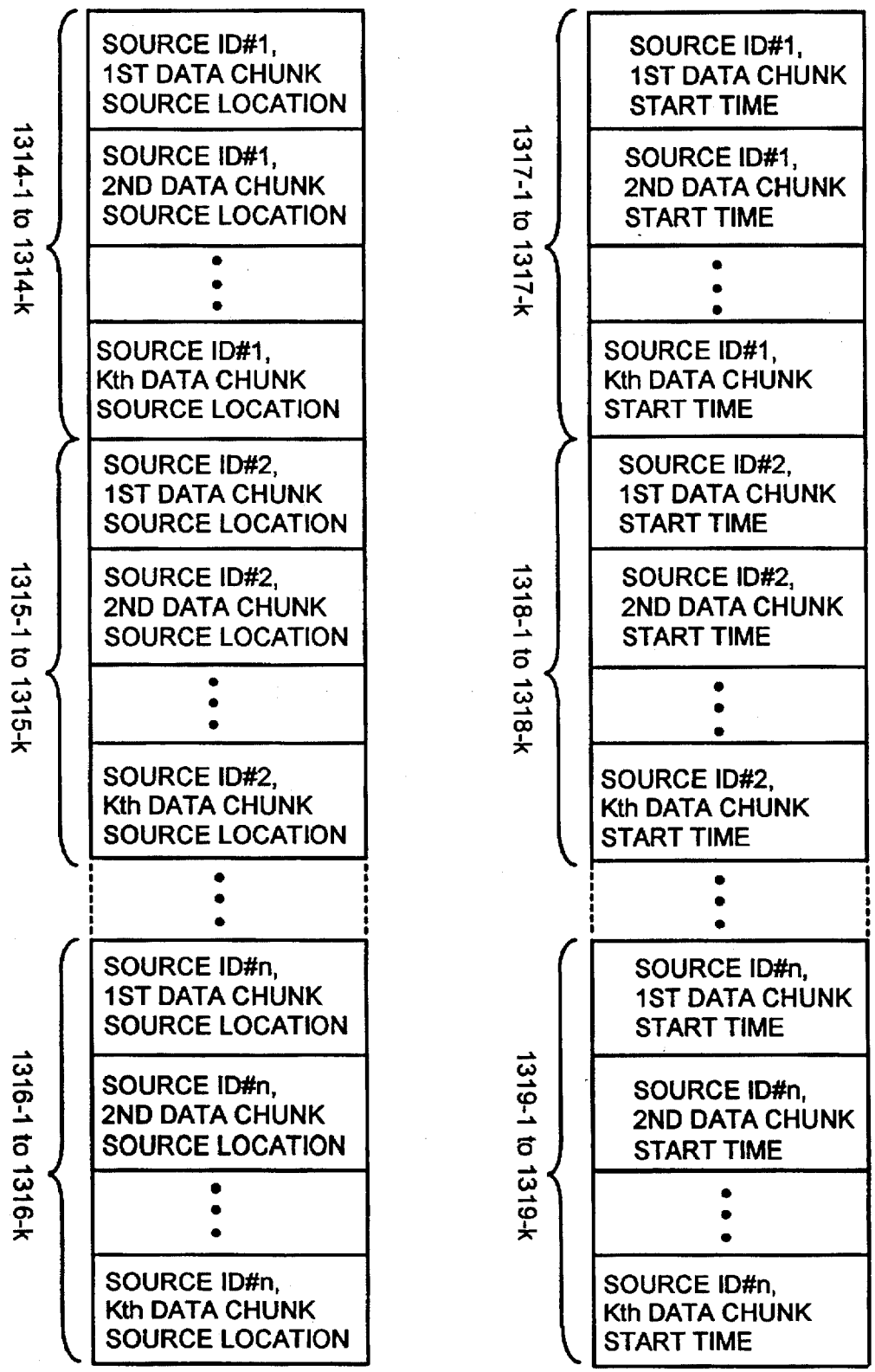
FIGS. 17D and 17E, illustrate, as examples, certain registers maintained in the register area of their respective group memories of the audio capture and encoding subsystem of FIG. 17A.
Figure 17E:
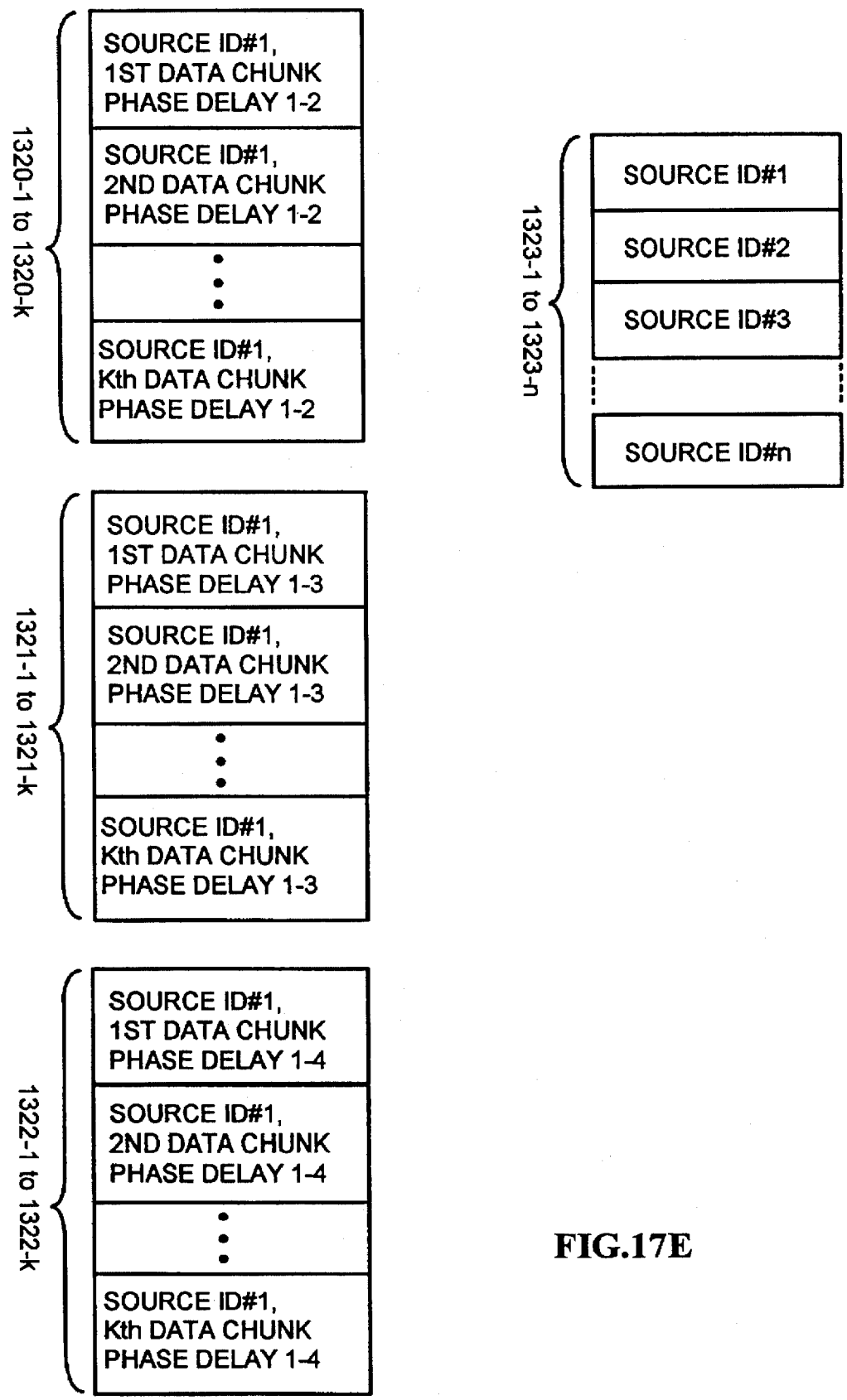

FIGS. 17D and 17E, illustrate, as examples, some of the registers maintained by each of the processors, 1302-1 to 1302-m, in the register area of their respective group memories. In particular, source registers, 1323-1 to 1323-n, also referred to herein as a group's "source list", contain active/inactive indications for each source ID#. In addition, the source registers, 1323-1 to 1323-n, may also respectively contain, for example, starting addresses of their respective source buffers, 1312-1 to 1312-n. Certain other registers, such as, for examples, pointers conventionally used for writing and reading to buffers such as, for examples, the microphone and source data buffers, are not shown, but are understood to also be maintained by each of the processors, 1302-1 to 1302-m, in the register area of their respective group memories.

A number of registers are associated with each data chunk stored in the source buffers, 1312-1 to 1312-n. For examples, source location registers, 1314-1 to 1314-k, contain source locations respectively associated with the 1st to kth data chunks of an active sound source allocated to source ID#1; start time registers, 1317-1 to 1317-k, contain start times respectively associated with the 1st to kth data chunks of an active sound source allocated to source ID#1; phase delay registers, 1320-1 to 1320-k, contain phase delays experienced between microphones #1 and #2, which are respectively associated with the 1st to kth data chunks of an active sound source allocated to source ID#1; phase delay registers, 1321-1 to 1321-k, contain phase delays experienced between microphones #1 and #3, which are respectively associated with the 1st to kth data chunks of an active sound source allocated to source ID#1; and phase delay registers, 1322-1 to 1322-k, contain phase delays experienced between microphones #1 and #4, which are respectively associated with the 1st to kth data chunks of an active sound source allocated to source ID#1. Corresponding registers are similarly provided for other active sound sources allocated to other source ID#'s.

Figure 18:
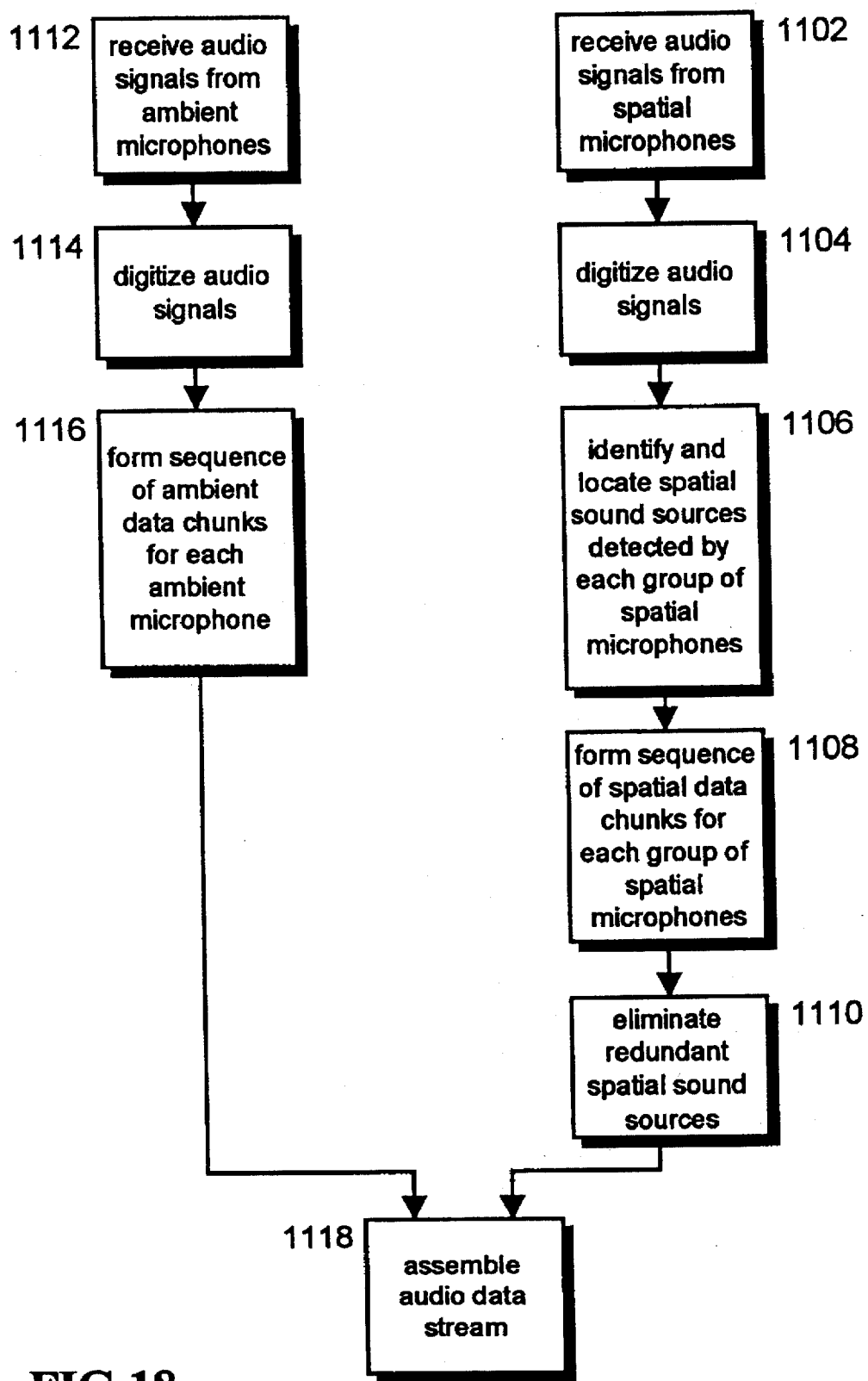
FIG. 18 illustrates, as examples, certain audio signal processing steps preferably performed for each spatial microphone (or microphone group where indicated) by the audio capture and encoding subsystem of FIG. 17A.

FIG. 18 illustrates, as an example, a flow diagram of certain audio signal processing steps performed for each spatial microphone (or microphone group where indicated) by the audio encoding subsystem 124. In brief, steps 1102 and 1104, respectively show that the audio signal from each spatial microphone (e.g., 122-1 to 122-16) is received, sampled, and digitized; step 1106 shows that the data for each group (e.g., 1004 to 1010) is processed separately to identify and locate any spatial sound sources detected by the group; step 1108 shows that a sequence of spatial data chunks is then formed for each spatial microphone group as the result of the processing performed in step 1106; and step 1110 shows that the chunk sequences for all spatial microphone groups are merged, and duplicate chunks (i.e., data for spatial sound sources picked up and identified by more than one spatial microphone group) are identified and redundant copies eliminated.

In a parallel path, steps 1112 and 1114 respectively show that the audio signal from each ambient microphone (e.g., 122-17 to 122-20) is also received, sampled, and digitized; and step 1116 shows the ambient audio data from each of the ambient microphones is also divided into a sequence of ambient data chunks. Particular ambient sound sources, however, are not separated or spatially located. Instead, coordinates for ambient sound sources are predetermined and generally fixed (in a stadium, for example, the source of the picked up ambient sounds could be taken as the center of the grandstand closest to the ambient microphone picking up the sounds). Finally, step 1118 shows that the spatial and ambient chunk sequences are then combined to form the audio data stream 126.

Figure 19A:
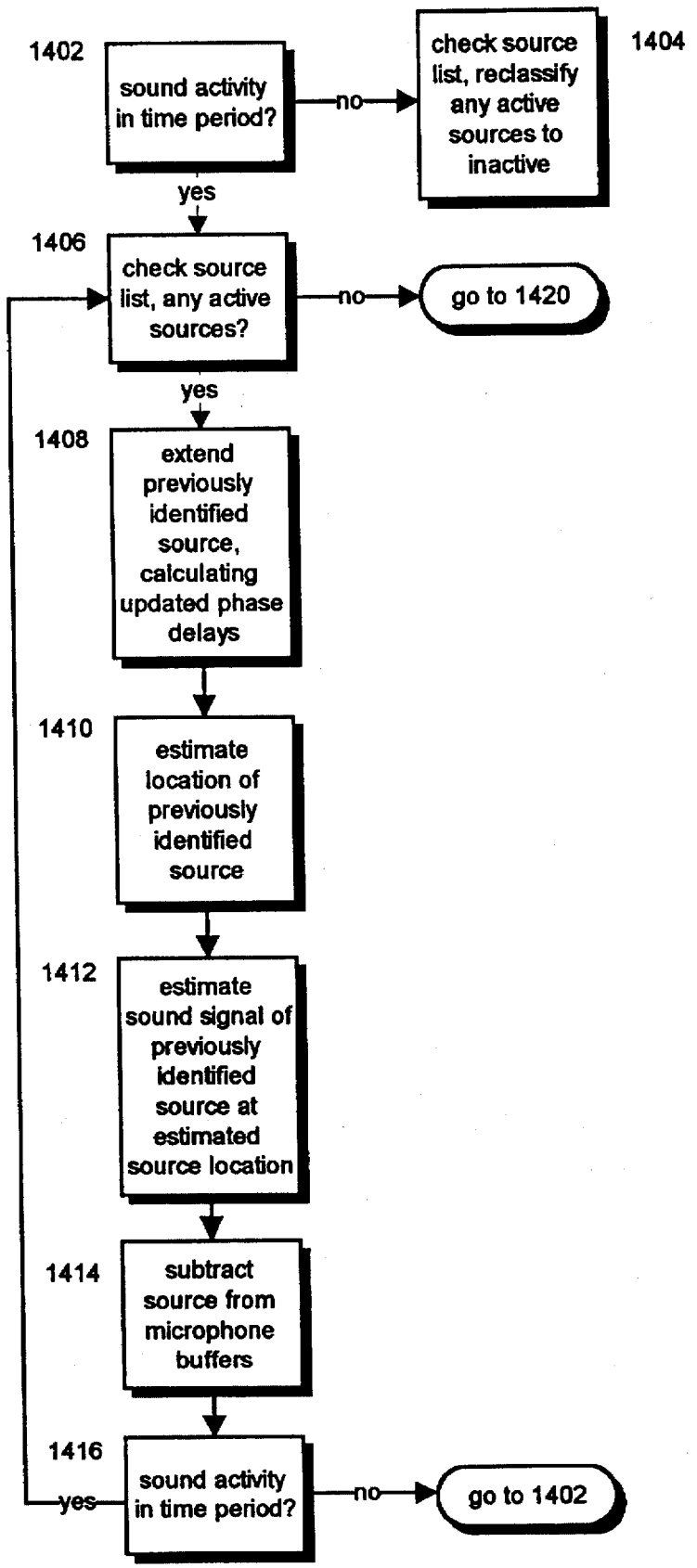
FIGS. 19A and 19B illustrate, as examples, certain substeps elaborating on step 1106 of FIG. 18, wherein the depicted substeps are preferably performed by each of the group processors of the audio capture and encoding subsystem of FIG. 17A.
Figure 19B:
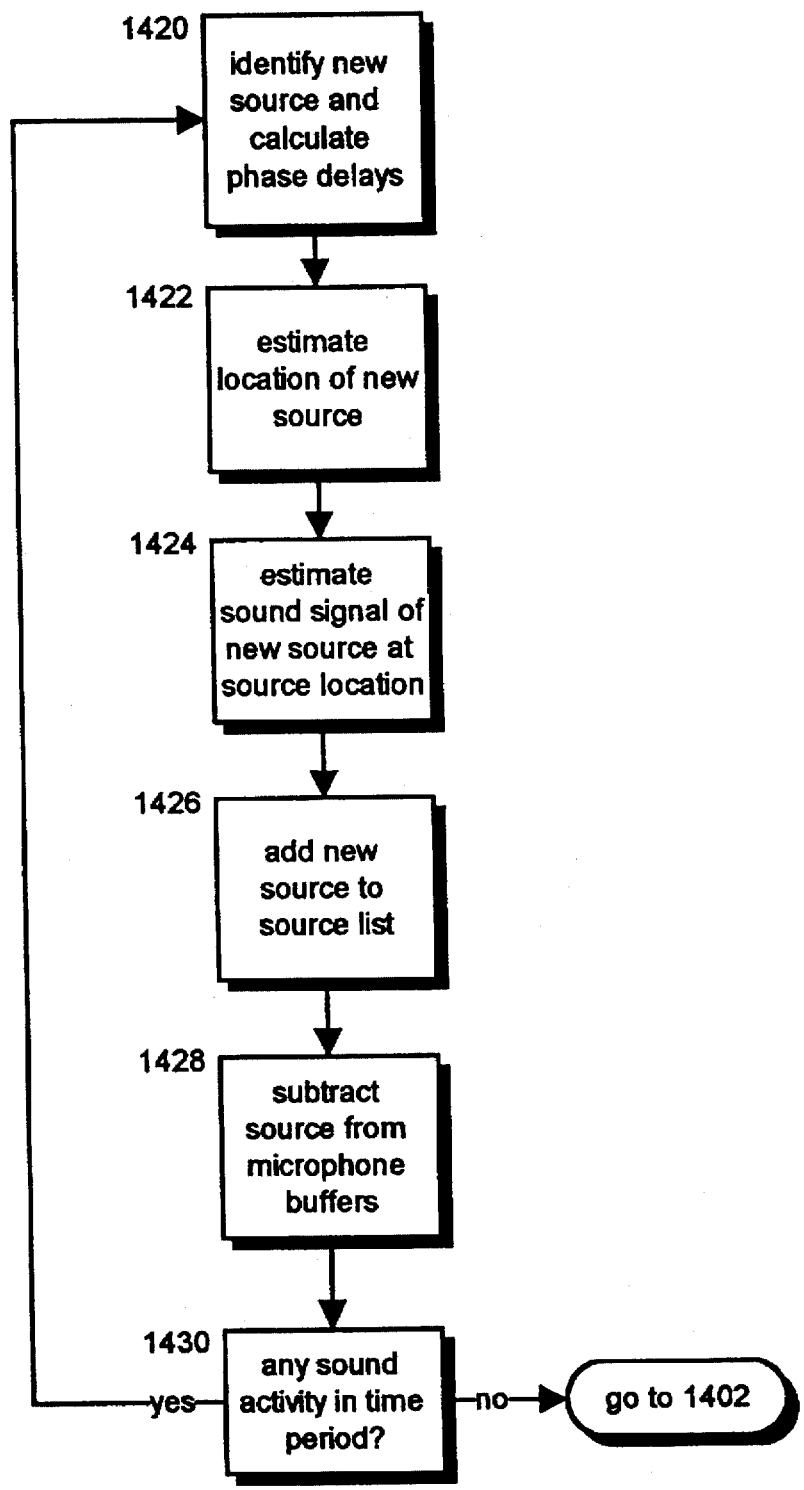

FIGS. 19A and 19B illustrate, as examples, flow diagrams elaborating on step 1106 of FIG. 18, wherein the following steps are understood to be performed by each of the group processors, 1302-1 to 1302-m, preferably in parallel.

In a first step 1402, the group processor (e.g., 1302-1) waits for the next segment of data to arrive in the microphone data buffers. It then checks for sound activity in the live action space by processing data from a last (i.e., most recent) data segment in the data buffer of the microphone farthest away from any point in the live action space, which microphone is always last of the microphones in the group to pick up a sound source within the live action space (e.g., microphone 122-1 as described in reference to FIG. 11). For descriptive purposes, the microphone in each group of microphones, farthest away from any point in the live action space is assumed herein to be microphone #1. Also, in the following discussion, the start time associated with the last data segment is denoted as time $t_{k-1}$, and the data segment in the data buffer of the selected microphone is generally denoted as $MD(i,t_{k-1})$, where the data segment in this case is understood to include, for the ith microphone, all digitized audio samples in the time period $(t_{k-1}, t_k)$ including the digitized audio sample corresponding to time $t_{k-1}$, but not the digitized audio sample corresponding to time $t_k$.

The group processor (e.g., 1302-1) checks for any spatial sounds arriving at microphone #1 during the time period of the last data segment in microphone #1's data buffer (e.g., $t_{k-1} \leq$ time period $< t_k$) by calculating a root-mean-square "RMS" value from the audio samples included in the last data segment. If the calculated RMS value is less than some constant (e.g., C1), then no significant spatial sounds are determined to be arriving during the period of the data segment, and the next step performed by the group processor (e.g., 1302-1) is step 1404. On the other hand, if the RMS value is greater than or equal to the constant (e.g., C1), then spatial sounds are determined to be arriving during the period of the data segment, and the next step performed by the group processor (e.g., 1302-1) is step 1406.

Referring first to step 1404, if the group processor (e.g., 1302-1) determines that no significant sounds are arriving at microphone #1 during the time period of the last data segment, then the group. processor (e.g., 1302-1) checks the group's source list for any spatial sound sources indicated as being active. If any spatial sources are indicated as being active, then the group processor (e.g., 1302-1) reclassifies those sound sources as being inactive. Step 1402 is then repeated for a new data segment from the selected microphone's data buffer corresponding to a next time period $(t_k, t_{k+1})$, as soon as this data is present.

Referring now to step 1406, if the group processor (e.g., 1302-1) determines that significant spatial sounds are arriving at microphone #1 during time period $(t_{k-1}, t_k)$, then the group processor (e.g., 1302-1) first checks whether any previously identified spatial sound sources are still active by checking the group's source list. If there are one or more previously identified spatial sound sources which are listed as being active, then the group processor (e.g., 1302-1) continues with step 1408 to update the previously identified sound sources with new information before looking for new spatial sound sources. On the other hand, if there are no previously identified spatial sound sources which are listed as being active, then the group processor (e.g., 1302-1) continues with step 1420 to identify new spatial sound sources.

Referring first to step 1408, if the group's source list indicates previously identified spatial sound sources as being active, then the group processor (e.g., 1302-1) updates (also referred to herein as "extends") each of the listed active spatial sound sources before locating new sound sources. The spatial sound sources are processed in decreasing order of their respective RMS (root-mean-square) values of their estimated signals during the preceding time period, wherein such RMS values may either be previously calculated and stored in registers similar to those of FIG. 17D, or calculated as needed and not stored. In this manner, the loudest sounds will be processed first, leaving the lowest sounds to be processed last. To update a first one of the listed active sound sources, the data segment described in step 1402 in the data buffer of microphone #1 is preferably correlated against a range of data segments from each of the other data buffers of the other microphones in the group (hereinafter referred to as "microphones #2, #3 and #4").

The center data segment in the range of data segments from each of microphones #2, #3 and #4 preferably starts at an offset time equal to subtracting the microphone's phase delay with respect to microphone #1 for the first one of the listed active sound sources, from the time $t_k$. The phase delay is always subtracted, because microphone #1 is farthest away from any location in the group's coverage region and therefore, microphones #2, #3 and #4 always pick up sound emanating from a spatial sound source before microphone #1 does. The phase delays for microphones #2, #3 and #4 relative to microphone #1 are previously determined and included in the register area (e.g., 1305-1) of the group's memory with other information about the listed active sound source. For descriptive purposes, the phase delay between the ith and jth microphones is denoted herein as "DIFF(i,j)", and the center data segment of the range of data segments from the jth microphone is denoted herein as $MD(j,(t_{k-1}-DIFF(1,j)))$.

The range of data segments from each of the microphones #2, #3, and #4 preferably starts and ends with data segments respectively offset from the center data segment by times $-2\Delta t$ and $+2\Delta t$, where $\Delta t$ is equal to the maximum distance a sound source might travel in the live action space during the time period (e.g., 0.1 seconds) of a data segment divided by the speed of sound, and the factor of 2 accounts for possible errors in position estimation. For example, if the speed of sound is 1,126 feet/second, if the maximum speed of a sound source in the live action space is 30 feet/second, and if the time period of the data segment is 0.1 seconds, then $\Delta t$ would be equal to 0.027 seconds. If the sampling rate is 44.1 KHz, the range of data segments would then include approximately 2,381 segments of data with the first data segment starting at time $(t_{k-1}-DIFF(1,j)-2\Delta t)$, each subsequent data segment starting at a time incremented by the sampling period, and the last data segment starting at a time $(t_{k-1}-DIFF(1,j)+2\Delta t)$.

A set of three correlation functions is thus calculated. The first correlation function, denoted herein as W(1,2), is calculated, for example, by correlating the data segment $MD(1,t_{k-1})$ from microphone #1 against a range of data segments starting with the data segment $MD(2, t_{k-1}-DIFF(1,2)-2\Delta t)$ and ending with the data segment $MD(2, t_{k-1}-DIFF(1,2)+2\Delta t)$ from microphone #2. The second correlation function, denoted herein as W(1,3), is similarly calculated by correlating the data segment $MD(1,t_k)$ from microphone #1 against a range of data segments starting with the data segment $MD(3, t_{k-1}-DIFF(1,3)-2\Delta t)$ and ending with the data segment $MD(3, t_{k-1}-DIFF(1,3)+2\Delta t)$ from microphone #3. The third correlation function, denoted herein as W(1,4), is similarly calculated by correlating the data segment $MD(1,t_k)$ from microphone #1 against a range of data segments starting with the data segment $MD(4, t_{k-1}-DIFF(1,4)-2\Delta t)$ and ending with the data segment $MD(4, t_{k-1}-DIFF(1,4)+2\Delta t)$ from microphone #4. A local maximum nearest zero for each of these correlation functions, W(1,2) to W(1,4), is then compared against a predetermined threshold value (e.g., C2) to determine whether or not the listed active source is still active.

If such a local maximum is not found in each of the correlation functions, W(1,2), W(1,3), and W(1,4), then the listed active source is determined to be inactive (i.e., the spatial sound source has ended). In this case, the group processor (e.g., 1302-1) reclassifies the listed active source as inactive, and repeats step 1408 for the next listed active source in the group's source list. If there are no more listed active sources in the group's source list, then the group processor (e.g., 1302-1) looks for new sources by performing step 1420, as will be subsequently described.

On the other hand, if such a local maximum is found in each of the correlation functions, W(1,2), W(1,3), and W(1,4), then the group processor (e.g., 1302-1) calculates an updated phase delay (denoted herein as DIFF'(1,j) to distinguish it from the previously determined phase delays DIFF (i,j)) between microphone #1 and each of the other microphones #2, #3 and #4 by adding the time offsets of the local maximum of their respective correlation functions to their previously determined phase delays. The group processor (e.g., 1302-1) then estimates the new source location for this active sound source and the audio signal generated at that estimated new source location, from the updated phase delays (DIFF'(1,j) for j=2,3,4).

In step 1410, the group processor (e.g., 1302-1) estimates the new source location (hereinafter referred to as "SP(x)" for the xth spatial sound source) of the active sound source by computing, for example, the intersection(s) of three hyperboloids, each hyperboloid based upon the phase delay between microphone #1 and one of the other microphones. The solution set may contain several points, but at most one point can lie within the group's coverage region. The new source location is estimated to be that point, and the group processor (e.g., 1302-1) updates such source location in the source list. If none of the points in the solution set lies in the group's coverage region, however, then the group processor (e.g., 1302-1) reclassifies the listed active source as inactive, and either repeats step 1408 for the next listed active source in the source list, or performs step 1420 if there are no more listed active sources in the source list.

In step 1412, assuming that the listed active sound source is still determined to be active in step 1410, then the sound signal emanating from the new source location and arriving at microphone #1 during the time period $(t_{k-1}, t_k)$ is estimated. This is done, for example, by first computing a Fourier transform of a segment of data from each of data buffers of the microphones #1, #2, #3, and #4. For convenience, the segments of data for such computation are denoted herein as Vj=MD(j, $t_{k-1}$+DIFF'(1, j)), where j=1 to 4, and their respective Fourier transforms are denoted herein as Vj*. The computed transforms are then normalized with respect to distance attenuation and microphone sensitivity by dividing each Vj* by a respective factor Yj*SENS(j, SP(x)), where Yj is the squared distance from the source location SP(x) to microphone j, and SENS(j,SP(x)) is the sensitivity of microphone j to sounds emanating from the source location SP(x). The sensitivity of each microphone with respect to the sound source can be calculated from the angle of SP(x) with respect to the directional axis of the microphone, since each microphone is preferably a unidirectional microphone having a conventional cardiod attenuation shape. For convenience, the normalized transforms of Vj* are denoted herein as Vj**.

From the normalized transforms Vj**, a new transform U(f)* is then formed by performing the following steps on both the sine and cosine portions of the normalized transforms Vj. At each frequency "f", the corresponding values from each of the Vj are compared. If all four values are the same sign, then the value for the new transform U(f)* at that frequency is selected to be the one of the four values having the least absolute value. On the other hand, if all four values are not the same sign, then the value for the new transform U(f)* at that frequency is selected to be zero. This is done in order to eliminate signals from other spatial sound sources with uncorrelated phases during the time period.

The estimated sound signal for the active source "x", relative to its source location SP(x), is then calculated, for example, from the inverse transform U(t) of the new transform U(f)*, and digitized audio samples taken therefrom at the audio sampling rate (e.g., 44.1 KHz). The end time T for the time period relative to the source location is estimated, for example, by subtracting from $t_{k-1}$ the time it takes sound to travel from the estimated source location SP(x) to the selected one of the microphones. The group processor (e.g., 1302-1) then computes the difference D between T and the end time of the previous chunk in the buffer of source "x". It performs a process known as "sample rate conversion" to expand or shrink the array of samples U(t) so that it occupies time D. For additional details on such sample-rate conversion techniques, see, e.g., *Multirate Digital Signal Processing* by R. E. Crochiere and L. R. Rabiner, Prentice-Hall, New Jersey, 1983, pp. 13–57, which details are incorporated herein by this reference. The group processor (e.g., 1302-1) then stores the resulting samples in the respective source buffer of source "x" at addresses immediately following the previous chunk. The information thus stored can then be used to generate a next audio data chunk having the format as described in reference to FIG. 14B.

In step 1414, the group processor (e.g., 1302-1) then subtracts the estimated sound signal U(t) thus estimated from each of the data buffers (e.g., 1310-1 to 1310-4) of each of the microphones by first respectively relating it back to each of the microphones (i.e., taking into account the distance between the sound source location SP(x) and the microphone location MP(j)) before subtracting it from data stored in the data buffers. This is done, for example, by dividing the estimated sound signal U(t) by a normalization factor, Yj*SENS(j,SP(x)), for j=1 to 4, and subtracting the result from the respective data buffers beginning at respective times ($t_{k-1}$+DIFF'(1, j)), for j=1 to 4.

In step 1416, after extending the xth spatial sound source, the group processor (e.g., 1302-1) then checks the resulting data segment MD'(1,$t_{k-1}$) from step 1414, for sound activity in a similar fashion as described in reference to step 1402. In particular, by calculating a root-mean-square "RMS" value from the audio samples included in the resulting data segment, and comparing the RMS value to some constant (e.g., C3), wherein C3 may be the same value as C1 or a lower value as determined through experience with a particular type of live action event. If the RMS value is less than C3, then no additional spatial sounds are determined to be arriving at microphone #1, and the next step performed by the group processor (e.g., 1302-1) is step 1402. On the other hand, if the RMS value is greater than or equal to C3, then sound activity is determined to be occurring in the coverage region of that group, and the next step performed by the group processor (e.g., 1302-1) is to return to step 1406.

Referring now to step 1420 of FIG. 19B, after determining that no active sound sources remain on the spatial microphone group's source list, or after extending all remaining active sound sources per steps 1308–1316 of FIG. 19A, the group processor (e.g., 1302-1) then looks for new sound sources being picked up by the group in the time period $(t_{k-1}, t_k)$. It does this, for example, by reading a range of data segments from each of the data buffers (e.g., 1310-2 to 1310-4) of each of the other microphones #2, #3 and #4, and correlating these data segments with a weighted product, for example, of microphone #1's data segment MD(1, $t_{k-1}$) and a decaying exponential function exp(–C4, t), to generate a set of three correlation functions (denoted herein as CORR(j,t) for j=2 to 4, where j represents the microphone being correlated with microphone #1). The first of the range of data segments for each of the microphones #2, #3 and #4, starts at a time $t_{k-1}$-F/G, where F is the distance of the microphone to microphone #1 (e.g., x, y and z in FIG. 11) and "G" is the speed of sound, and the last of the range of data segments for each of the microphones #2, #3 and #4, starts at the time $t_k$. For example, the first data segment correlated against the microphone #1 data segment MD(1, $t_{k-1}$) from microphone #2's data buffer would be MD(2, $t_{k-1}$-x/G), the first data segment from microphone #3's data buffer would be MD(3, $t_{k-1}$-y/G), and the first data segment from microphone #4's data buffer would MD(4, $t_{k-1}$-z/G). Use of the weighted product has been found in practice, to emphasize the onset of new periodic signals and consequently, to improve accuracy of such identification. The phase delays experienced between microphone #1 and the other microphones #2, #3 and #4 are then determined, for example, by finding the value of "t" that maximizes the function CORR(j, t)−(C6)*t, for j=2 to 4, and comparing the maximum with a constant (e.g., C5). If the maximum is less than C5, then the group processor (e.g., 1302-1) determines that no new spatial sound sources are present in the group's coverage region, and goes back to step 1402 of FIG. 19A. If, on the other hand, the maximum is greater than or equal to C5, then the group processor (e.g., 1302-1) determines the respective phase delays of the new sound source relative to microphone #1 and each of the other microphones #2, #3 and #4, from the values of "t" that maximized their respective functions CORR(j, t)−(C6)*t, for j=2 to 4.

In step 1422, the source location of the identified new sound source is calculated by the group processor (e.g., 1302-1) in the same manner as described in reference to step 1410 of FIG. 19A.

In step 1424, the audio signal emanating from the new sound source location determined in step 1422 and arriving at microphone #1 during the period ($t_{k-1}$, $t_k$) is estimated in the same manner as described in reference to step 1412 of FIG. 19A.

In step 1426, the group processor (e.g., 1302-1) adds the new source to the group's source list by locating a source ID#]that is not currently active, and storing an active indication in the corresponding status register (if all source ID#s are active, the processor returns to step 1402). The processor then stores the segment's start time in the start time register for the first data chunk associated with the source ID# (e.g., 1317-1 for source ID#1), stores its emanating location (in world coordinates) in the source location register for the first data chunk associated with the source ID# (e.g., 1314-1 for source ID#1), and stores a number of estimated digitized sound samples for a period of time as calculated in step 1424, in the corresponding location of the source data buffer associated with the source ID# (e.g., source data buffer 1312-1 for source ID#1).

In step 1428, the group processor (e.g., 1302-1) subtracts the estimated audio signal of the new sound source from the remaining data of original data segment MD(1,$t_{k-1}$), in the same manner as described in reference to step 1414 of FIG. 19A.

In step 1430, the group processor (e.g., 1302-1) checks for any additional sound activity in the data of the original data segment MD(1,$t_{k-1}$) remaining after step 1428, in the same manner as described in reference to step 1416 of FIG. 19A, and if such sound activity should exist, the group processor (e.g., 1302-1) repeats step 1420 looking for another new sound source, or if such sound activity does not exist, the group processor (e.g., 1302-1) goes back to step 1402 of FIG. 19A and processes the next data segment MD(1,$t_k$).

Referring back to FIG. 18, the subsystem processor 1306 performs several tasks. First, for example, it extracts chunks from the source data buffers (e.g., 1304-1) of the various microphone groups and from the buffers of ambient microphones 1350, and formats the chunk header as shown in FIG. 14B. Second, it modifies the source ID#s so that sources from different groups are assigned different ID#s. Third, the sequence of source locations for a given spatial sound source (e.g., source ID #1) are subjected to a low pass filter or other data-smoothing technique to reduce the effect of errors in estimation.

In addition, the subsystem processor 1306 eliminates spatial sound sources redundantly identified by two or more groups of spatial microphones (e.g., step 1110 in FIG. 18). Such redundant identification may occur, for example, when the coverage regions of two spatial microphone groups overlap so that a single spatial sound source may be detected by both groups. It is important to replace such "multiple detections" by a single instance, however, since the sound would otherwise be reproduced approximately twice too loud.

To eliminate redundant chunks, the subsystem processor 1306 examines the sequences of audio data chunks from all microphone groups in order of increasing start time. For a first audio data chunk from a first spatial microphone group, the subsystem processor 1306 examines all audio data chunks from the other spatial microphone groups having a start time within the time period associated with the first audio data chunk, and compares the distances of their source locations to the source location of the first audio data chunk. If the corresponding source locations of any of the audio data chunks from the other microphone groups are within a certain distance (e.g., C7) from that of the source location corresponding to the first audio data chunk, then those audio data chunks are potentially identified as being the same source. Thereupon, all such audio data chunks identified as being potentially the same source as that of the first audio data chunk are compared by their power spectra against the power spectra of the first audio data chunk. If the compared power spectra correlate above some constant (e.g., C8), then the two audio data chunks are presumed to correspond to the same sound source, and all such redundant audio data chunks are eliminated. Before such elimination, however, information from the redundant audio data chunks may be used to improve the estimations of the source location and the audio signal at that source location. For example, a weighted average of the source locations may be computed by assigning heavier weights to those microphone groups which pick up the sound source with the least attenuation (i.e., oriented towards the sound source and/or closer to the sound source), and/or those microphone groups which have picked up fewer spatial sound sources during the time period (i.e., have less interference from other sound sources).

Figure 20:
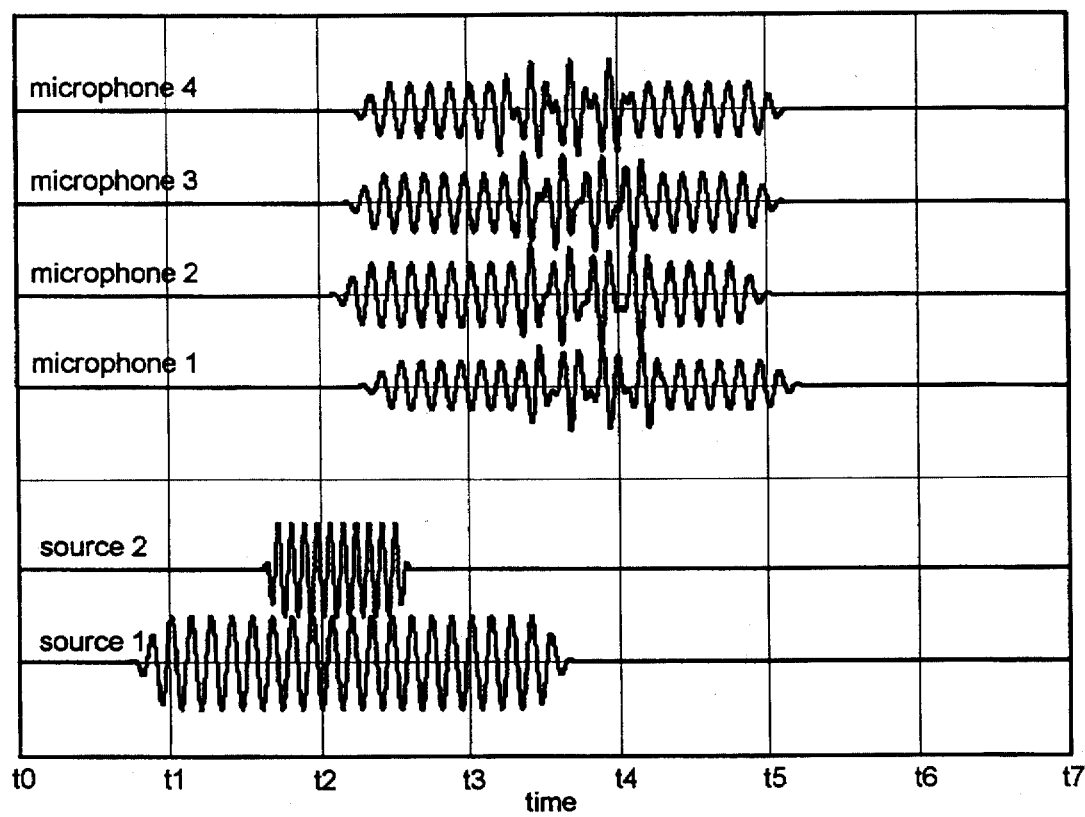
FIG. 20 illustrates, as an example, the individual sound signals respectively generated by two spatial sound sources, and the audio signals from each microphone in a group of microphones responding to the sound signals generated by the two spatial sound sources.

The steps of FIGS. 19A and 19B are now further elaborated upon and clarified by means of an example performed by computer simulation. In FIG. 20, the audio signals of each of the microphones of a group of microphones is shown, along with the two spatial sound sources causing the audio signals. In this example, the spatial sound source designated as "source 1" is at world coordinates (5,3,2), and the spatial sound source designated as "source 2" is at world coordinates (2,3,6). The microphone designated as "microphone 1" is at world coordinates (0,0,0), the microphone designated as "microphone 2" is at (1,0,0), the microphone designated as "microphone 3" is at world coordinates (0,1,0), and the microphone designated as "microphone 4" is at world coordinates (0,0,1). Further, the speed of sound is assumed, for the purposes of this example, to be 4 units/second, and a data chunk is assumed, for the purposes of this example, to be 1 time unit as shown in the FIG. 15. It is also assumed, for the purposes of this example, that the group's source list has no active sound sources at time 0.

Starting with step 1402 of FIG. 19A and the data segment of microphone 1 corresponding to the time period (t0, t1), no sound activity is detected since the RMS value of this data segment is less than a constant C1, which is equal to 0.2 for the purposes of this example. Accordingly, since no active sound sources are found in the group's source list, step 1402 is repeated with the next data segment of microphone 1 corresponding to the time period (t1, t2). Again, since no sound activity is detected and no active sound sources are found in the group's source list, step 1402 is repeated with the next data segment of microphone 1 corresponding to the time period (t2, t3).

During the time period (t2, t3), the RMS value of the corresponding data segment of microphone 1 is calculated to be 0.28, which is greater than C1. Since no active sound sources are currently in the source list, the group processor (e.g., 1302-1) jumps to step 1420 of FIG. 19B to locate new sound sources.

Figure 21A:
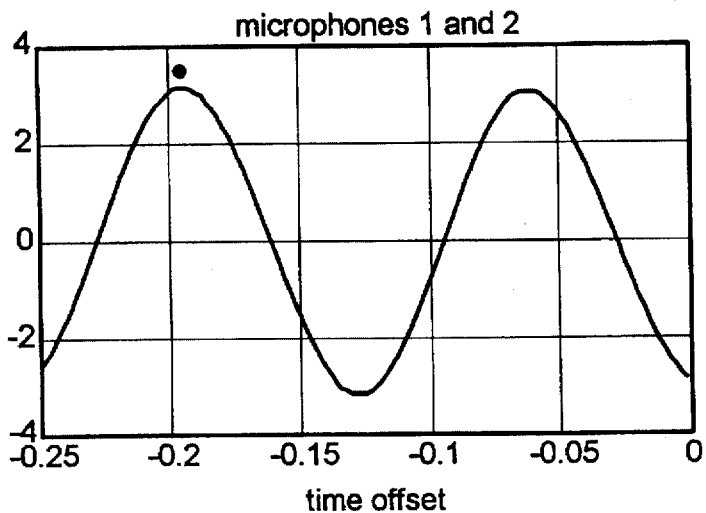
FIGS. 21A-21C respectively illustrate, corresponding to the example of FIG. 20, correlation functions for microphones 1 and 2, microphones 1 and 3, and microphones 1 and 4.
Figure 21B:
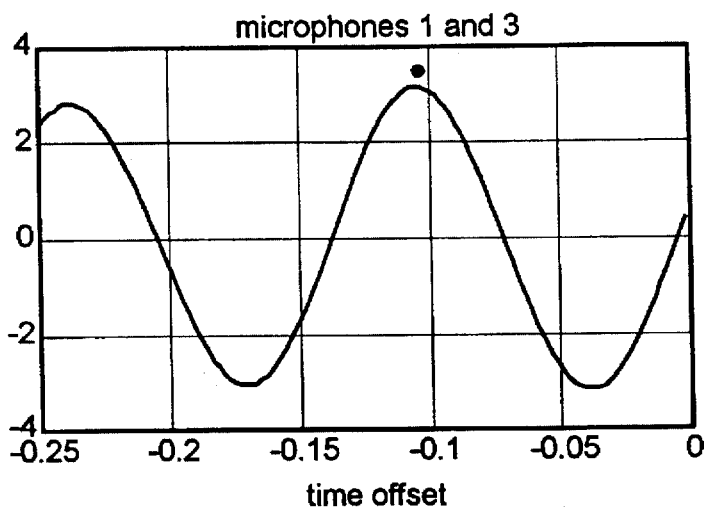
Figure 21C:
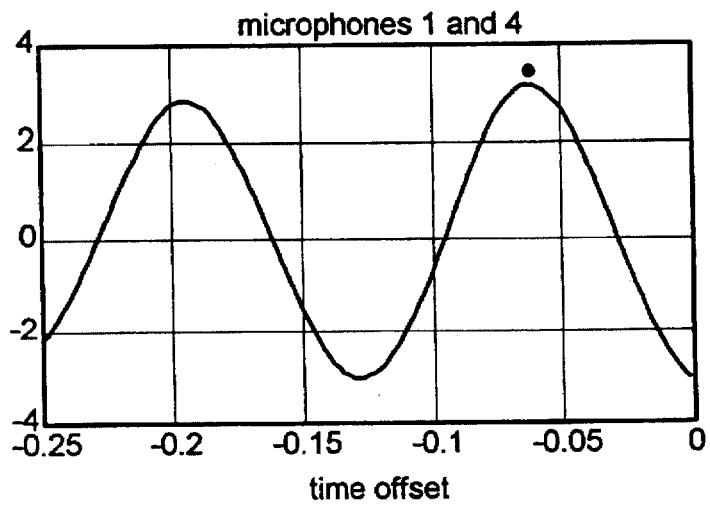
Figure 22A:
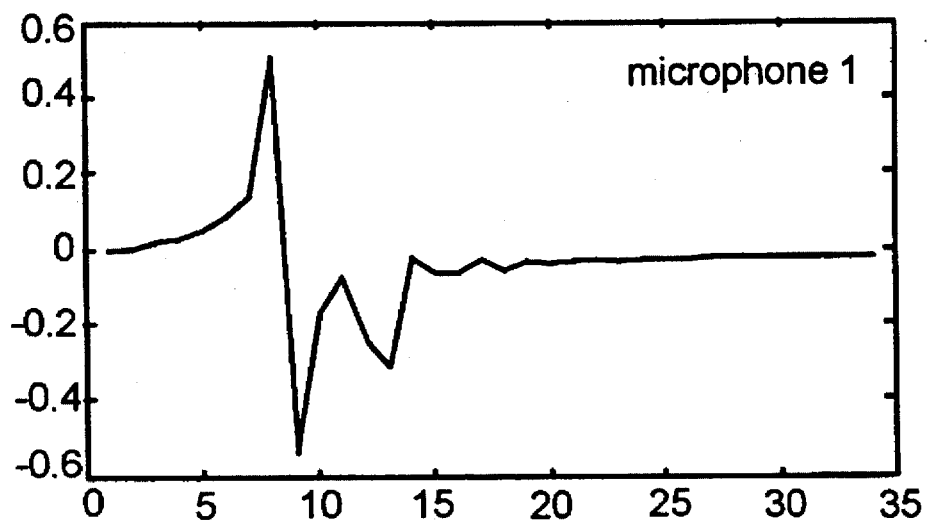
FIGS. 22A-22D respectively illustrate, corresponding to the example of FIG. 20, the sine portions of the normalized Fourier transforms $V(f)^{**}$ of data segments from microphone 1, microphone 2, microphone 3, and microphone 4.
Figure 22B:
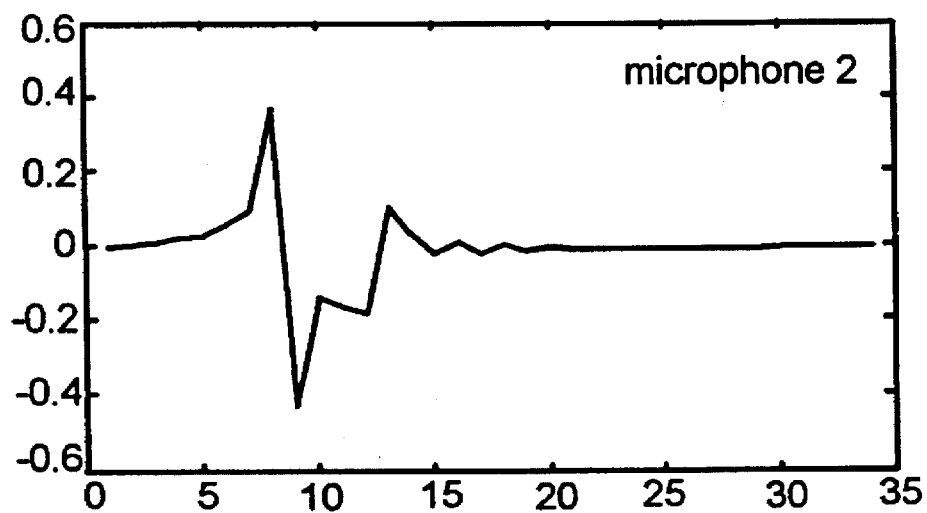
Figure 22C:
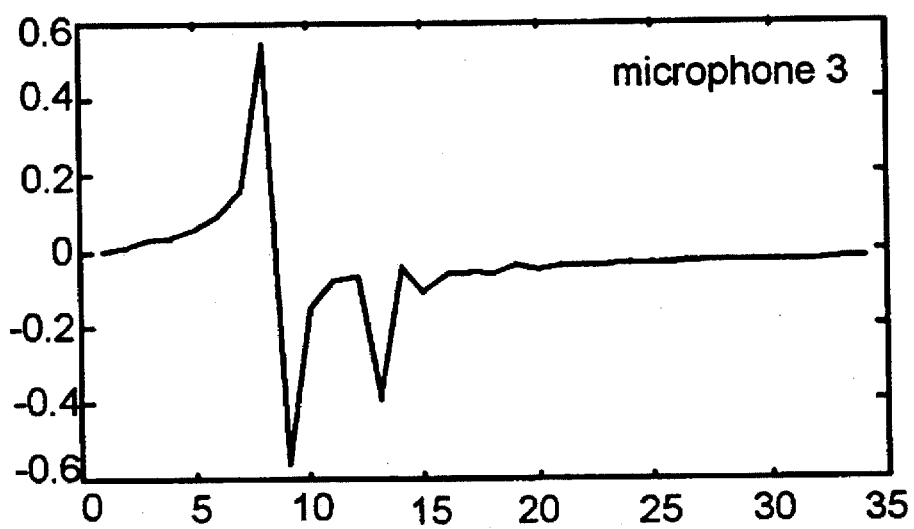
Figure 22D:
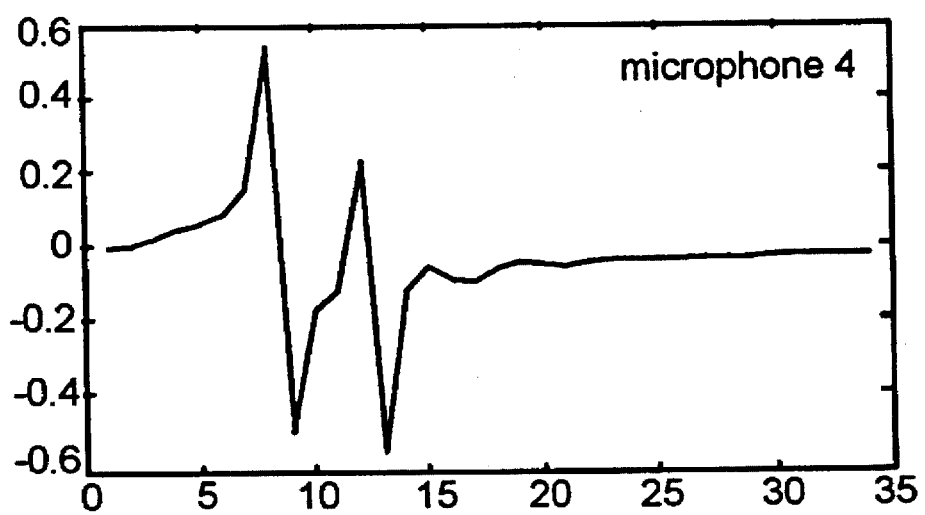

FIGS. 21A to 21C respectively illustrate the resulting correlation functions for microphones 1 and 2, microphones 1 and 3, and microphones 1 and 4. In calculating these correlation functions, a weighted product for microphone 1 was calculated, as described in reference to step 1420 of FIG. 19B, and correlated with the time offset data segments of microphones 2 through 4, as described in reference to step 1420 of FIG. 19B. The local maximum nearest zero for each of the correlation functions is indicated by a dot over the corresponding peak. The peaks in the correlation functions are shown to correspond to offsets of −0.195, −0.105 and −0.0625 time units. From these time offsets, as described in reference to step 1422 of FIG. 19B, the source location SP(1) of the first new sound source is calculated to be at world coordinates (5.18, 3.10, 2.06), which estimation is reasonably close to the actual location of source 1 being (5,3,2).

FIGS. 22A to 22D illustrate the sine portions of the normalized Fourier transforms V(f) of the data segments respectively corresponding to microphone 1, microphone 2, microphone 3, and microphone 4, wherein the data segment corresponding to microphone 1 is for the period (t2, t3), and the data segments corresponding to microphones 2, 3 and 4 are for the time offset data segments as described in reference to step 1424 of FIG. 19B. Although the cosine portions of the normalized Fourier transforms V(f) are not shown, they are also calculated.

Figure 23:
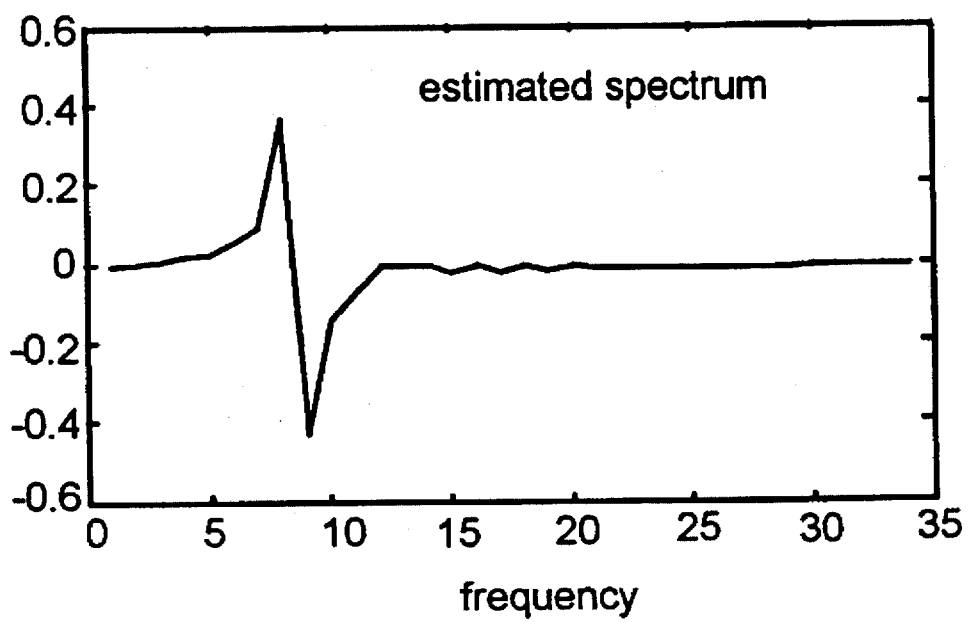
FIG. 23 illustrates, corresponding to the example of FIG. 20, the sine portion of the new transform $U(f)^*$ calculated from its corresponding normalized sine transform $V(f)^{**}$.

FIG. 23 illustrates the sine portion of the new transform U(f)*, calculated as described in reference to step 1424 of FIG. 19B. In particular, the new transform U(f)* is calculated at each frequency by taking the value of the FIGS. 22A to 22D having the least absolute value, if all four values have the same sign, or zero otherwise. A similar cosine portion of the new transform U(f)* is also calculated in the same manner from the cosine counterparts of FIGS. 22A–22D. The sine and cosine portions of the new transform U(f)* are also denoted herein as the estimated sine and cosine spectra.

Figure 24:
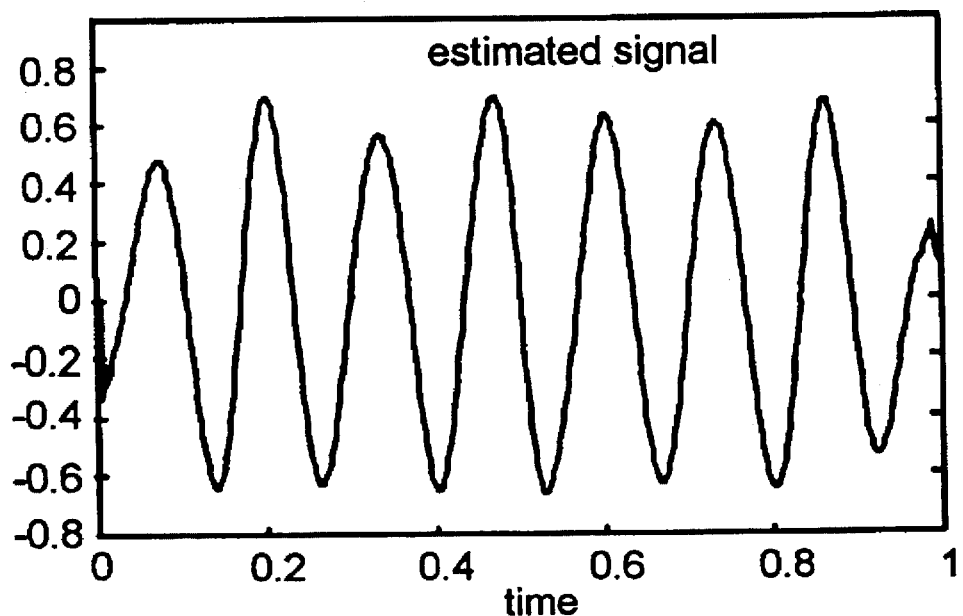
FIG. 24 illustrates, corresponding to the example of FIG. 20, the estimated spatial sound signal for source ID#1 computed from the inverse Fourier transforms $U(t)$ of the sine and cosine portions of the new transform $U(f)^*$.

FIG. 24 illustrates the estimated signal computed from the inverse Fourier transform of the estimated sine and cosine spectra, as described in reference to step 1424 of FIG. 19B. The new sound source is then added to the group source list as source ID#1, for example, classified as active, a corresponding start time relative to its source location calculated, and the start time and source location stored in the source list along with a number of digital samples of the estimated signal. The estimated signal appears to compare well with that of source 1 in FIG. 20.

Figure 25:
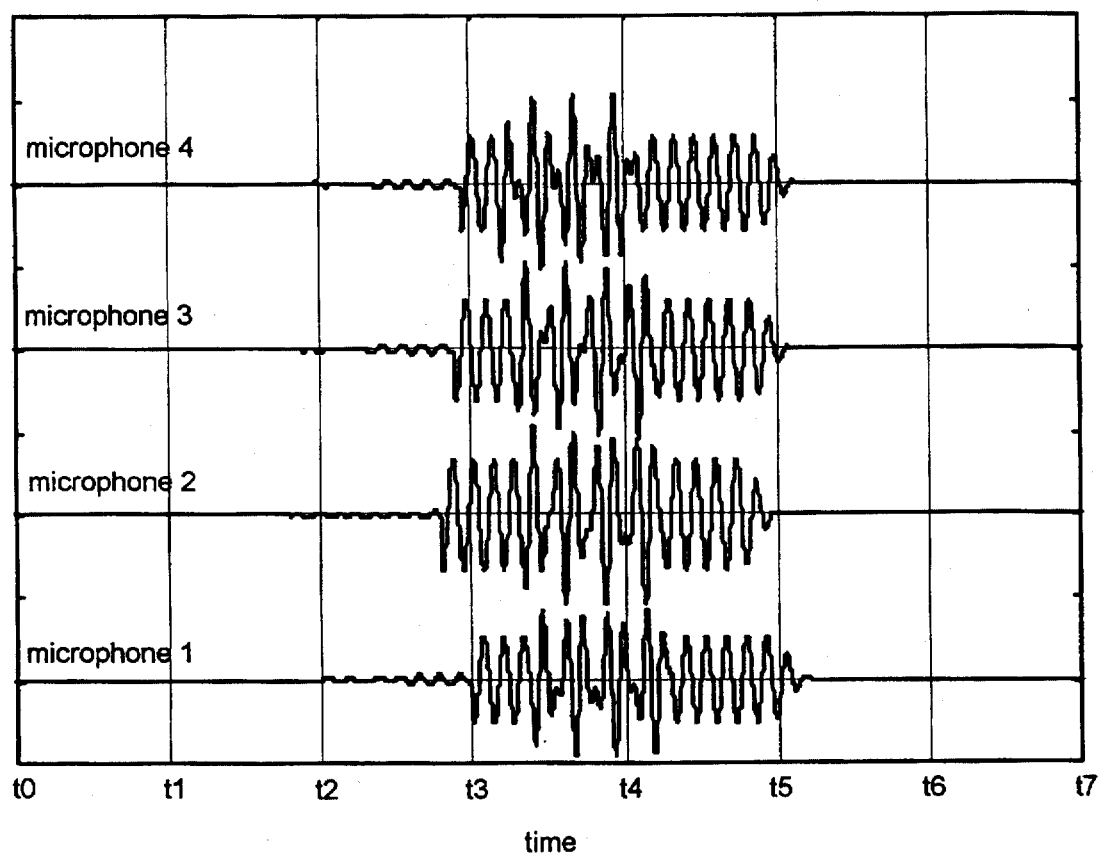
FIG. 25 illustrates, corresponding to the example of FIG. 20, the remaining signal in the data buffers corresponding to microphones 1, 2, 3, and 4 after relating the estimated signal for source ID#1 back to each of the microphones 1, 2, 3, and 4, and subtracting the related back estimated signals from the original data in the data buffers for the time period (t2, t3)

FIG. 25 illustrates the remaining signal in the data buffers corresponding to microphones 1, 2, 3, and 4 after relating the estimated signal for source ID #1 back to each of the microphones 1, 2, 3, and 4, and subtracting the related back estimated signals from the original data in the data buffers for the time period (t2, t3), as described in reference to step 1428 of FIG. 19B. The remaining signal in the data buffer corresponding to microphone 1 is then checked for additional sound activity during the time period (t2, t3), as described in reference to step 1430 of FIG. 19B. Since the RMS value of the remaining signal during the time period (t2, t3) is negligible, it is determined that no other sound sources are being picked up by microphone 1 during this time period.

The example proceeds by retrieving another data segment from the data buffer corresponding to microphone 1 for the time period (t3, t4). Checking this new data segment for sound activity; after finding sound activity in the new data segment, extending the previously identified source ID #1 by estimating the new location of source ID#1, and estimating the sound signal at the new source location of source ID#1 (updating the source list information for source ID #1); relating the estimated signal for source ID #1 back to each of the microphones 1, 2, 3, and 4, and subtracting the related back estimated signals from the data in the data buffers for the time period (t3, t4). The remaining signal in the data buffer corresponding to microphone 1 is then checked for additional sound activity during the time period (t3, t4). Since the RMS value is found to be equal to 0.29, the group processor (e.g., 1302-1) looks for additional new sound sources, as described in reference to step 1420 in FIG. 19B.

As a result of performing steps 1420 and 1422, a new spatial sound source is identified and located at coordinates (2.56, 3.95, 7.91), which roughly compares with source 2 which is located at (2, 3, 6). The estimated signal at the source location (2.56, 3.95, 7.91) is then calculated as described in reference to step 1424, and the new sound source added to the group's source list as described in reference to step 1426. The new spatial sound source is added to the source list as source ID #2, for example, and classified as being active. The estimated signal for source ID #2 is then related back to each of the microphones 1, 2, 3, and 4, and subtracted from the data in the data buffers for the time period (t3, t4). The remaining signal in the data buffer corresponding to microphone 1 is then checked for additional sound activity during the time period (t3, t4). Since the RMS value is now found to be equal to 0.14, the group processor (e.g., 1302-1) assumes that there are no more sound sources being picked up by microphone #1 during the time period (t3, t4), and moves on the next time period (t4, t5) by retrieving a new data segment corresponding to that period from the data buffer corresponding to microphone 1 and performing the appropriate steps of FIGS. 19A and 19B.

Figure 26:
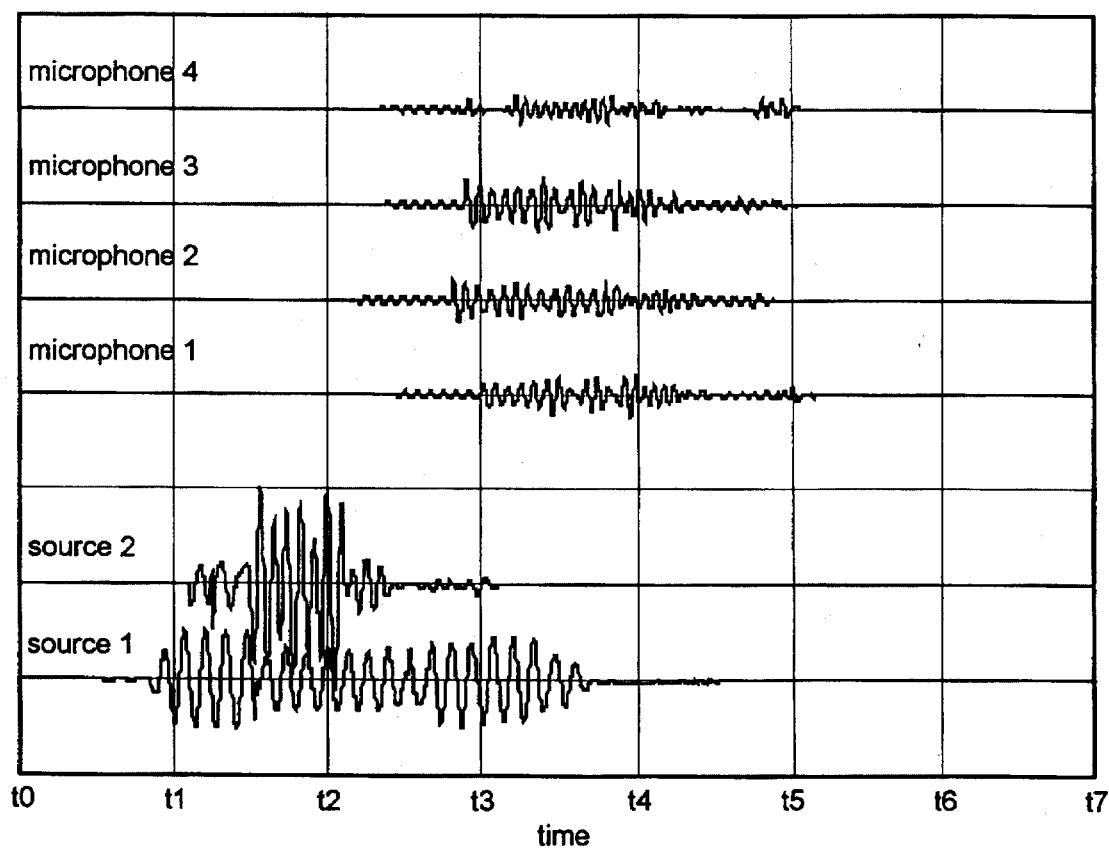
FIG. 26 illustrates, corresponding to the example of FIG. 20, the final results of the computer simulation example.

FIG. 26 illustrates the final results of the computer simulation example. As shown in the figure, after subtracting off the estimated sound signals of the identified spatial sound sources, the remaining signals in the data buffers are negligible (i.e., their RMS values are less than C1 or C3, for example). The group processor (e.g., 1302-1) has identified and extended two spatial sound sources, source ID #1 and source ID #2, which have been respectively estimated to have source locations (4.82, 2.83, 1.83) and (2.17, 3.29, 6.50), which compare favorably with the locations of source 1 and source 2 in FIG. 20 whose respective source locations are (5, 3, 2) and (2, 3, 6).

Rendering System

As shown in FIG. 5, the rendering subsystem 30 includes a number of processors and subsystems. A control processor 304 provides an interface to the distribution subsystem 20 by transmitting selection control signals 324 to the distribution subsystem 20, and receiving the incoming data stream 132 of a selected live action event from the distribution subsystem 20. The control processor 304 also performs a demultiplexing function on the incoming data stream 132. The control processor 304 strips out the special type data chunks (e.g., FIG. 14C), and provides them to an appropriate processor or subsystem; it strips out the video type data chunks (e.g., FIG. 14A), and provides them to the video rendering subsystem 306; and it strips out the audio type data chunks (e.g., FIG. 14B), and provides them to the audio rendering subsystem 308.

A viewer input processor 310 generates signals 311 indicative of a viewer selected, current virtual viewpoint, and provides the signals 311 to both the video rendering subsystem 306 and the audio rendering subsystem 308 so that the two rendering subsystems render a 3-D experience to the viewer from his or her selected virtual viewpoint. At the beginning of a viewing session, the viewer input processor 310 receives an initial virtual viewpoint from either a special data chunk provided by the control processor 304, or a viewer selected initial virtual viewpoint provided by the viewer through, for example, the selection control device 320 and the control processor 304. During the viewing session, the viewer input processor 310 receives viewer desired changes to the viewer's current virtual viewpoint through viewer manipulation of position/orientation input devices 302, and periodically updates the current virtual viewpoint.

The signals 311 generated by the input processor 310 preferably are indicative of a position vector P(t), and three orientation direction vectors i(t), j(t) and k(t) which together define a "local coordinate system" for the live-action space. For descriptive purposes, the i(t) axis of the local coordinate system is also referred to herein as the "roll axis" and indicates an "ahead" or "forward" direction of the current virtual viewpoint, the j(t) axis is also referred to herein as the "pitch axis" and indicates a "left" direction of the current virtual viewpoint, and the k(t) axis is also referred to herein as the "yaw axis" and indicates an "up" direction of the current virtual viewpoint. The input processor 310 periodically updates and maintains these vectors in its memory.

FIG. 2 illustrates, as an example, the current virtual viewpoint at three points in time. At a time $t_1$, the virtual viewpoint is indicated by its origin $P(t_1)$ and its orientation vectors $(i(t_1),j(t_1),k(t_1))$. At times $t_2=t_1+\Delta t$ and $t_3=t_2+\Delta t$, the virtual viewpoint has moved and its new positions and orientations are respectively indicated by its origin $P(t_2)$ and its orientation vectors $(i(t_2),j(t_2),k(t_2))$.

The position/orientation input devices 302 provide means for a viewer to change his or her virtual viewpoint. In particular, they preferably allow the viewer to independently move right/left, up/down, and forwards/backwards, and to rotate his or her virtual orientation in either direction around the current roll, pitch, and yaw axes. In response to viewer manipulation of the input devices 302, the position/ orientation input devices 302 preferably generate position control signals 321 indicative of ahead, left, and up velocities, and orientation control signals 322 indicative of a pitch angle θ measuring clockwise rotation from vertical around the pitch axis j(t), a roll angle φ measuring clockwise rotation from level around the roll axis i(t), and a yaw angle derivative dΨ/dt measuring the rate of change of the yaw angle Ψ measuring clockwise rotation around the yaw axis k(t).

Figure 27:
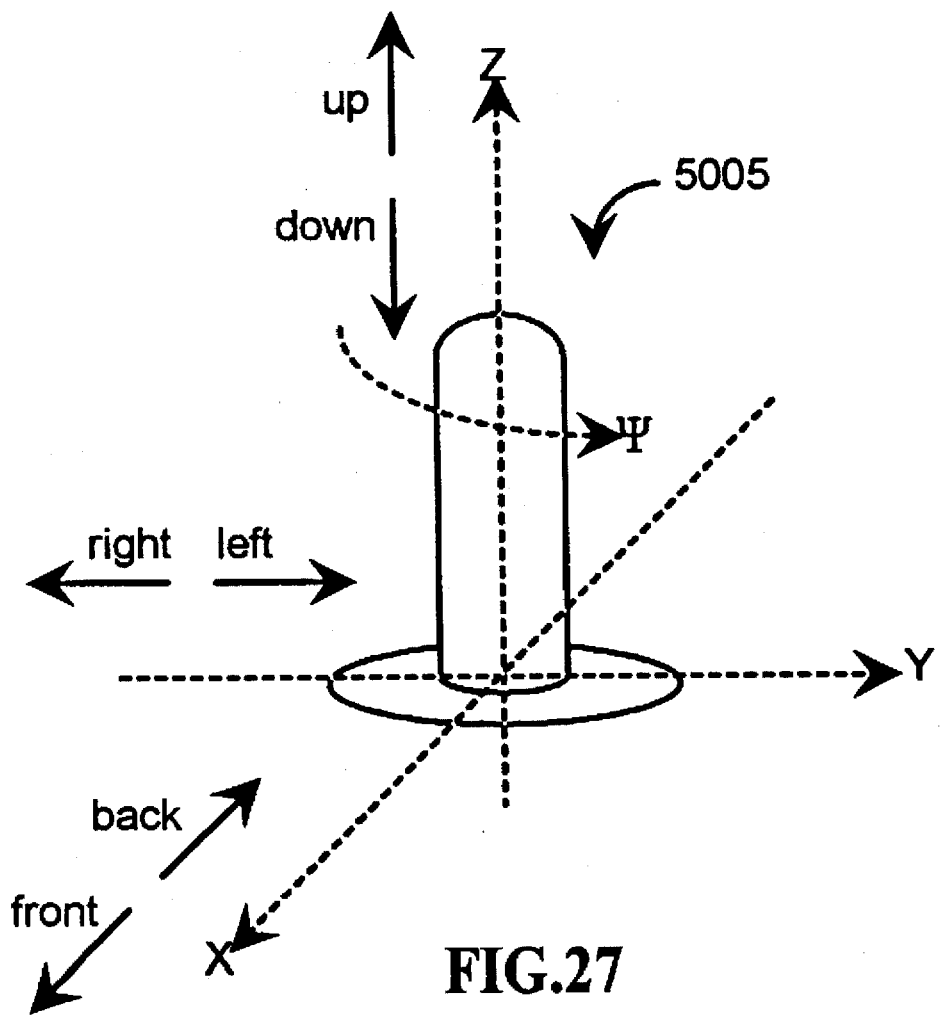
FIG. 27 illustrates, as an example, a joystick preferably used as a position input device for viewer manipulated position control.
Figure 28A:
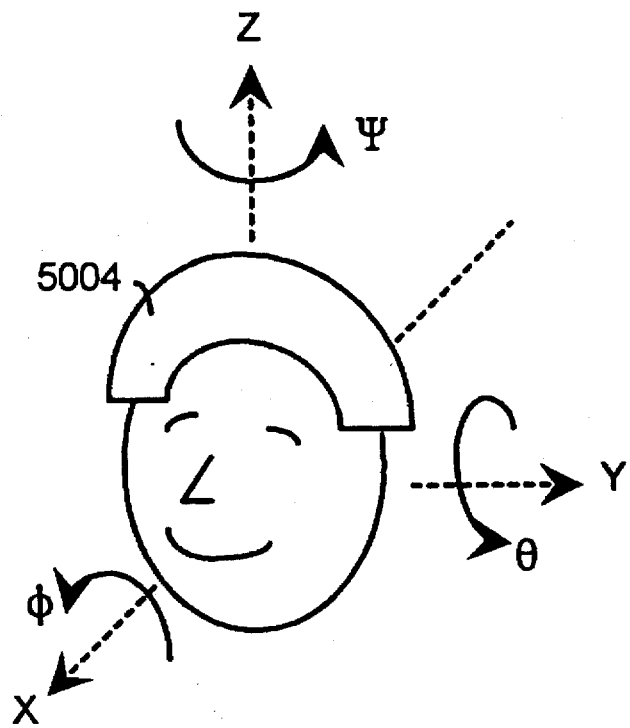
FIGS. 28A and 28B illustrate, as an example, a head mounted unit preferably used as an orientation input device for viewer manipulated orientation control.
Figure 28B:
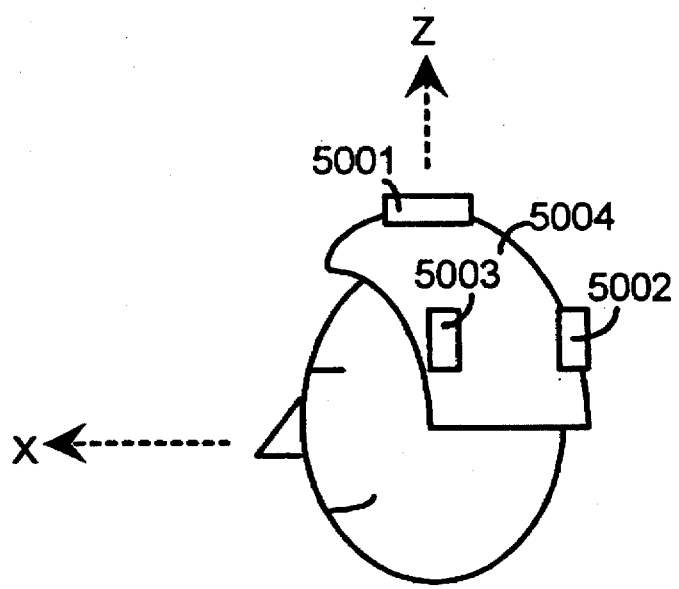

FIGS. 27 and 28 illustrate, as examples, a joystick 5005 and a head mounted unit 5004 preferably used as position/ orientation input devices 302 for viewer manipulated position and orientation control. Using the joystick 5005, the viewer controls his or her left/right and forward/backward velocities (i.e., dj/dt and di/dt, respectively) by moving the joystick 5005 left/right and forward/backward, and her or his up/down velocity (i.e., dk/dt) by pushing/pulling the joystick in its radial direction. Wearing the head mounted unit 5004, the viewer controls his or her apparent orientation in the live action space by appropriate head movements which are detected by sensors 5001–5003 attached to the head mounted unit 5004. In particular, the unit's pitch angle θ is sensed by sensor 5003, the unit's roll angle φ is sensed by sensor 5002, and the unit's yaw angular velocity dΨ/dt is sensed by sensor 5001.

Figure 29:
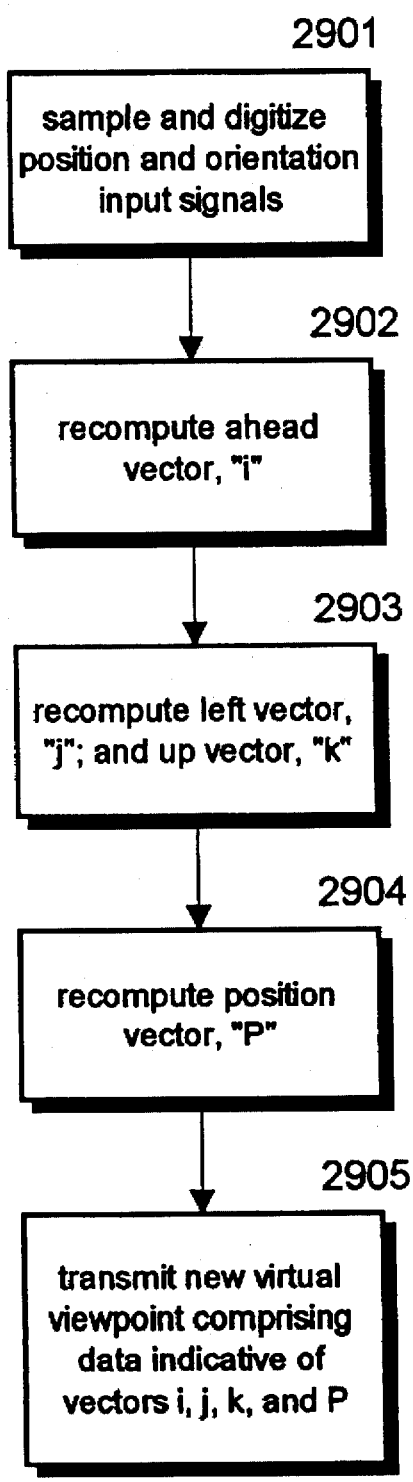
FIG. 29 illustrates, as an example, certain processing steps performed by an input processor in generating the current virtual viewpoint signals 311 from the position and orientation signals received from the position/orientation input devices of FIGS. 27 and 28A-28B.

FIG. 29 illustrates, as an example, certain process steps performed by input processor 310 in generating the current virtual viewpoint signals 311 (e.g., position vector P, and direction vectors i, j and k), from the position signals 321 (e.g., di/dt, dj/dt, and dk/dt) and the orientation signals 322 (e.g., θ, φ, and dΨ/dt) from the position/orientation input devices 302. The input processor 310 periodically performs these steps (e.g., every 10 to 50 milliseconds) to periodically update the current virtual viewpoint stored in its memory and provide it to the video and audio rendering subsystems, 306 and 308, respectively.

In a first step 2901, the input processor 310 samples and digitizes the signals 321 and 322 to obtain, for example, current values for di/dt, dj/dt, dk/dt, θ, φ, and dΨ/dt. These and certain other calculated values, for example, the current yaw angle Ψ, are stored in its memory.

In a second step 2902, the input processor 310 recomputes the ahead vector i by rotating the previous vector i by an angle ΔΨ around the yaw axis k, wherein ΔΨ is computed by multiplying the sampled value of dΨ/dt by the sampling period.

In a third step 2903, the input processor 310 recomputes the left vector j by forming a vector W as the cross-product of the new vector i and the Z axis of the world coordinate system, normalizing W, then rotating W by the angle φ clockwise around the vector i computed in step 2902; and the input processor 310 recomputes the up vector k by taking the cross-product of the just recomputed left vector j and the vector i recomputed in step 2902.

In a fourth step 2904, the input processor 310 recomputes the position vector P by first adding to it the vectors Δi, Δj, and Δk, wherein the vectors Δi, Δj, and Δk are respectively computed by multiplying the sampled values of di/dt, dj/dt, and dk/dt by the sample period, and multiplying the vectors i, j and k by the respective scalars. The input processor 310 then checks the new position vector P to make sure that it lies within an allowable viewing range as defined in a special data chunk previously provided to the input processor 310 by the control processor 304, and stored in its memory. If the new position vector P lies outside the allowable viewing region, then the input processor 310 scales down the vector (to zero if needed) so that the position vector P stays in the allowable viewing region.

Finally, in a step 2905, the input processor 310 transmits the new virtual viewpoint (e.g., updated vectors P, i, j and k) to the video and audio rendering subsystems, 306 and 308.

Figure 30:
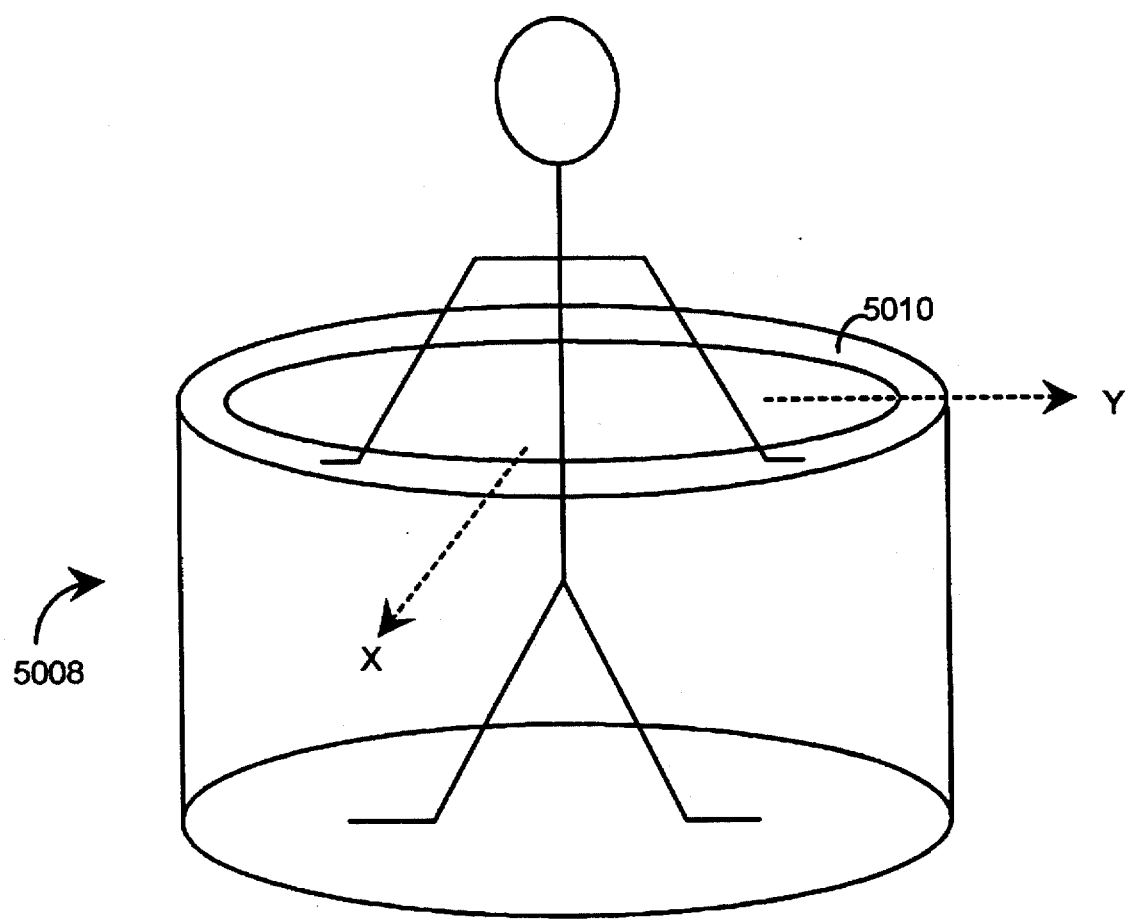
FIG. 30 illustrates, as an example, a ring-structure used as an alternative position control device.

FIG. 30 illustrates an alternative position control device. A viewer stands within a ring 5010, positioned at waist level, connected to a fixed base by supports 5008. The supports are equipped with sensors indicating the direction and magnitude of horizontal force being applied to the ring. The viewer then manipulates his virtual position in the horizontal (X/Y) plane by pressing horizontally against the ring 5010. The sensed pressure is translated into velocity in the corresponding direction relative to the current orientation (when there is no pressure, the viewpoint is stationary). The position is constant in the Z direction (set at approximately eye level relative to the live-action floor, and perhaps adjustable through some other control).

FIG. 27 also illustrates an alternative orientation control device along with the preferred position control means. For orientation control, the joystick 5005 may further be equipped with a rotary potentiometer that detects rotary motion of the joystick 5005 around the axis of its handle. This provides the viewer with a means to control her or his orientation in the yaw axis (i.e., $\Psi$). The pitch and roll angles $\theta$ and $\phi$ are fixed at zero (i.e., level) using this means, however.

In addition to position and orientation controls, the viewer 50 can also control several aspects of the audio output, such as, for examples, the volume levels of spatial sound sources, ambient sound sources, and certain superimposed sound sources. This allows the viewer to experience the live action event with or without an announcer's voice superimposed over the live action spatial and ambient sounds, and with or without the ambient sounds generated by the crowd, for example, at a sporting event. Additional buttons or knobs are included on the selection control device 320 or a positional control joystick, for examples, for providing such viewer selected audio output options.

Video Rendering Subsystem

Figure 31:
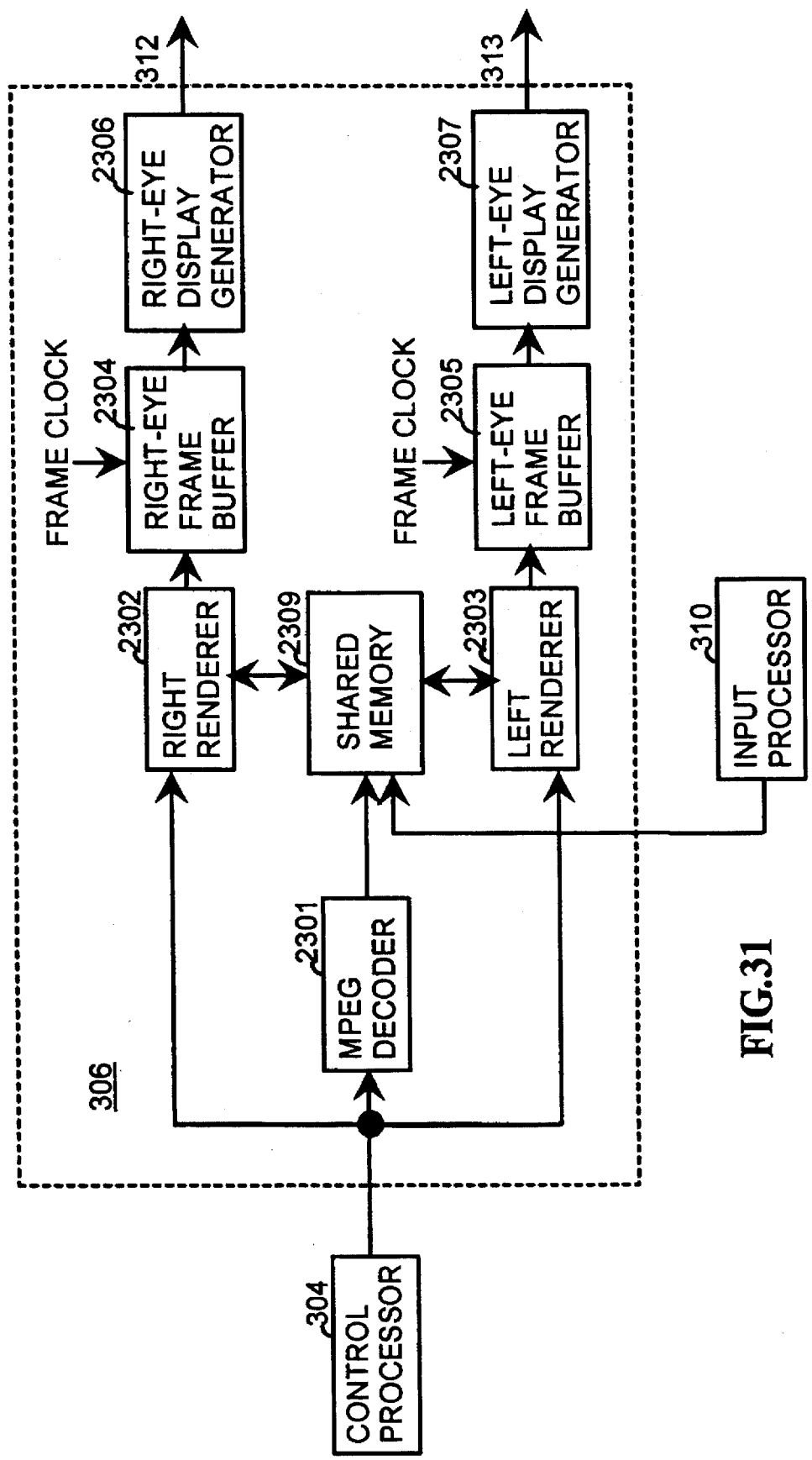
FIG. 31 illustrates, as an example, a block diagram of the video rendering subsystem of FIG. 5.

FIG. 31 illustrates, as an example, a block diagram of the video rendering subsystem 306. The video rendering subsystem 306 simulates the 3-D images of a live action event that a viewer would see from a current virtual viewpoint. In particular, it receives a stream of video data chunks 136 from a control processor 304, for example, and a current virtual viewpoint from a viewer input processor 310, for example, and estimates from such received information, the right-eye and left-eye display images that the viewer would see from a viewer selected position and orientation at a live action event. The video rendering subsystem 306 provides the right-eye and left-eye display images at 30 frames per second, for example, to a video output device 316 through respective right-eye and left-eye channels, 312 and 313, for displaying the simulated 3-D images of the selected live action event to the viewer.

The video rendering subsystem 306 includes a MPEG decoder 2301, a shared memory 2309, a right renderer 2302, a right-eye frame buffer 2304, a right-eye display signal generator 2306, a left renderer 2303, a left-eye frame buffer 2305, and a left-eye display signal generator 2307. In the preferred embodiment, the MPEG decoder 2301, the right renderer 2302, and the left renderer 2303 each receive the incoming video data stream 136 from the control processor 304, for example, and each read certain portions therefrom for processing. For example, if the incoming video data stream 136 resembles the structure depicted in FIG. 14A, the MPEG decoder 2301 preferably reads a time contained in word 904 (associated with the compressed 2-D data contained in fields 910), and a number of chunks containing compressed video frames, each chunk consisting of a camera pair identifier# contained in word 906 (associated with the compressed 2-D data contained in fields 910), a #bytes contained in word 908 (indicating the number of bytes of compressed 2-D data contained in fields 910), and the compressed 2-D data contained in fields 910; and the right and left renderers, 2302 and 2303, preferably read the time contained in word 904 (associated with the mesh data contained in fields 912-1 to 918-1, to 912-k to 918-k), a word 906 indicating the camera pair with which subsequent meshes are associated, and a number of chunks describing 3-D triangle meshes, each chunk including a #bytes indicator contained, for example, in word 912-1 (indicating the number of bytes in fields 914-1 to 918-1 that follow), a #vertices contained, for example, in word 914-1 (indicating the number of vertices contained in field 916-1), vertex coordinates, in world coordinate units, contained, for example, in fields 916-1 (for a mesh corresponding to the 2-D data contained in field 910), and vertex connectivity data contained, for example, in fields 918-1 (specifying in clockwise order the three vertices forming the front surface of each triangle of a mesh corresponding to the 2-D data contained in field 910).

In an alternative embodiment, instead of the MPEG decoder 2301, the right renderer 2302, and the left renderer 2303 each receiving the incoming video data stream 136 from the control processor 304, an additional processor (not shown) receives the incoming video data stream 136 from the control processor 304, and respectively passes appropriate portions therefrom to the MPEG decoder 2301, the right renderer 2302, and the left renderer 2303 for processing. This saves the MPEG decoder 2301, the right renderer 2302, and the left renderer 2303 from having to search the incoming video data stream 136 for their respective processing portions (i.e., the above identified words and fields).

Since the compressed 2-D video data contained in fields 910 of the video data stream 136 have been preferably compressed by an MPEG-2 compression algorithm respectively executed by each camera pair's dedicated processor (e.g., 802-1) in the video capture and encoding subsystem 110, the MPEG decoder 2301 decompresses the compressed 2-D data contained in fields 910 by executing a corresponding MPEG-2 decompression algorithm. The MPEG decoder 2301 then stores the decompressed 2-D data along with its associated time and camera pair identifier# in the shared memory 2309 so that the information will be accessible to both the right and left renderers, 2302 and 2303.

Also stored in the shared memory 2309, for example, is the current virtual viewpoint. The current virtual viewpoint is stored in the shared memory 2309 by the viewer input processor 310, for example, which also periodically updates the current virtual viewpoint in response to viewer manipulation of input devices, such as, for example, those described in reference to FIGS. 27, and 28A and 28B. The right-eye image buffer 2304 includes storage locations respectively corresponding to pixels to be displayed as a right-eye 2-D image by the video output device 316, and the left-eye frame buffer 2305 includes storage locations respectively corresponding to pixels to be displayed as left-eye 2-D images by the video output device 316, wherein the right-eye and left-eye 2-D images are computed based on offset positions such that the viewer experiences a 3-D image of the live action event from the current virtual viewpoint. The depth buffer corresponding to the right-eye frame buffer 2304 (referred to herein as the right Z-buffer) also includes storage locations respectively corresponding to pixels to be displayed as the right-eye 2-D image by the video output device 316, and the depth buffer corresponding to the left-eye frame buffer 2305 (referred to herein as the left Z-buffer) also includes storage locations respectively corresponding to pixels to be displayed as the left-eye 2-D image by the video output device 316. In particular, where the pixels respectively correspond to points on objects in the live action space, the Z-buffer storage locations corresponding to the pixels contain distances related to such points and the current virtual viewpoint.

In addition to reading the video data (e.g., 902–918) from the incoming video data stream 136, one or the other of the right and left renderers, 2302 and 2303, also reads certain special type data chunks such as depicted, for example, in FIG. 14C, and stores information contained therein into the shared memory 2309 so that the information will be accessible to both the right and left renderers, 2302 and 2303. As an example, the locations and orientations of the cameras are preferably provided in such data chunks, wherein the parameter (e.g., 944 in FIG. 14C) includes, for example, an indication that camera location data follows, and the data (e.g., 948 in FIG. 14C) includes a camera pair identifier#, a right camera indicator along with its position and orientation in world coordinates, and a left camera indicator along with its position and orientation in world coordinates.

The right and left renderers, 2302 and 2303, process the current virtual viewpoint, the decompressed 2-D video frames, and the mesh data to respectively generate right-eye and left-eye 2-D images appropriately offset so as to simulate a 3-D experience for a viewer at the current virtual viewpoint. The right renderer 2302 renders its right-eye display image into the right-eye frame buffer 2304, and the left renderer 2303 renders its left-eye display image into the left-eye frame buffer 2305. Accordingly, the right-eye frame buffer 2304 contains information for an image to be displayed to the right eye of the viewer, and the left-eye frame buffer 2305 contains information for an image to be displayed to the left eye of the viewer. The outputs of the right-eye and left-eye frame buffers, 2304 and 2305, are outputted to respective right-eye and left-eye display generators, 2306 and 2307, in response to the frame clock signal running, for example, at 30 Hz. The right-eye and left-eye display generators, 2306 and 2307, respectively, generate the right-eye and left-eye signals, 312 and 313, which drive the video output device 316. The video output device 316 is preferably a pair of stereo goggles having separate right-eye and left-eye displays, wherein the right-eye display is responsive to the right-eye signal 312 providing a sequence of right-eye frames at the frame clock signal rate, for example, of 30 frames per second, and the left-eye display is responsive to left-eye signal 313, providing a sequence of left-eye frames at the frame clock signal rate, for example, of 30 frames per second.

Figure 32:
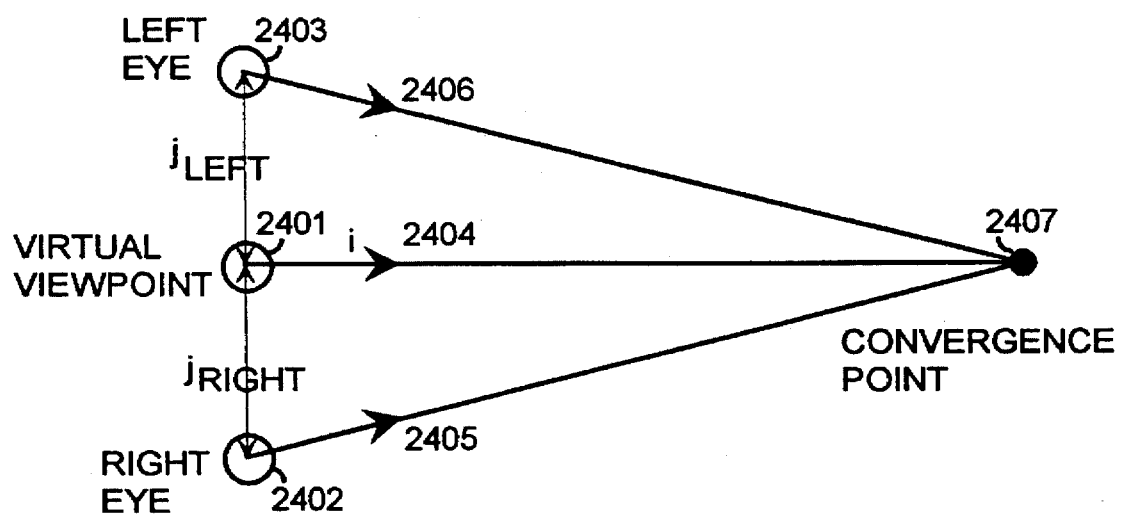
FIG. 32 illustrates, as an example, certain parameters used by the right and left renderers of the video rendering subsystem of FIG. 31 in rendering their respective right-eye and left-eye frames.

FIG. 32 illustrates, as an example, certain parameters used by the right and left renderers, 2302 and 2303, in rendering their respective right-eye and left-eye frames. For each eye, the viewpoint is respectively offset from the current virtual viewpoint by half the interocular distance (i.e., distance between the viewer's eyes), and directed towards an object being focused upon. For example, the right eye viewpoint 2402 is offset from the virtual viewpoint 2401 by a distance $j_{RIGHT}$ and directed towards a point of convergence 2407 determined by an object being focused upon, and the left eye viewpoint 2403 is offset from the virtual viewpoint by a distance $j_{LEFT}$ and directed towards the point of convergence 2407 determined by the object being focused upon. The corresponding viewing directions for the right and left eye frames are preferably calculated by the right and left renderers 2302 and 2303 to converge on, for example, an image surface of closest depth which is not part of the background.

Two types of shape/color data are transmitted to and processed by the video rendering subsystem 306. The first type is referred to herein as background data, and the second type is referred to herein as live action data. Both types of data are transmitted in video data chunks, such as depicted, for example, in FIG. 14A. The background data, however, is generally only transmitted once at the initiation of a viewing session, whereas the live action data is generally transmitted continuously throughout the viewing session. A chunk of background data preferably describes all fixed, non-moving objects in and around the live-action space (i.e., the remaining scene after all non-fixed, movable objects are removed). Conversely, a chunk of live action data preferably describes the non-fixed, movable objects superimposed over the background at a given point in time. For example, if the live action event is a football game, then non-moving objects such as the playing field, the goal posts, and the stands are generally part of a background chunk, and moving objects such as the football players and the football are generally part of a live action chunk.

Chunks of background data are received by the video rendering subsystem 306 at the initiation of the viewing session, for example, and are processed and stored in the shared memory 2309 so that they will be accessible to both the right and left renderers, 2302 and 2303 for subsequent processing. In particular, as illustrated, for example, in steps 2701–2704 in FIG. 34A, the MPEG decoder 2301 reads the compressed 2-D data contained, for example, in fields 910 in FIG. 14A, for each camera pair, decompresses the compressed 2-D data, and stores the decompressed 2-D data along with its camera pair identifier# in the shared memory 2309, and as illustrated, for example, in steps 2711–2712 in FIG. 34B, one or the other of the right and left renderers, 2302 and 2303, reads the mesh data contained, for example, in fields 916–918 in FIG. 14A, for each camera pair, and stores the mesh data for all camera pairs in the shared memory 2309. The positions and orientations of all cameras used for the background data are similarly stored in shared memory.

Figure 33:
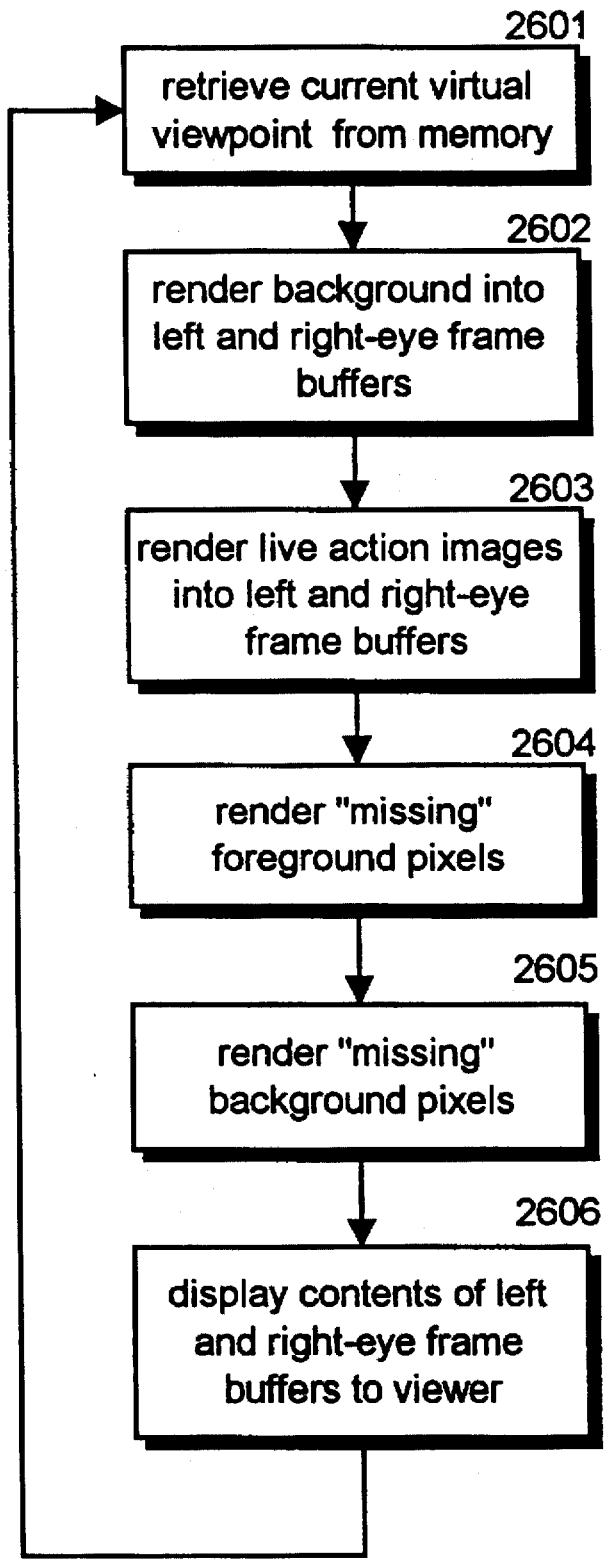
FIG. 33 illustrates, as examples, certain processing steps performed by the right and left renderers of FIG. 31 in respectively rendering their right-eye and left-eye frame buffers.

FIG. 33 illustrates, as an example, a flow diagram of certain processing steps performed by the right renderer 2302 in rendering the right-eye frame buffer 2304, and also performed by the left renderer 2303 in rendering the left-eye frame buffer 2305. Steps 2601–2606 are repeatedly looped through during the viewing session. Since each pass through the looped set of steps 2601–2606 processes the data from one video chunk to produce one video frame for each of the right-eye and left-eye frame buffers, 2304 or 2305, the right and left renderers, 2302 and 2303, preferably loop through these set of steps 30 times a second in order to provide the preferred 30 frames per second display rate.

In a first step 2601, both the right and left renderers, 2302 and 2303, read the current virtual viewpoint stored in the shared memory 2309, and set the contents of their respective right and left Z-buffers to a maximum value (i.e., infinity).

In a second step 2602, both the right and left renderers, 2302 and 2303, retrieve and process the background data stored in the shared memory 2309, to respectively render into their right-eye and left-eye frame buffers, 2304 and 2305, right-eye and left-eye display images of the background (i.e., fixed objects) providing a simulated 3-D experience of the background to the viewer from the perspective of the current virtual viewpoint. Additional details on this rendering step are provided in reference to steps 2801-2806 of FIG. 35A.

In a third step 2603, both the right and left renderers, 2302 and 2303, respectively render into their right-eye and left-eye frame buffers, 2304 and 2305, right-eye and left-eye display images of the live action (i.e., movable objects) providing, in conjunction with the previously stored background images, a simulated 3-D experience of the live action event to the viewer from the perspective of the current virtual viewpoint. Unlike the background data which are preferably read, decompressed, and stored in the shared memory 2309 once at the start of a viewing session, the live action data are preferably read, decompressed, and stored in the shared memory 2309 once every frame cycle (e.g., 30 times a second) throughout the viewing session. Additional details on such reading, decompressing, and storing steps are provided in reference to steps 2701–2704 and 2711–2714 of FIG. 34, and additional details on the rendering portion of this step are provided in reference to steps 2801–2806 of FIG. 35A.

In a fourth step 2604, both the right and left renderers, 2302 and 2303, respectively estimate the colors of pixels that are known to be part of a live-action object, but for which the color is not known. Such pixels, at this stage of processing, contain a unique color value (e.g., pure white), as will be explained further in step 2814 of FIG. 35B. This unique color value is now replaced with a color value interpolated from nearby pixels. To achieve this, the renderer locates all pixels P containing the special color value used in step 2804. For each such pixel, it locates the 4 closest pixels in the vertical and horizontal directions relative to P having a color value other than the special color. It then replaces the color of P with a weighted average of colors of these four pixels, where closer pixels are given more weight.

In a fifth step 2605, each renderer checks its corresponding Z-buffer for any pixels still containing the maximum value set by the right renderer in step 2601. For each such "undrawn" pixel, the renderer counts the number of contiguous undrawn pixels. If this number is above some threshold K, then preferably, depending upon the nature of the live-action event, the pixels in the group may be colored blue, for example, to match the sky, or a neutral color, such as, for example, gray. On the other hand, if there are K pixels or less in the group, then colors for the undrawn pixels may be interpolated from adjacent defined pixels similarly to step 2604.

In a sixth step 2606, in response to the frame clock FRAME CLOCK, the contents of both right-eye and left-eye frame buffers, 2304 and 2305, are then outputted to their respective display generators, 2306 and 2307. The display generators, 2306 and 2307, then generate their respective video signals, 312 and 313, which drive the respective right-eye and left-eye displays of the output display device 316. The process then loops back to step 2601 to process another video chunk, and continues looping through steps 2601–2604 at the video frame cycle rate (e.g., 30 frames per second) until the viewing session is completed.

FIG. 34 illustrates, as an example, the processing steps performed by the MPEG decoder 2301 and one or the other of the right and left renderers, 2302 and 2303, to read, decompress, and store the background and live action data into the shared memory 2309. In step 2701, the MPEG decoder 2301 receives a video data chunk 126 such as depicted, for example, in FIG. 14A, from, for example, the control processor 304. The chunk of data is understood to include data captured at the associated time from all camera pairs capturing a live action event (e.g., 112-1/112-2 to 112-9/112-10 in FIG. 7A). In step 2702, the MPEG decoder 2301 finds and identifies a camera pair (e.g., 112-1/112-2) by locating a word such as, for example, 906 in FIG. 14A, containing a camera pair identifier. In step 2703, the MPEG decoder 2301 then reads a field of data such as, for example, 910 in FIG. 14A, containing compressed 2-D data captured, for example, by the left camera of the identified camera pair. Preferably, the 2-D data has been compressed by an MPEG-2 (or latest MPEG or other standard) video compression algorithm. In step 2704, the MPEG decoder 2301 decompresses the compressed 2-D data, stores the decompressed 2-D data along with its camera pair identifier in the shared memory 2309, and jumps back to step 2702 to find and identify a next camera pair capturing the live action during the time associated with the data chunk. After finding and identifying the next camera pair as described in reference to step 2702, the MPEG decoder 2301 continues to loop through steps 2702 to 2704 until it reaches the end of the data chunk. Thereupon, the MPEG decoder 2301 stops until, for example, it receives the next video data chunk.

In parallel with the MPEG decoder 2301 looping through steps 2701–2704, one or the other of the right and left renderers, 2302 and 2303, is performing steps 2711–2714. In particular, although both right and left renderers, 2302 and 2303, receive the stream of video data chunks 126 such as depicted, for example, in FIG. 14A, from, for example, the control processor 304, only one of the renderers, 2302 or 2303, performs steps 2711–2714. For the purposes of the following description, it is assumed that the left renderer 2303 performs such steps, although it is to be understood that the right renderer 2302 may alternatively do so with satisfactory results. Accordingly, in step 2711, the left renderer 2303 receives the same chunk of data as the MPEG decoder 2301 in step 2701, which includes the time associated with the chunk of data. In step 2712, the left renderer 2303 reads the next camera pair identifier. In step 2713, the left renderer 2303 reads mesh data contained in fields such as, for example, 916–918 in FIG. 14A, and in step 2714 stores such data in the shared memory 2309. The left renderer repeats steps 2713 and 2714 for each of the meshes for this camera pair. It then jumps back to step 2711 to process the mesh data for the next camera pair, and continues this process until the mesh data for all camera pairs has been read and stored in shared memory.

Figure 35A:
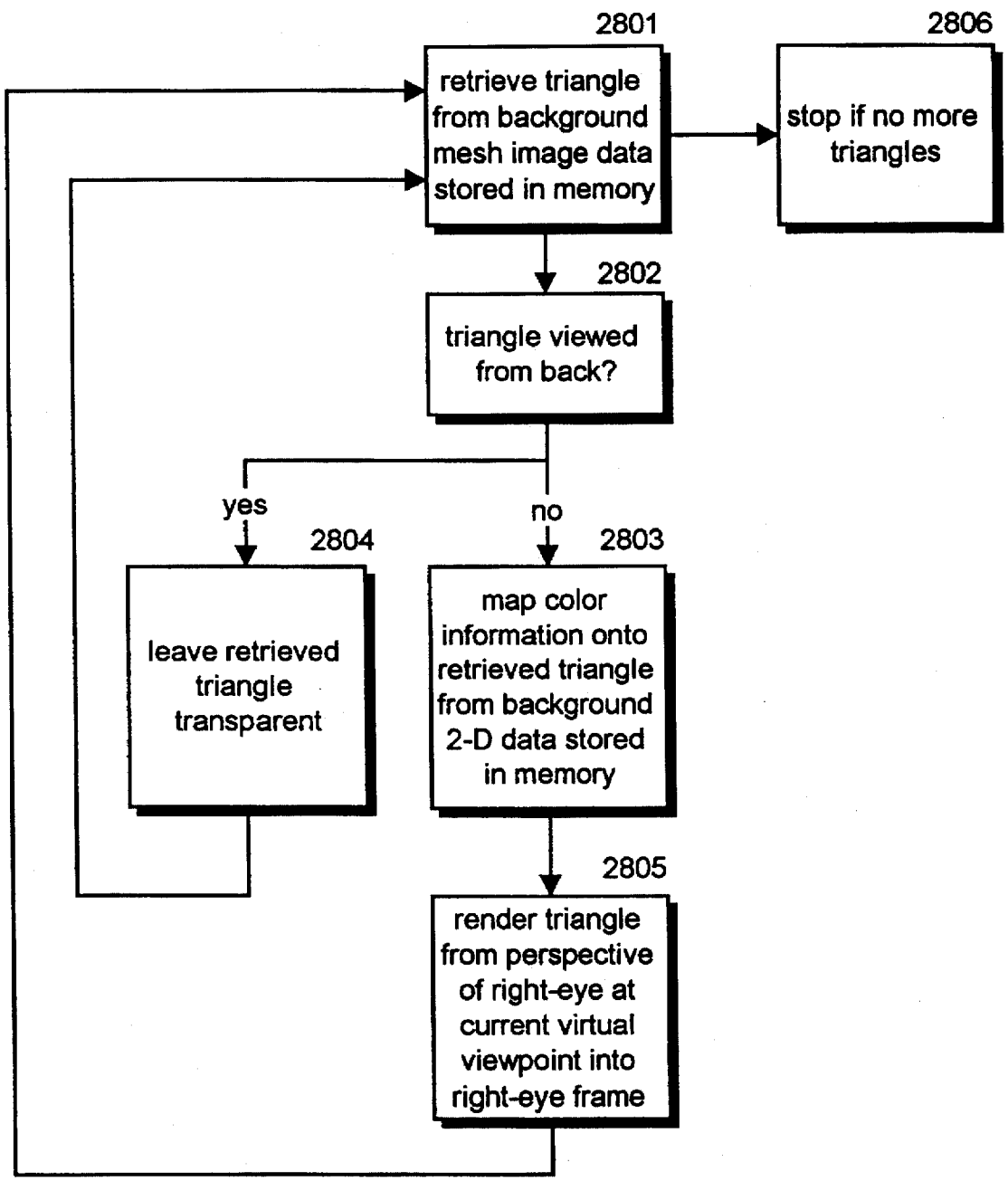
FIGS. 35A and 35B illustrate, as examples, certain processing steps performed by the right and left renderers of FIG. 31 when rendering their right-eye and left-eye display images of the background and/or live action images into their respective right-eye and left-eye frame buffers.
Figure 35B:
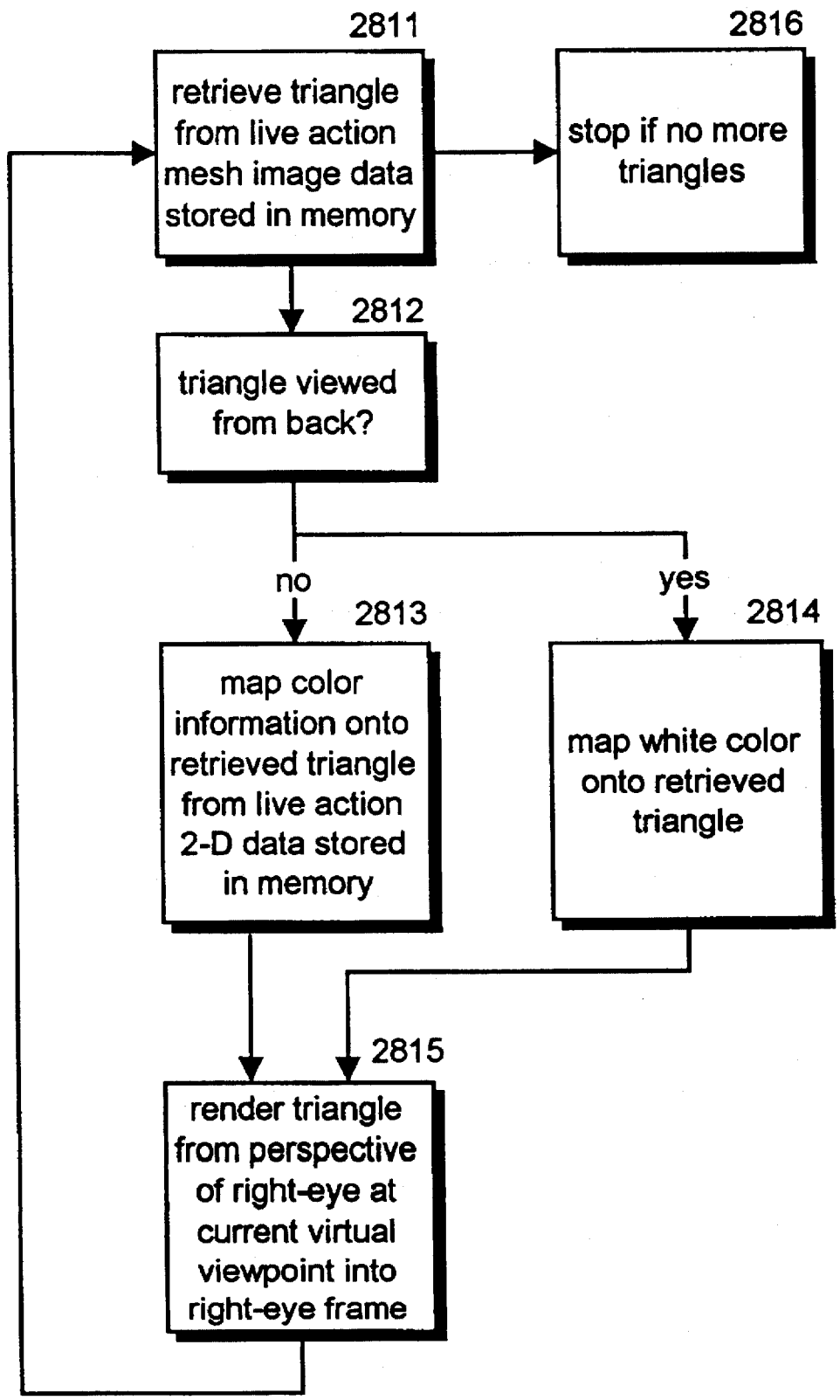

FIGS. 35A and 35B illustrate, as examples, certain processing steps performed by the right and left renderers, 2302 and 2303, when rendering into their respective right-eye and left-eye frame buffers, 2304 and 2305, their respective right-eye and left-eye display images of the background and/or live action images, which when displayed on a video output device such as described, for example, in reference to the video output device 316 in FIG. 5, a simulated 3-D experience of the live action event to the viewer from the perspective of the current virtual viewpoint. Although steps 2801–2806 describe steps performed by the right renderer 2302, it is to be understood that the same steps are simultaneously performed by the left renderer 2303 to render into its left-eye frame buffer 2305 a corresponding left-eye display image to be displayed on the video output device.

FIG. 35A illustrates steps performed by the right renderer 2302 when rendering a background image. In a first step 2801, the right renderer 2302 retrieves a triangle from the mesh data stored in the shared memory 2309. It does this, for example, by preferably retrieving from the connectivity data stored in the shared memory 2309, three vertex identifiers of the triangle, and from the coordinates of vertices data stored in the shared memory 2309, the world coordinates of the three vertices identified by the three vertex identifiers as forming the triangle, wherein the connectivity data is such as described in reference to field 918 in FIG. 14A, and the coordinates of vertices data is such as described in reference to field 916 in FIG. 14A. As an example, the three vertex identifiers preferably point to three addresses in the shared memory 2309 respectively containing the world coordinates of the three vertices comprising the triangle being retrieved.

In a second step 2802, the right renderer checks whether the triangle is being viewed from the front or the back. A triangle is being viewed from the back if its vertices do not appear in clockwise order as seen from the viewpoint. If the right renderer 2302 determines that a triangle of the background video data is being viewed from the back, it skips it (step 2804) and jumps to step 2801 to handle the next triangle.

In a third step 2803, the right renderer 2302 reads from shared memory the camera-pair identifier N associated with the triangle retrieved in step 2801. It then maps color information from the decompressed 2-D data for camera pair N stored in the shared memory 2309, onto the retrieved triangle. The 2-D data captured by the left camera, for example, of each camera pair, and stored in the shared memory 2309 by the MPEG decoder 2301, preferably includes an image of the live action event as viewed on a retinal plane of the left camera, wherein this image is understood herein to be a two-dimensional array of pixels. Each pixel in the image has associated with it, for example, three digital numbers corresponding to three colors such as red, green, and blue. By straightforward geometric calculation, pixels in the camera images can be mapped to corresponding points on mesh triangles by taking into account such parameters as the locations and orientations of the left cameras in world coordinates, their focal lengths, and the locations of the triangle vertices in world coordinates. The camera information is preferably provided in special type video data chunks such as depicted, for example, in FIG. 14C, and stored by one or the other of the left and right renderers, 2302 and 2303, in the shared memory 2309, so as to be accessible to both the left and right renderers, 2302 and 2303.

In a fifth step 2805, the right renderer 2302 renders the triangle into the right-eye frame buffer 2304 from the perspective of a right-eye image to be displayed to the viewer through a video output device such as, for example, the video output device 316 in FIG. 5. Conventional texture mapping techniques are used for coloring and patterning the triangle using the 2-D color information obtained in step 2803. The right renderer 2302 also updates the contents of its corresponding Z-buffer by storing calculated depth values into the storage locations of the Z-buffer corresponding to the triangle rendered into the right-eye frame buffer 2304. The Z-buffer is used to avoid modifying pixels already rendered for a closer triangle: a pixel is drawn only if its depth value is less than the value in the corresponding location in the Z-buffer.

FIG. 35B illustrates steps performed by the right renderer 2302 when rendering a live-action image. These steps are generally identical to those for rendering a background image (ref. FIG. 35A) with one exception: in step 2814, if the right renderer 2302 determines that a triangle of live action data is being viewed from the back, it sets the triangle's color to a special color value (e.g., pure white) known to not occur in real images, and then skips to step 2815, to render the triangle in this color. The pixels drawn in this way are replaced in step 2604 of FIG. 33, as described above.

Figure 36:
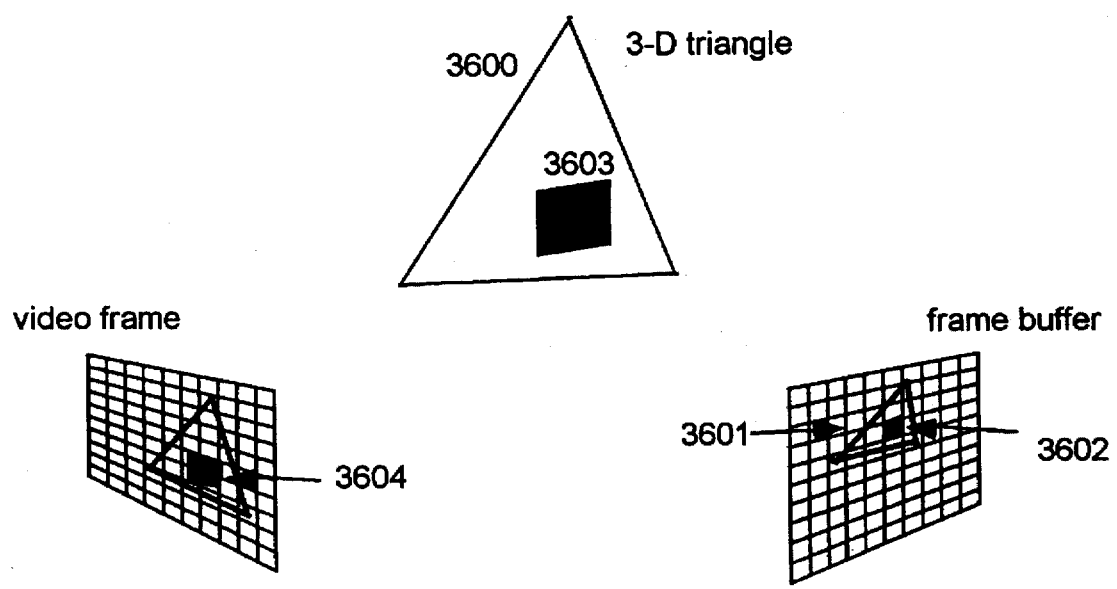
FIG. 36 illustrates, as an example, the rendering of a surface triangle from an object in the live action space, into the right-eye or left-eye frame buffer of FIG. 31.

FIG. 36 illustrates the rendering of a triangle 3600. The triangle is mapped, by a perspective transformation determined by the eye position and orientation, to a triangle 3601 in the frame buffer. Each pixel 3602 in this triangle maps to a quadrilateral 36603 in the triangle 300. The quadrilateral 3603 is mapped to a quadrilateral 3604 in the camera's video image. The quadrilateral 3604 overlaps one or more pixels in the video image. The right renderer computes an average of the colors of these pixels (where each color is weighted by the overlap of the quadrilateral 3604 and the pixel). This averaged color is then used to color the pixel 3602 in the frame buffer.

After step 2805, the right renderer 2302 jumps back to step 2801 to retrieve a next triangle to be rendered. If there are no more triangles to be rendered the right renderer 2302 jumps to a step 2806, where it waits for a frame clock signal and then returns to step 2801 to begin rendering the next frame.

Audio Rendering System

Figure 37:
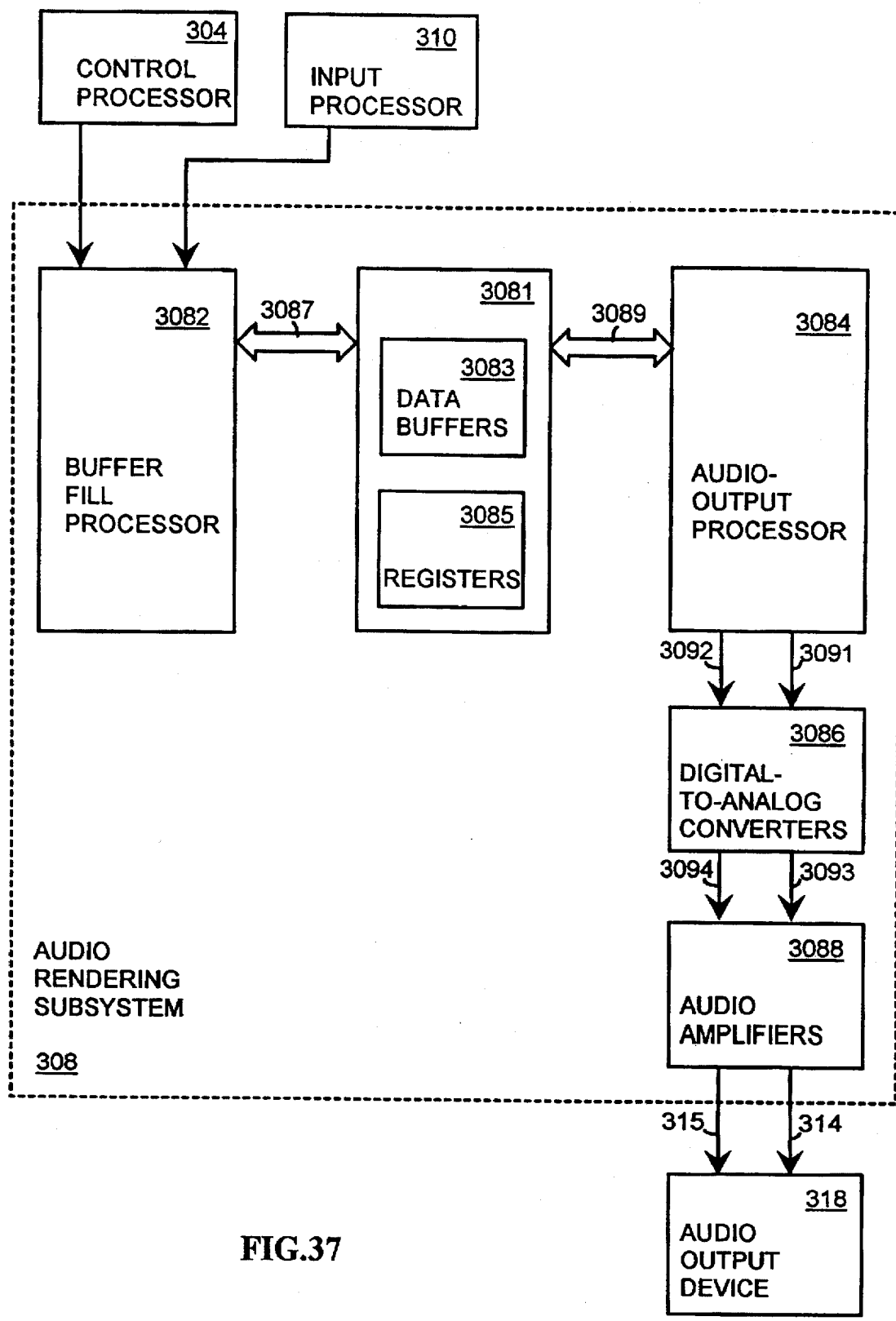
FIG. 37 illustrates, as an example, a block diagram of the audio rendering subsystem of FIG. 5.

FIG. 37 illustrates, as an example, a block diagram of the audio rendering subsystem 308. The audio rendering subsystem 308 simulates the sounds of a live action event that a viewer situated at the current virtual viewpoint would hear. To do this, it uses digital signal processing to simulate (1) the time delay between the emanation of a sound at its source location and the arrival of the sound at the current virtual viewpoint, (2) the attenuation of the sound due to the distance between the source location and the current virtual viewpoint, (3) the frequency shift (i.e., Doppler shift) in the sound due to relative motion between the source location and the virtual viewpoint, (4) the acoustic effects of the viewer's head and outer ear, and (5) the superposition of multiple concurrent sound sources.

The audio rendering subsystem 308 preferably includes a shared memory 3081, a buffer-fill processor 3082, an audio-output processor 3084, a pair of digital-to-analog converters 3086, and a pair of audio amplifiers 3088. The shared memory 3081 is accessible by both the buffer-fill processor 3082 and the audio-output processor 3084. It may be included as an integral part of either the buffer-fill processor 3082 or the audio-output processor 3084, or it may be a separate device, such as, for examples, a dual-port RAM or a standard RAM with arbiter circuitry, or a combination thereof. The shared memory 3081 includes a buffer area 3083 having a plurality of source buffers, such as depicted, for example, in FIG. 38, and a register area 3085 having a plurality of registers, such as depicted, for example, in FIG. 39.

Figure 38:
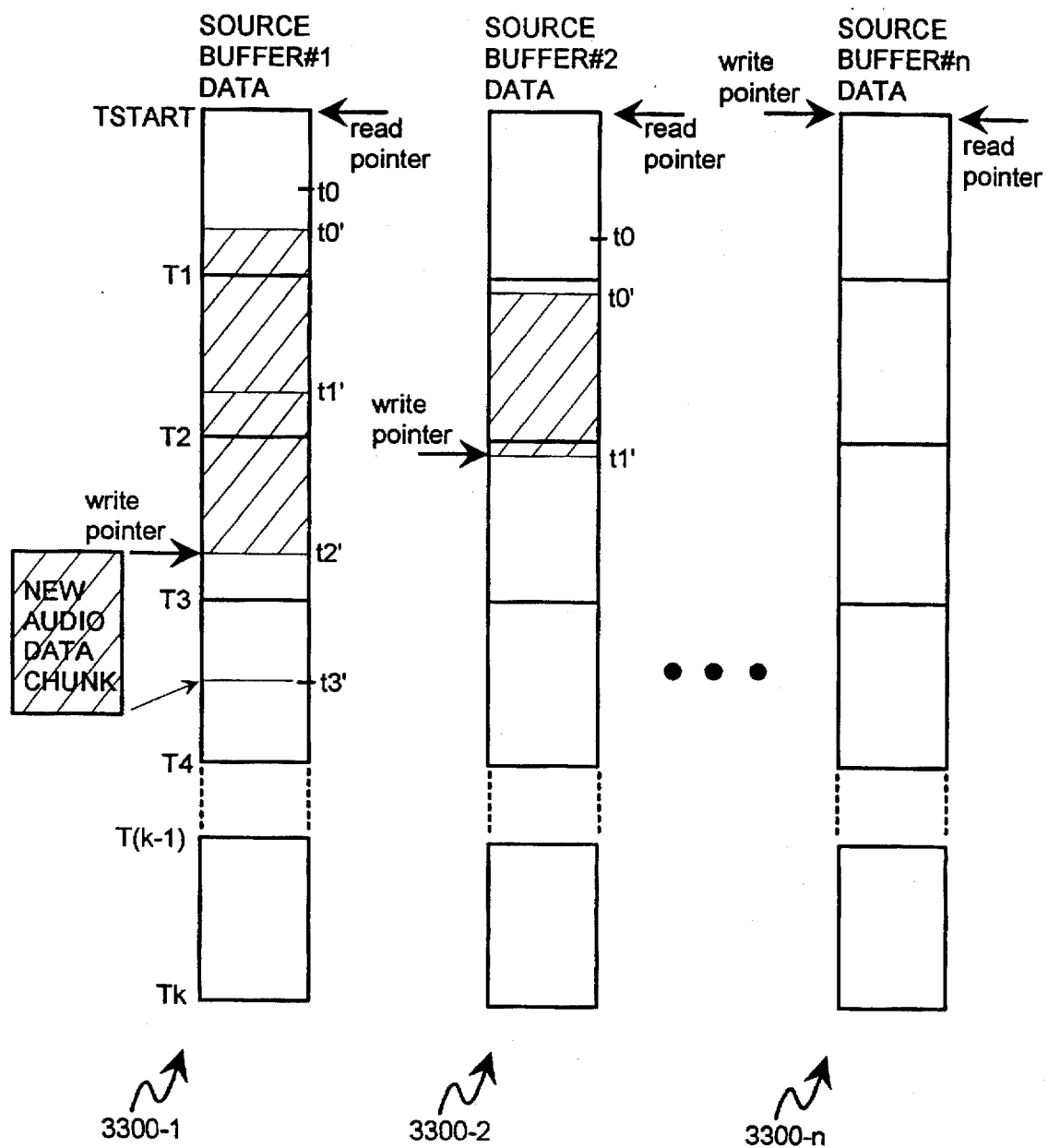
FIG. 38 illustrates, as examples, a plurality of source buffers included in the buffer area of the audio rendering subsystem of FIG. 37, for storing estimated audio samples from each of a plurality of spatial sound sources.

FIG. 38 depicts, for example, a plurality of source buffers, 3300-1 to 3300-n, included in the buffer area 3083. The number n of source buffers preferably is equal to the maximum number of concurrent sound sources, both spatial and ambient, and the source buffers are in one-to-one correspondence with the source ID#s of audio chunks. Each of the source buffers, 3300-1 to 3300-n, preferably includes enough memory for storing at least "D" seconds of sound samples at the sampling rate (e.g., 44.1 KHz), wherein "D" is the longest possible propagation delay between a spatial sound source and a virtual viewpoint in the live action space plus the duration of an audio data chunk (e.g., 0.1 seconds).

Figure 39:
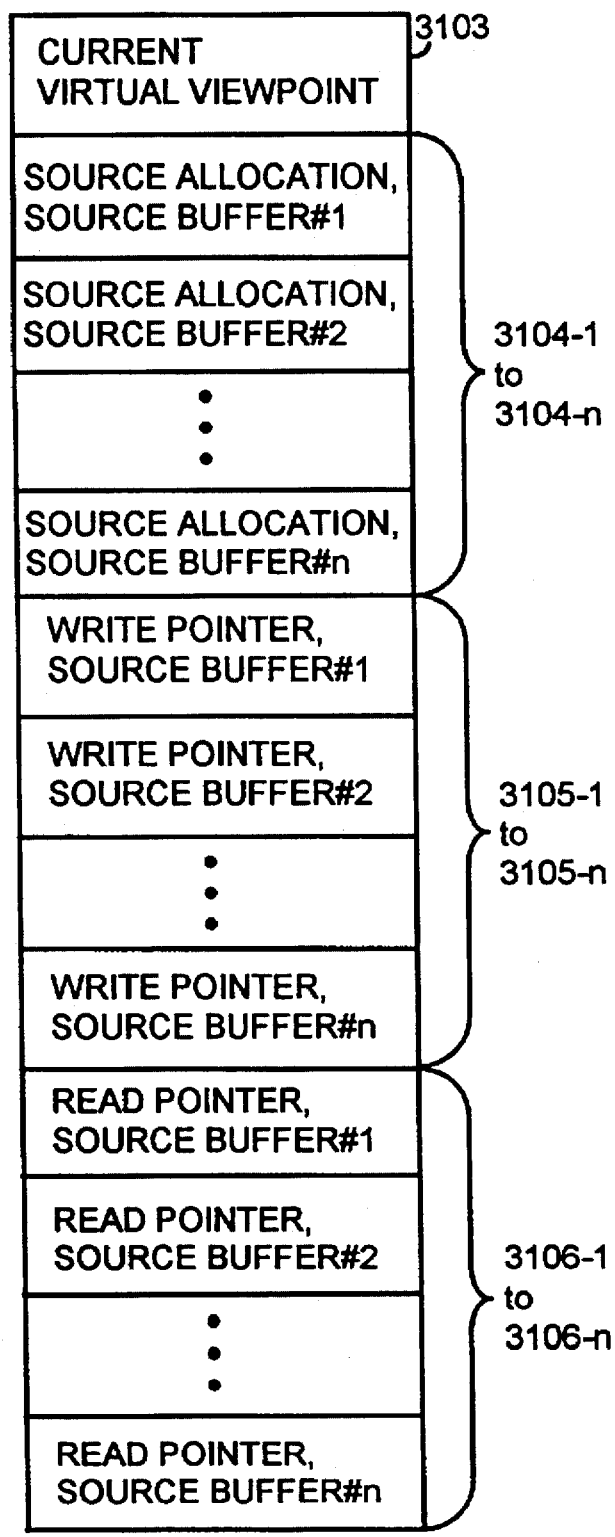
FIG. 39 illustrates, as examples, a number of registers included in the register area of the audio rendering subsystem of FIG. 37, for storing such things as the current virtual viewpoint, the source buffer allocation table, and the source buffer read and write pointers.

FIG. 39 depicts, for example, a plurality of registers, 3103–3106, included in the register area 3085. A current virtual viewpoint register 3103 contains the current virtual viewpoint. Write pointer registers, 3105-1 to 3105-n, respectively corresponding to source buffers, 3300-1 to 3300-n, individually contain a write pointer pointing to a last address into which data has been stored in its corresponding source buffer. Read pointer registers, 3106-1 to 3106-n, also respectively corresponding to source buffers, 3300-1 to 3300-n, individually contain a read pointer pointing to a next address from which data is to be read from its corresponding source buffer. Preferably, the buffer-fill processor 3082 maintains the current virtual viewpoint register 3103, and the write pointer registers, 3105-1 to 3105-n; and the audio-output processor 3084 maintains the read pointer registers, 3106-1 to 3106-n.

The source buffers, 3300-1 to 3300-n, are used in a cyclical fashion so that, when an audio sample associated with times 0, D, 2D, 3D and so on is to be stored in a buffer, it is stored in the first location of that buffer. Similarly, if an audio sample is associated with time 1/R, D+(1/R), or 2D+(1/R), where R represents the sampling rate, the sample is stored in the buffer's second location.

The read pointer registers, 3106-1 to 3106-n, are preferably initialized to locations to the time within the data stream at which the user begins viewing. As will be subsequently described in reference to FIG. 43, the read pointer registers are preferably incremented in unison each sample clock cycle by the audio-output processor 3084.

Referring back to FIG. 37, the buffer-fill processor 3082 periodically receives the current virtual viewpoint from the viewer input processor 310, and stores it in the current virtual viewpoint register 3103 of the register area 3085 of the shared memory 3081, making it available to the audio-output processor 3084. The buffer-fill processor 3082 also receives the audio data stream 138 from the control processor 304, and stores data samples from individual audio data chunks of the audio data stream 138 into source buffers of the buffer area 3083 of the shared memory 3081, making them available to the audio-output processor 3084. The audio-output processor 3084 extracts the data stored in the shared memory 3081, processes it, and delivers a stream of left and right sample pairs, 3091 and 3092, to the pair of digital-to-analog converters 3086. The analog signals, 3093 and 3094, generated by the pair of digital-to-analog converters 3086 are then respectively amplified by the pair of audio amplifiers 3088, and played through the audio output device 318.

Figure 40:
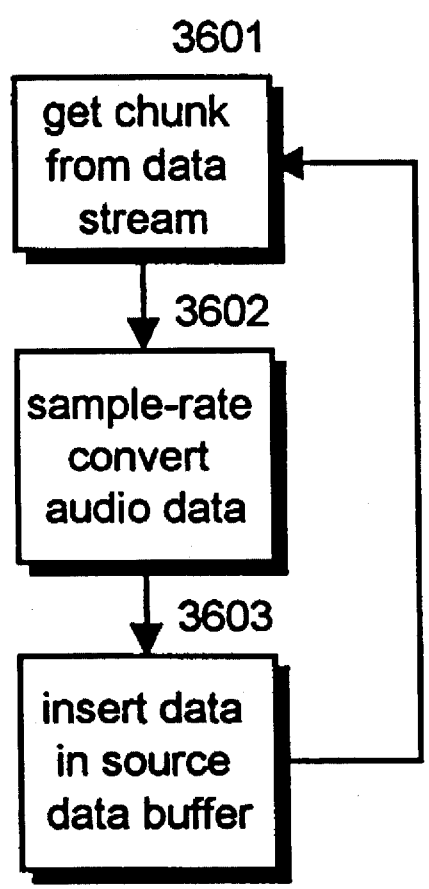
FIG. 40 illustrates, as examples, certain processing steps performed by the buffer-fill processor of the audio rendering subsystem of FIG. 37 when filling the source buffers with data samples from an audio data stream.

FIG. 40 illustrates, as an example, a flow diagram of certain processing steps performed by the buffer-fill processor 3082 when filling the source buffers, 3300-1 to 3300-n, with data samples from the audio data stream 138. In a first step 3601, the buffer-fill processor 3082 receives a data chunk, such as, for example, the audio data chunk shown in FIG. 14B, from the incoming audio data stream 138. Included in the incoming data chunk is a start time (e.g., 962) associated with the data chunk, an end time (e.g., 964) associated with the data chunk, a source ID# (e.g., 966) indicating the spatial sound source associated with the data chunk, a location (e.g., 968) indicating the source location in world coordinates of the spatial sound source at the time associated with the data chunk, and a number of digitized audio samples (e.g., 970) taken at the sampling rate (e.g., 44.1 KHz) over the duration of the data chunk.

Figure 45:
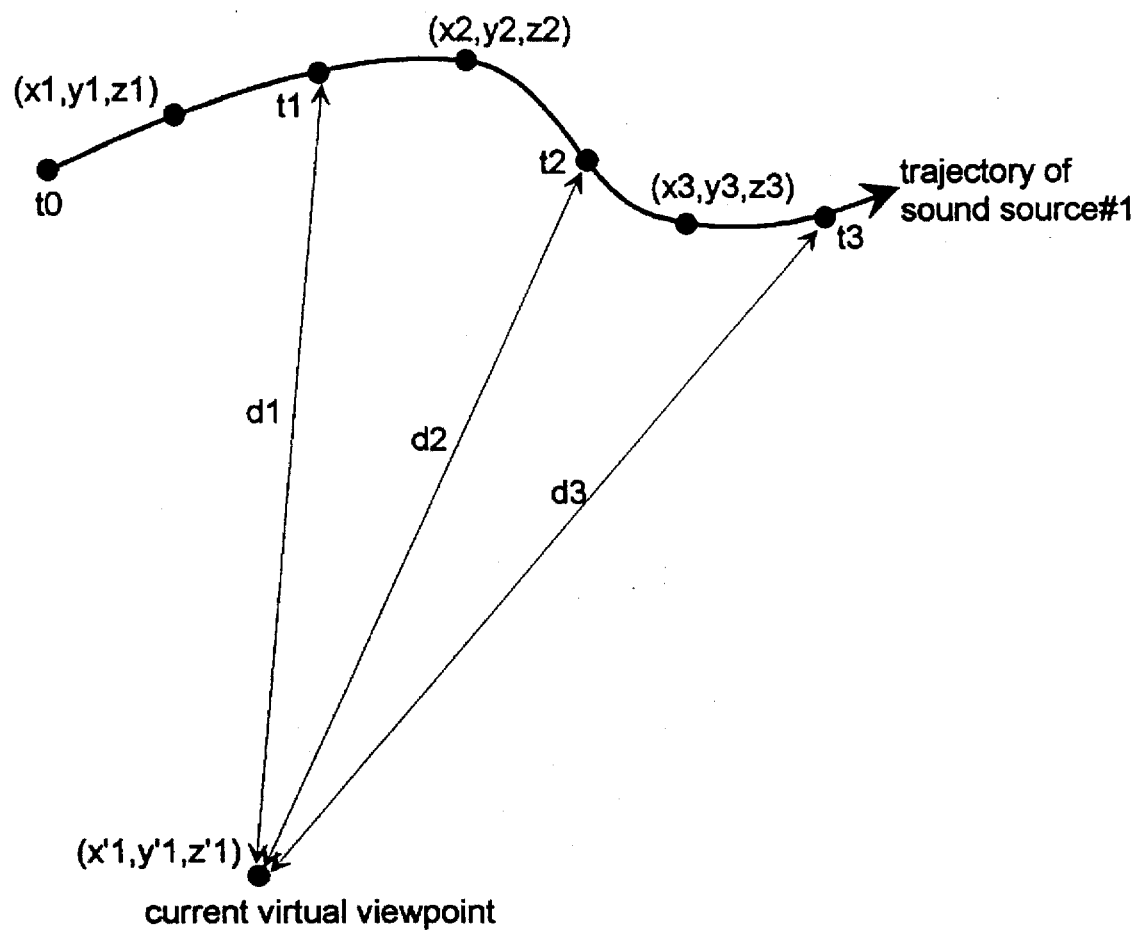
FIG. 45 illustrates, as an example, a trajectory of a sound source#1 with respect to a fixed current virtual viewpoint.

In a second step 3602, the buffer-fill processor 3082 expands or contracts, as appropriate, the incoming audio data chunk so that it fits correctly into its source buffer. Referring to FIGS. 38 and 45, for example, the data chunk's ending position (e.g., t1', t2', or t3') in the source buffer (e.g., 3300-1) is the position corresponding to the chunk's end time (e.g., t1, t2, or t3, wherein t1 is equal to the duration of the data chunk plus its start time, t0, as provided, for example, in record 962 of the data chunk) plus the sound propagation time (e.g., d1, d2, or d3 divided by the speed of sound) from the data chunk's source location (e.g., (x1,y1, z1), (x2,y2,z2), or (x3,y3,z3) in world coordinates) to the current virtual viewpoint (e.g., x1', y1', z1' in world coordinates). If the chunk is not contiguous with the previous chunk of its source ID#, then the starting position is simply the ending position minus the number of samples in the chunk (e.g., t0'), and the chunk's audio data is inserted therein without modification. On the other hand, if the chunk is contiguous in time with the previous chunk of its source ID#, then its starting position in the buffer is immediately after data already in the buffer, as indicated, for example, by that source buffer's write pointer. In this case, the chunk's audio data, for example M samples, must be inserted into a range of M' samples in the source buffer, where M' may be less than or greater than M. To accomplish this, the buffer-fill processor 3082 performs a well-known procedure known as "sample-rate conversion". For additional details on such sample-rate conversion techniques, see, e.g., *Multirate Digital Signal Processing* by R. E. Crochiere and L. R. Rabiner, Prentice-Hall, New Jersey, 1983, pp. 13–57, which details are incorporated herein by this reference.

In a third step 3603, the buffer-fill processor 3082 inserts the audio data resulting from step 3602 (i.e., either the data in the audio data chunk, or the result of the sample rate conversion) into the source buffer, ending at the end position determined in step 3602, and updates the write pointer for the source buffer by storing the end position address in the write pointer register (e.g., 3105-1 to 3105-n) corresponding to the source buffer. Since the buffer is used cyclically, the write pointer is reset to the start of the buffer whenever it moves past the end.

Figure 42:
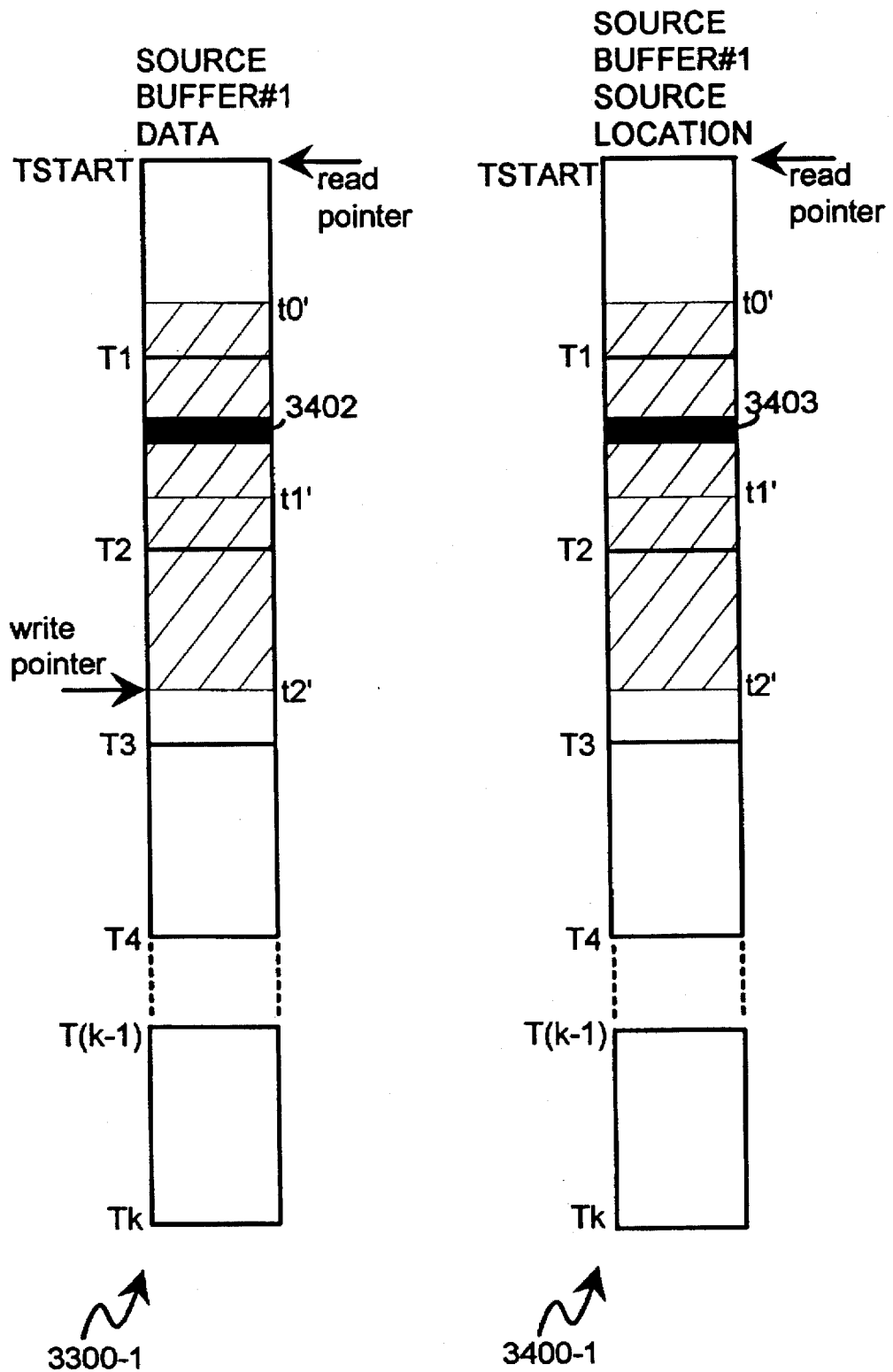
FIG. 42 illustrates, as an example, the storing of a data chunk in its source buffer.

Before looping back to step 3601 to receive another data chunk from the incoming audio data stream 138, the buffer-fill processor 3082 stores information indicative of the start time (e.g., 962 in FIG. 14B) and source location (e.g., 966 in FIG. 14B) for the data chunk into the shared memory 3081, making such information available to the audio-output processor 3084. One structure for facilitating this is depicted in FIG. 41, for example, wherein each data chunk (e.g., 1st data chunk) stored in a source buffer (e.g., source buffer#1) has its source location (e.g., 966 in FIG. 14B) stored in a corresponding source location register (e.g., 3201-1) and its start time (e.g., 962 in FIG. 14B) stored in a corresponding start time register (e.g., 3204-1) in the register area 3085, for example, of the shared memory 3081, making such information available to the audio-output processor 3084. Another structure for facilitating this is depicted in FIG. 42, for example, wherein each source buffer (e.g., 3300-1 to 3300-n) has a corresponding source location buffer (e.g., 3400-1 to 3400-n) of the same size, so that for each data sample (e.g., 3402) stored in a source buffer (e.g., 3300-1), its estimated source location (e.g., 3403) is stored at the same offset in its corresponding source location buffer (e.g., 3400-1).

Figure 43:
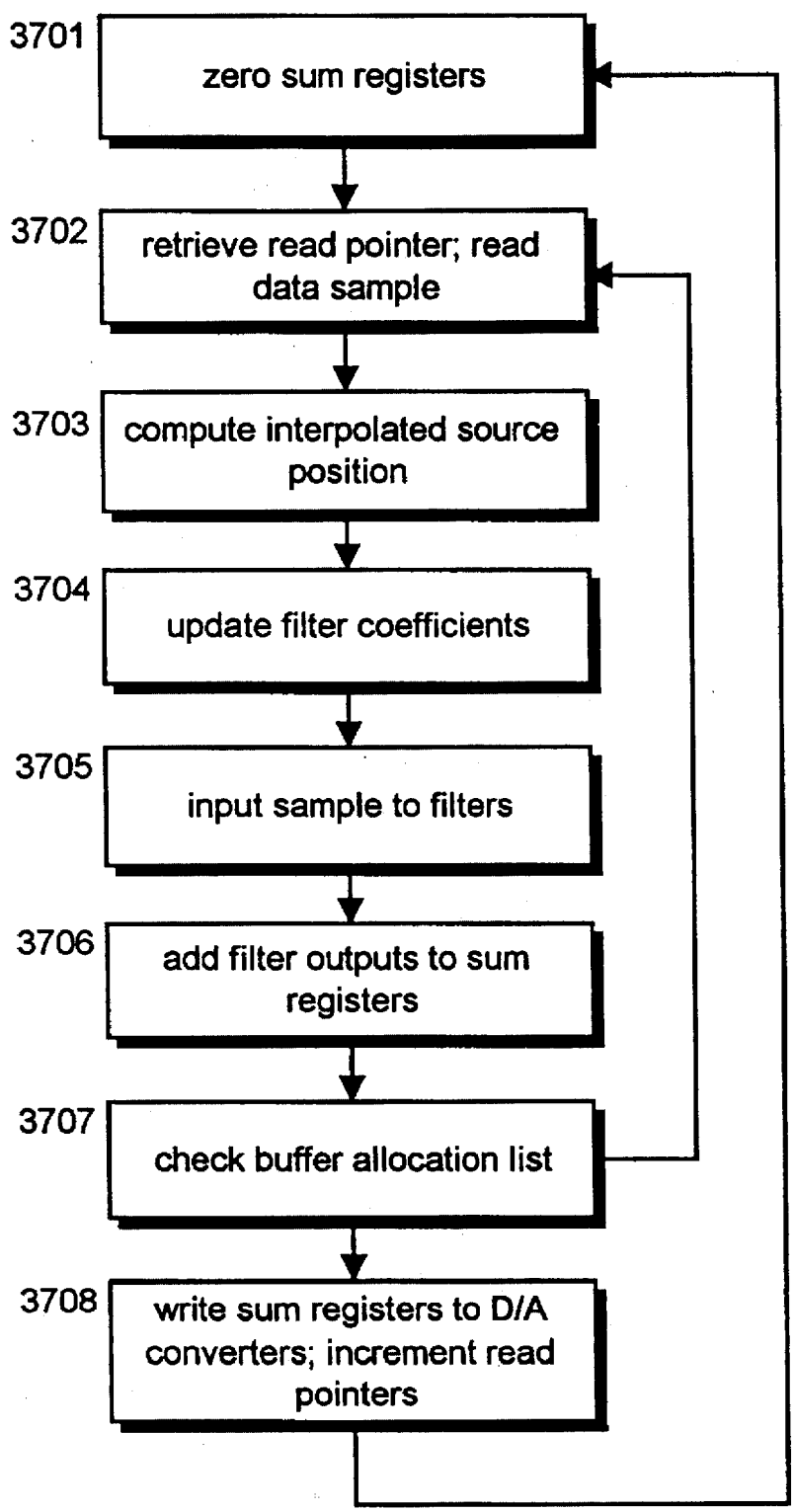
FIG. 43 illustrates, as examples, certain steps performed by the audio-output processor of the audio rendering subsystem of FIG. 37 when processing audio data stored in the source buffers to generate a stream of left and right ear audio data to be processed into left and right ear audio signals.
Figure 44:
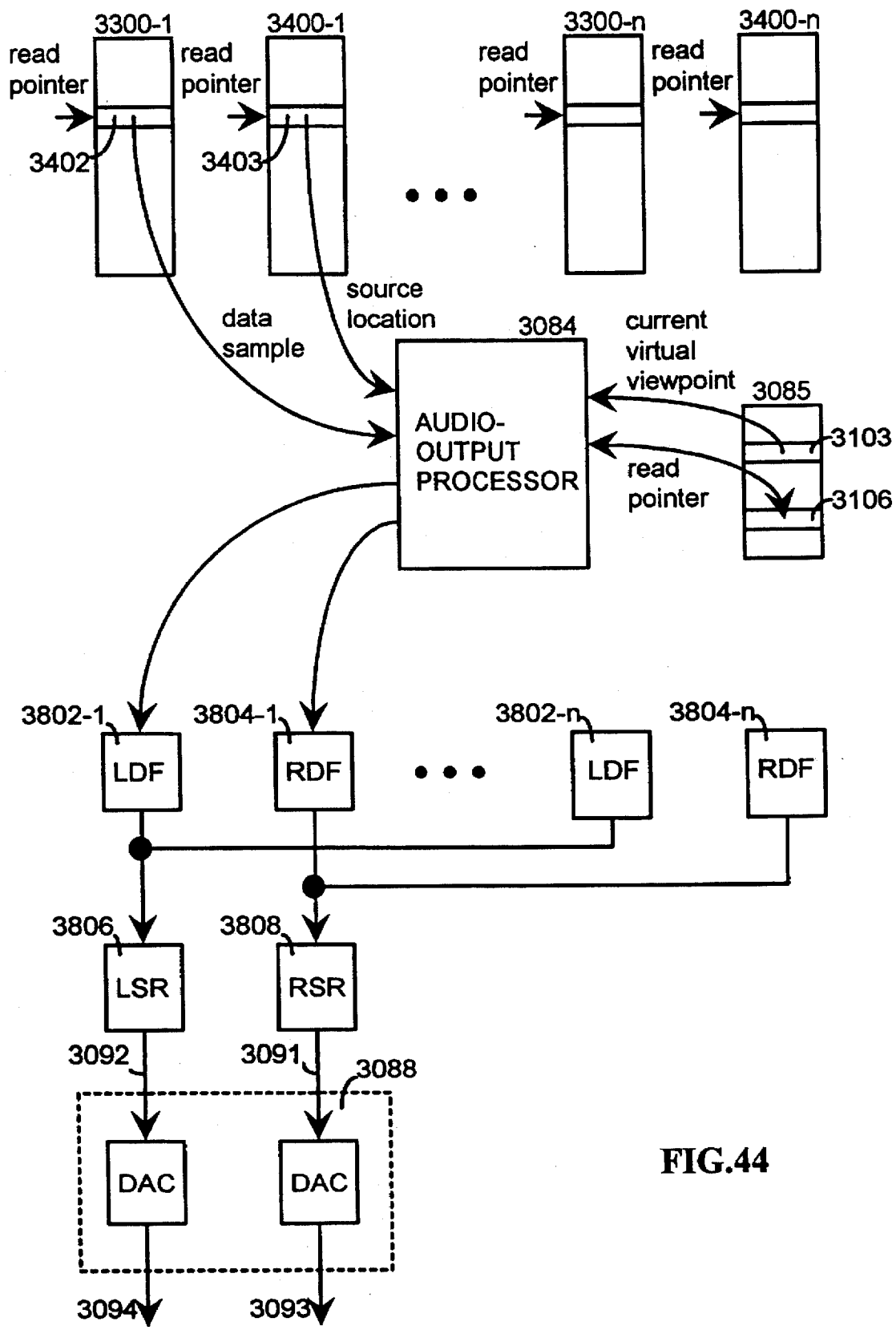
FIG. 44 illustrates, as an example, the flow of data as the audio-output processor of FIG. 37 processes audio data stored in the source buffers to generate the stream of left and right ear audio data to be processed into left and right ear audio signals.

FIGS. 43 and 44 illustrate, as an example, steps performed by the audio-output processor 3084 when processing audio data stored in the source buffers, 3300-1 to 3300-n. In particular, FIG. 43 illustrates, as an example, a flow diagram of certain process steps performed by the audio-output processor 3084 when processing audio data stored in the source buffers, 3300-1 to 3300-n, and FIG. 44 illustrates, as an example, the flow of data to and from the audio-output processor 3084 when processing audio data stored in the source buffers, 3300-1 to 3300-n. Steps 3701–3709 are executed by the audio-output processor 3084 once every sample clock period (based upon a sampling rate, for example, of 44.1 KHz).

In a first step 3701, the audio-output processor 3084 zeroes the left and right sum registers, 3806 and 3808, respectively.

In a second step 3702, the audio-output processor 3084 reads the read pointer register (e.g., 3106-1 to 3106-n) corresponding to the current source buffer, to obtain the next address to be read from the source buffer; and then reads the data sample located at that address of the source buffer. It then writes a zero value to that address, to ensure that sources that are not in use contribute only silence to the audio output.

In a third step 3703, the audio-output processor 3084 determines the source location in world coordinates corresponding to the data sample read in step 3702. Depending upon how the buffer-fill processor 3082 has stored the source information in the shared memory 3081, the audio-output processor 3084 may either calculate the source location corresponding to the data sample read in step 3702, from data stored in registers, such as depicted, for example, in FIG. 41, in the register area 3085 of the shared memory 3081, or read the source location corresponding to the data sample read in step 3703, directly from a source location buffer, such as depicted, for example, in FIG. 42, in the source buffer area 3083 of the shared memory 3081. In the latter case, the buffer-fill processor 3082 calculates the source locations respectively corresponding to the data samples stored in the source buffers, 3300-1 to 3300-n, and stores the calculated source locations in the source location buffers, 3400-1 to 3400-n, such as depicted, for example, in FIG. 42, when it stores the data samples in the source buffers, 3300-1 to 3300-n, as described in reference to FIG. 40.

The source location corresponding to the data sample read in step 3702 is calculated the same way, regardless of whether the audio-output processor 3084 calculates it from data stored in registers, such as, for example, depicted in FIG. 41, or the buffer-fill processor 3082 calculates it when storing the data samples in the source buffers, 3300-1 to 3300-n, as described in reference to FIG. 42. In either case, the source location corresponding to the data sample is preferably determined by first estimating a trajectory for the sound source associated with the data sample by curve-fitting the source locations of three adjacent data chunks including the data sample. From the trajectory thus obtained, the source location at any point in time along the trajectory can be calculated using conventional interpolation methods.

As an example, a trajectory of a sound source#1 is depicted in FIG. 45. A first data chunk including data samples starting at time t0 and up to time t1 at the data sampling rate (e.g., 44.1 KHz) has a source location (x1,y1, z1) in world coordinates identified at its midpoint, a second data chunk including data samples starting at time t1 and up to time t2 at the data sampling rate (e.g., 44.1 KHz) has a source location (x2,y2,z2) in world coordinates identified at its midpoint, and a third data chunk including data samples starting at time t2 and up to time t3 at the data sampling rate (e.g., 44.1 KHz) has a source location (x3,y3,z3) in world coordinates identified at its midpoint. Assuming the trajectory of the sound source#1 has been obtained by curve-fitting the three source location points (x1,y1,z1), (x2,y2,z2), and (x3,y3,z3), then a source location corresponding to any point in time between time t0 and time t3 can be calculated from the trajectory using conventional interpolation methods.

In a fourth step 3704, the audio-output processor 3084 updates the coefficients of a left ear digital filter (e.g., 3802-k) and a right ear digital filter (e.g., 3804-k) corresponding to the source buffer (e.g., 3300-k) from which the data sample was read in step 3702, to reflect the current virtual viewpoint. The purpose of the left and right ear digital filters is to simulate the acoustic effects of the head and outer ears to sounds coming from the direction of the source location relative to the current virtual viewpoint. Each of the source buffers, 3300-1 to 3300-n, has its own corresponding pair of left and right ear digital filters. For example, in FIG. 44, respectively corresponding to source buffers, 3300-1 to 3300-n, are left ear digital filters, 3802-1 to 3802-n, and right ear digital filters, 3804-1 to 3804-n. When a data sample 3402 is read from source buffer 3300-1, the audio-output processor 3084 updates the coefficients of the left ear digital filter 3802-1 and right ear digital filter 3804-1 based upon the source location 3403 read from the source location buffer 3400-1, and the current virtual viewpoint read from the current virtual viewpoint register 3103. For additional details on such left and right ear digital filters, see, for example, "3-D *Sound for Virtual Reality and Multimedia*" by D. R. Begault, AP Professional, 1994 pp. 117–190, which additional details are incorporated herein by this reference.

In a fifth step 3705, the audio-output processor 3084 first attenuates the amplitude of the data sample read in step 3703 to reflect the distance between the location of the spatial sound source associated with the data sample, and the current virtual viewpoint, then provides the attenuated data sample as inputs to both the left and right ear digital filters corresponding to the source buffer from which the data sample was read in step 3703. To attenuate the amplitude of the data sample, the audio-output processor 3084 first computes the distance between the source location obtained in step 3703 and the current virtual viewpoint read, for example, from the current virtual viewpoint register 3103, then divides the data sample by the square of the computed distance.

In a sixth step 3706, the audio-output processor 3084 adds the output of the left ear digital filter corresponding to the source buffer from which the data sample was read in step 3702, to the left sum register (e.g., 3806 in FIG. 38), and adds the output of the right ear digital filter corresponding to the source buffer from which the data sample was read in step 3702, to the right sum register (e.g., 3808 in FIG. 38).

In an seventh step 3707, the audio-output processor 3084 checks whether all source buffers have been processed. If not, it jumps back to step 3702 to process a sample from the next source buffer. Otherwise it continues to step 3708.

In an eighth step 3708, the audio-output processor 3084 causes the contents of the left and right sum registers, 3806 and 3808, which now contain the final left and right sample values for the current time, to be provided to the digital-to-analog converter unit 3088, which preferably includes, as depicted in FIG. 44, for example, separate right and left digital-to-analog converters which respectively receive and process the outputs of the left and right sum registers. The audio-output processor 3084 then increments the address stored in each of the read pointer registers, 3106-1 to 3106-n, and waits for the next sample clock before jumping back to step 3701 and looping through steps 3701–3709 again.

Although the various aspects of the present invention have been described with respect to a preferred embodiment, it will be understood that the invention is entitled to full protection within the full scope of the appended claims.

What is claimed is:

1. An interactive television system providing viewer selectable virtual positions including all points within a three-dimensional space for experiencing an event occurring in said three-dimensional space, comprising:

a capture and encoding subsystem including means for generating video signals from different viewpoints of said objects within said live-action space such that said video signals communicate information indicative of the locations and three-dimensional shapes of said objects, and means for processing said video signals to generate encoded data including the locations and three-dimensional shapes of said objects; and a rendering subsystem including means responsive to physical actions initiated by a viewer for generating at least one control signal indicative of a virtual position in said three-dimensional space;

means for receiving said at least one control signal, said encoded data, and audio information associated with said event, and generating in response thereof, display signals and audio signals relative to said virtual position;

means responsive to said display signals for providing a simulated viewing experience relative to said virtual position to the viewer; and means responsive to said audio signals for providing a simulated hearing experience relative to said virtual position to the viewer.

2. The interactive television system as recited in claim 1, wherein said control signal generating means comprises means responsive to physical actions initiated by a viewer for generating at least one control signal indicative of a virtual position and orientation in said three-dimensional space; wherein said display and audio signal generating means comprises means for receiving said at least one control signal, encoded data, and audio information associated with said event, and generating in response thereof, display signals and audio signals relative to said virtual position and orientation; wherein said viewing experience providing means comprises means responsive to said display signals for providing a simulated viewing experience relative to said virtual position and orientation to the viewer; and wherein said hearing experience providing means comprises means responsive to said audio signals for providing a simulated hearing experience relative to said virtual position and orientation to the viewer.

3. The interactive television system as recited in claim 2, wherein said display and audio signal generating means comprises means for receiving said at least one control signal, encoded data, and audio information associated with said event, and generating in response thereof, right and left eye video signals and right and left ear audio signals relative to said virtual position and orientation; wherein said viewing experience providing means comprises means responsive to said right and left eye video signals for displaying right and left eye images, providing a three-dimensional viewing experience relative to said virtual position and orientation, to the viewer; and wherein said hearing experience providing means comprises means responsive to said right and left ear audio signals for generating right and left ear sounds, simulating a three-dimensional hearing experience relative to said virtual position and orientation, for the viewer.

4. The interactive television system as recited in claim 1, wherein said receiving means receives a broadcasted signal including said received video and audio information.

5. The interactive television system as recited in claim 1, wherein said at least one control signal generating means comprises a joystick manipulated by the viewer such that left and right velocities are controlled by left and right movement of the joystick, forward and backward velocities are controlled by forward and backward movement of the joystick, and up and down velocities are controlled by up and down movement of the joystick.

6. The interactive television system as recited in claim 5, wherein said joystick is further manipulated by the viewer such that viewer orientation in the yaw axis is controlled by rotary movement of the joystick.

* * * * *